April 3, 1962 P. J. DE GEORGE 3,028,079
NAVIGATION SYSTEM
Filed Dec. 8, 1953 31 Sheets-Sheet 1
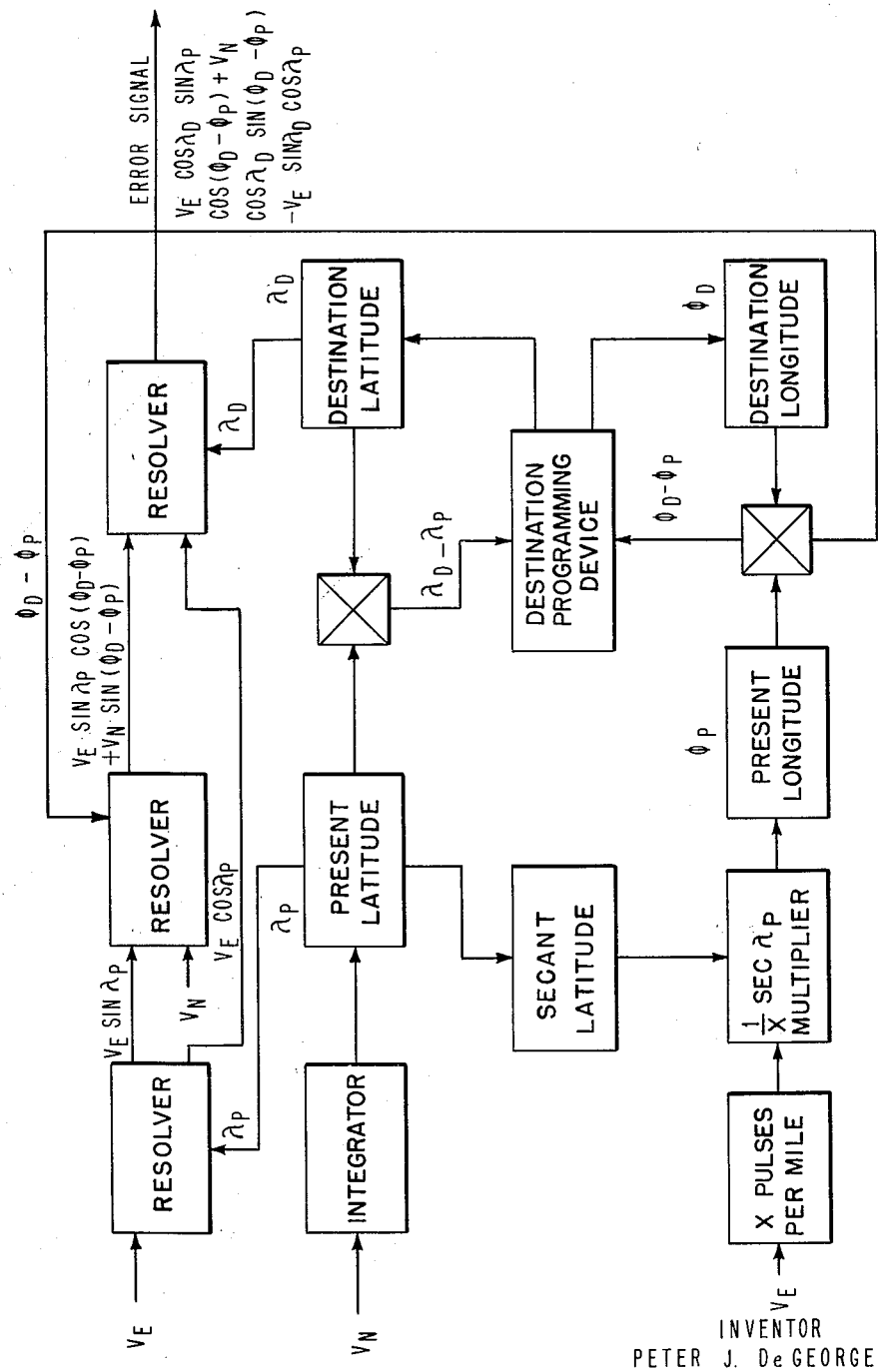
INVENTOR
PETER J. De GEORGE
BY
ATTORNEY

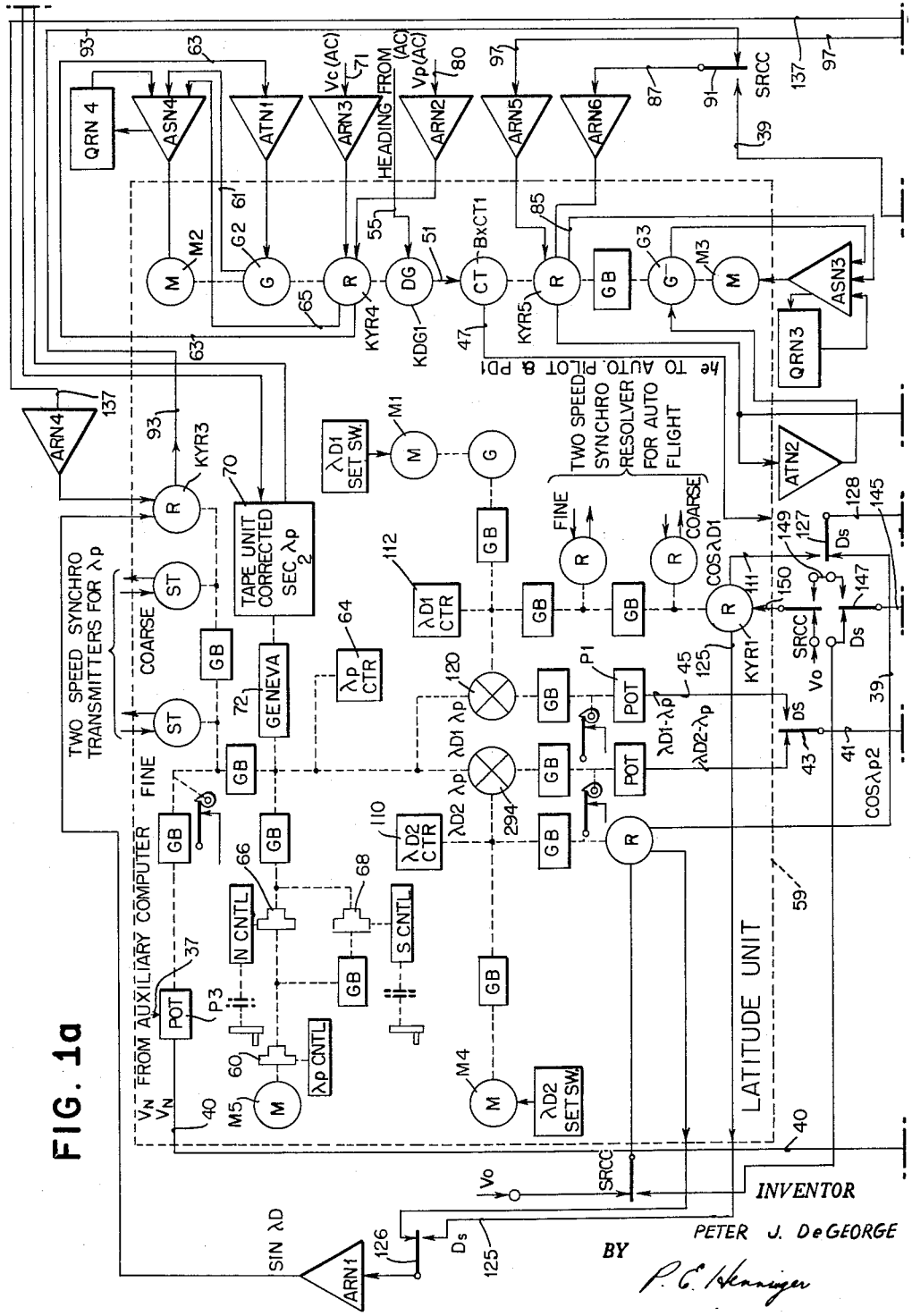

INVENTOR
PETER J. DeGEORGE
BY P. E. Heninger
ATTORNEY

April 3, 1962   P. J. DE GEORGE   3,028,079
NAVIGATION SYSTEM
Filed Dec. 8, 1953   31 Sheets-Sheet 4

INVENTOR
PETER J. DeGEORGE
BY P.C. Henninger
ATTORNEY

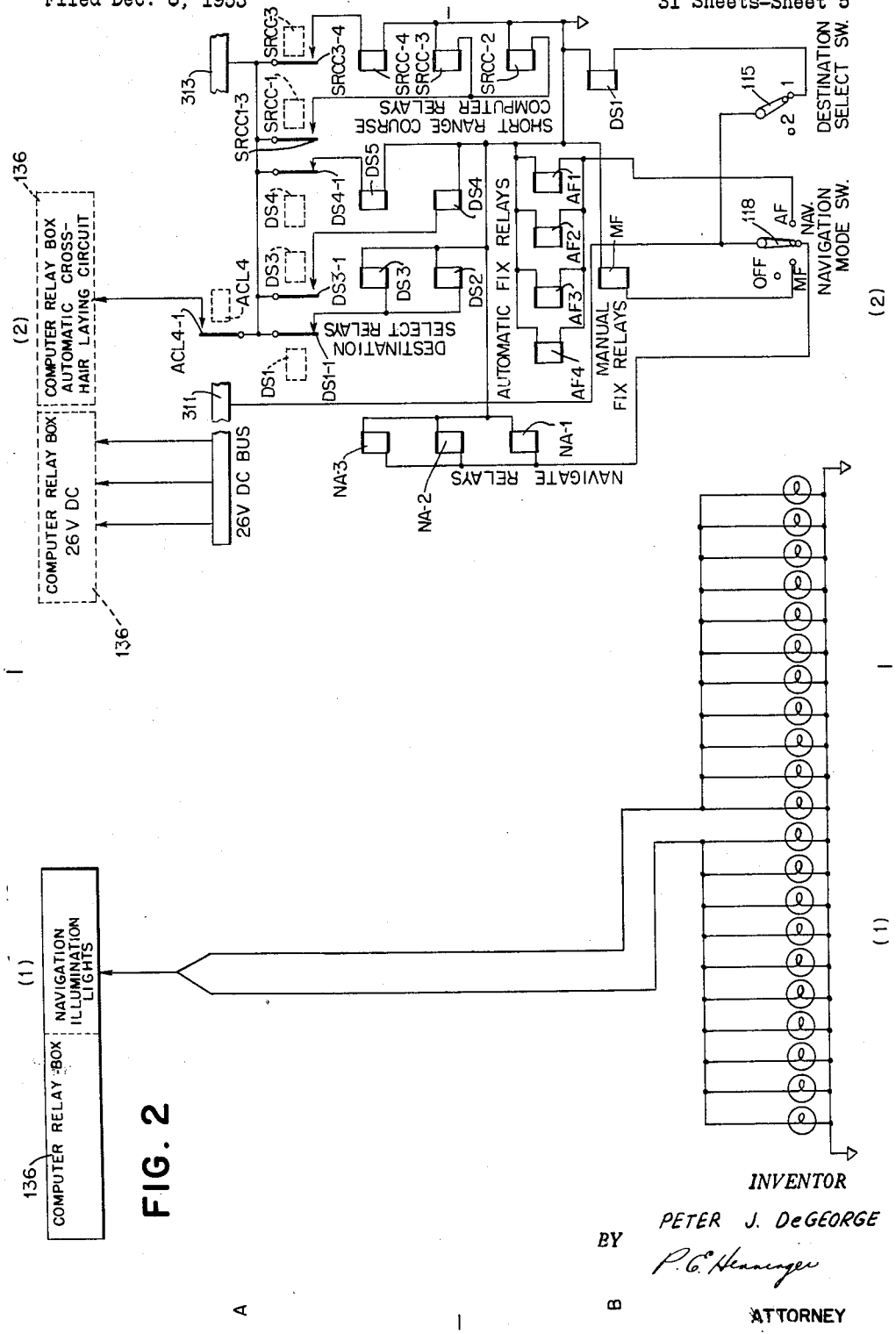

April 3, 1962 P. J. DE GEORGE 3,028,079
NAVIGATION SYSTEM
Filed Dec. 8, 1953 31 Sheets-Sheet 6

FIG. 3

INVENTOR
PETER J. DeGEORGE
BY
P.E. Henninger
ATTORNEY

April 3, 1962   P. J. DE GEORGE   3,028,079
NAVIGATION SYSTEM
Filed Dec. 8, 1953   31 Sheets-Sheet 8

INVENTOR
PETER J. DeGEORGE
BY
R. E. Henninger
ATTORNEY

April 3, 1962    P. J. DE GEORGE    3,028,079
NAVIGATION SYSTEM
Filed Dec. 8, 1953    31 Sheets-Sheet 9

INVENTOR
PETER J. DeGEORGE
BY
ATTORNEY

April 3, 1962  P. J. DE GEORGE  3,028,079
NAVIGATION SYSTEM
Filed Dec. 8, 1953  31 Sheets-Sheet 13

FIG. 10

INVENTOR
PETER J. DeGEORGE
BY
P.E. Henninger
ATTORNEY

April 3, 1962 P. J. DE GEORGE 3,028,079
NAVIGATION SYSTEM
Filed Dec. 8, 1953 31 Sheets-Sheet 17
FIG. 14
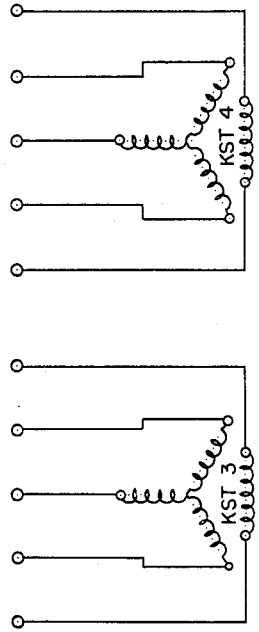
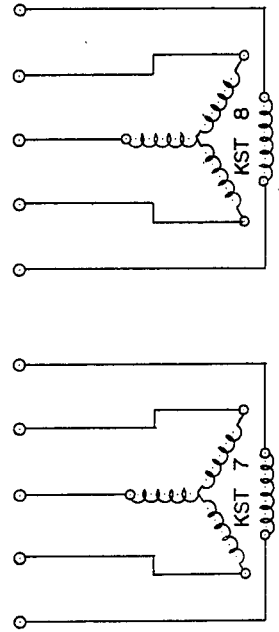
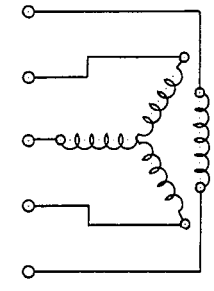
INVENTOR
PETER J. DeGEORGE
BY
P. C. Henninger
ATTORNEY INVENTOR.
PETER J. DeGEORGE
BY
ATTORNEY April 3, 1962 P. J. DE GEORGE 3,028,079
NAVIGATION SYSTEM
Filed Dec. 8, 1953 31 Sheets-Sheet 21

INVENTOR
PETER J. DeGEORGE
BY
ATTORNEY

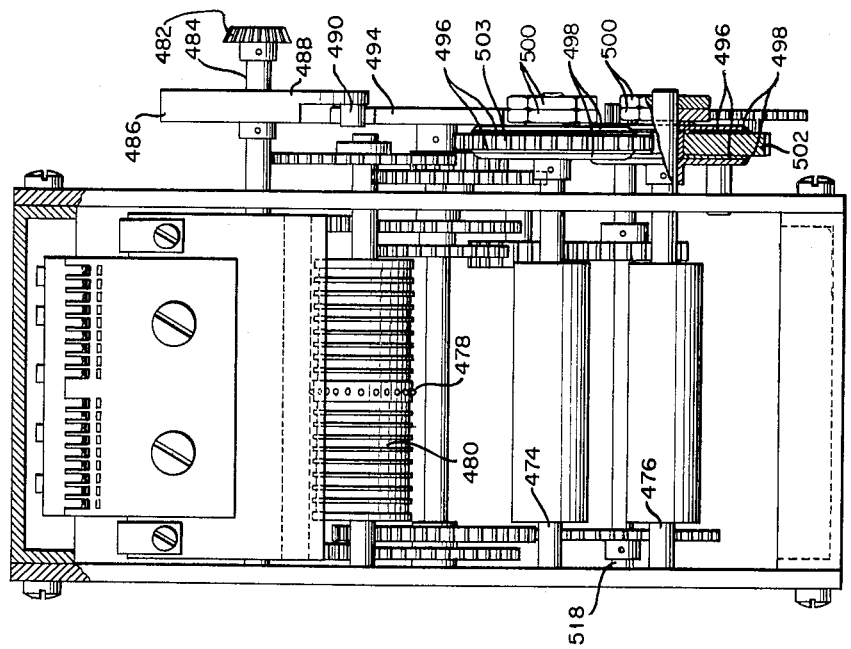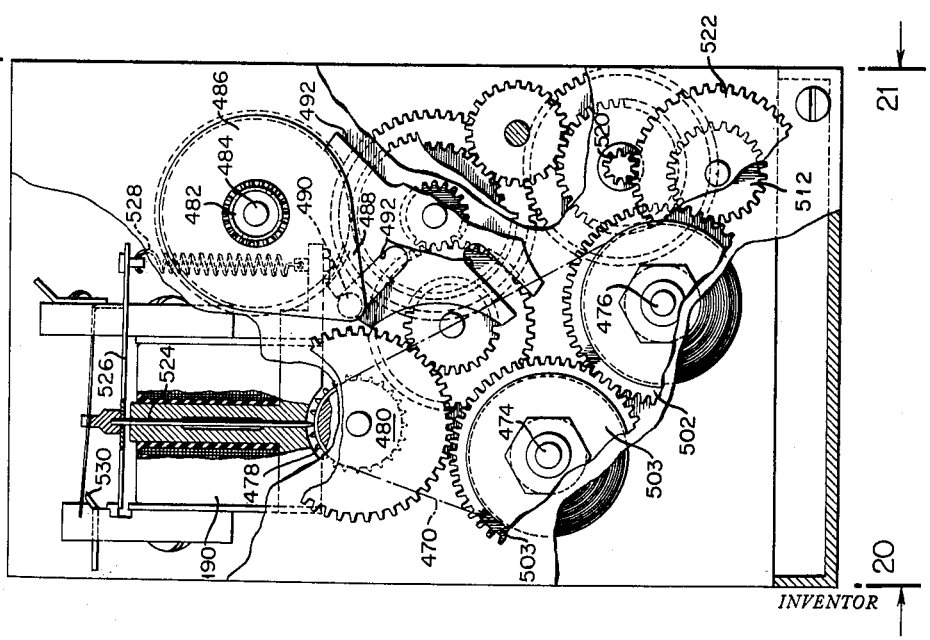

April 3, 1962 P. J. DE GEORGE 3,028,079
NAVIGATION SYSTEM
Filed Dec. 8, 1953 31 Sheets-Sheet 23
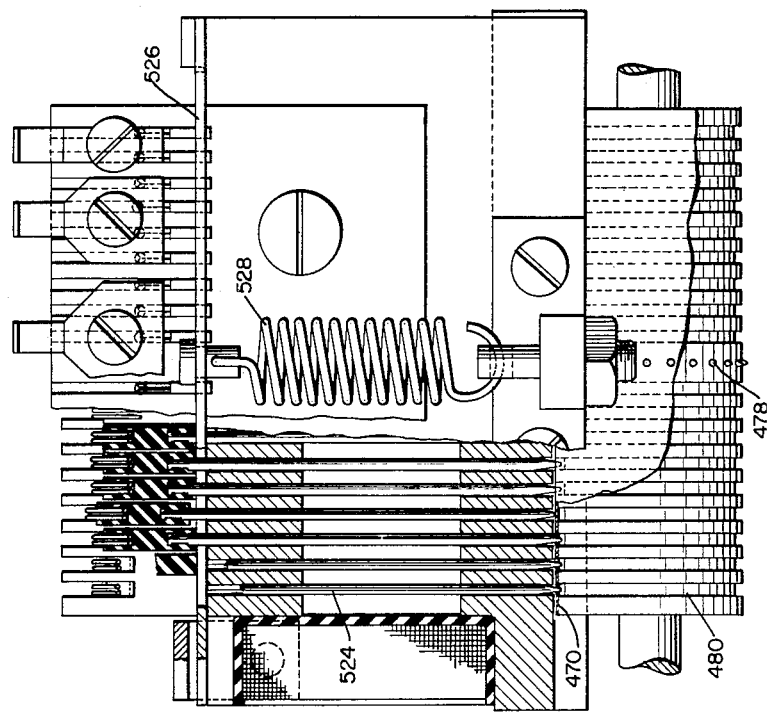
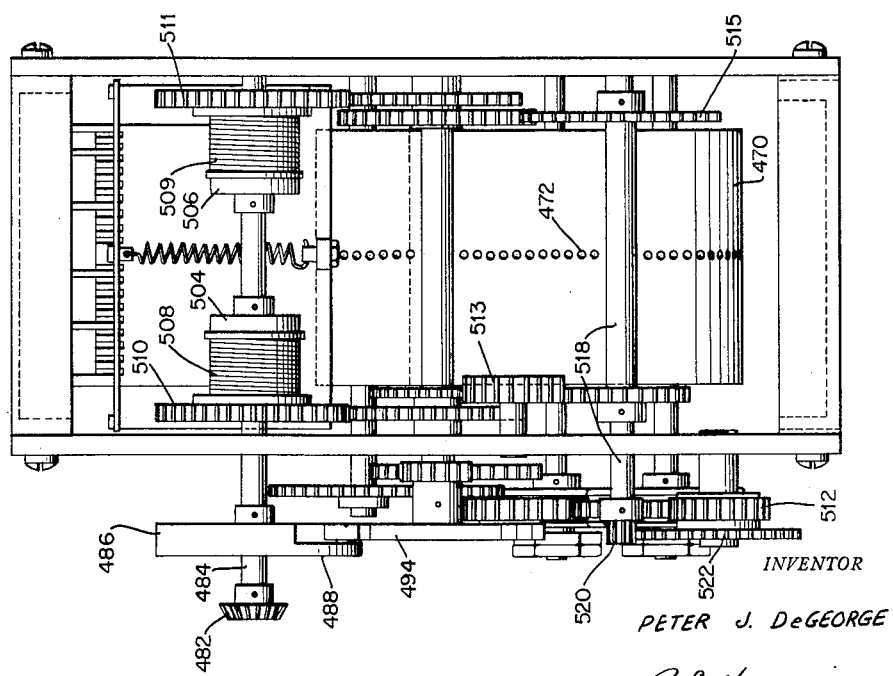
INVENTOR
PETER J. DeGEORGE
BY *P. E. Heaninger*
ATTORNEY

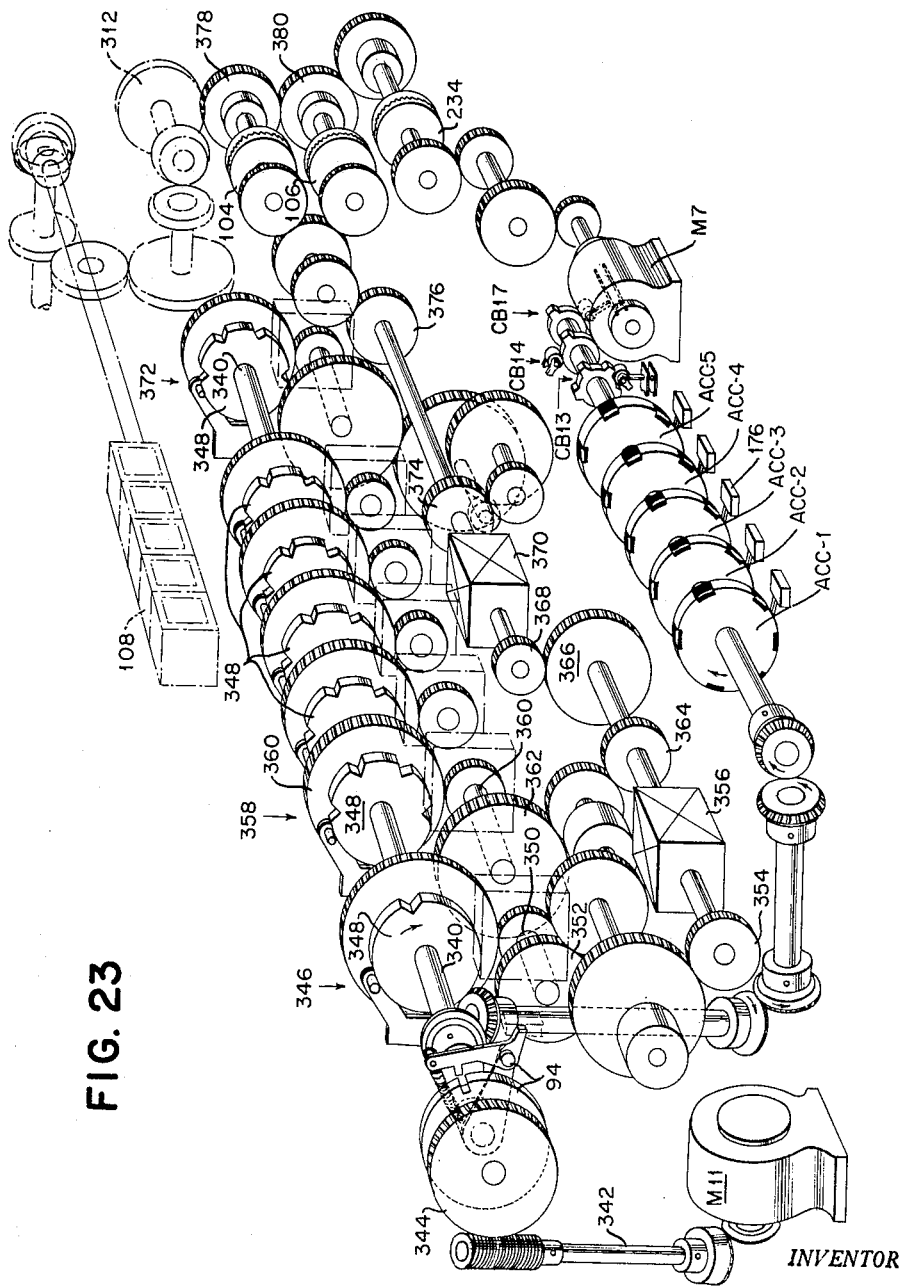

April 3, 1962 P. J. DE GEORGE 3,028,079
NAVIGATION SYSTEM
Filed Dec. 8, 1953 31 Sheets-Sheet 27

INVENTOR
PETER J. DeGEORGE
BY
ATTORNEY

April 3, 1962     P. J. DE GEORGE     3,028,079
NAVIGATION SYSTEM

Filed Dec. 8, 1953     31 Sheets-Sheet 28

*INVENTOR*
PETER J. DeGEORGE
BY

ATTORNEY

April 3, 1962  P. J. DE GEORGE  3,028,079
NAVIGATION SYSTEM

Filed Dec. 8, 1953  31 Sheets-Sheet 29

INVENTOR
PETER J. DeGEORGE
BY P.E. Henninger
ATTORNEY

April 3, 1962 P. J. DE GEORGE 3,028,079
NAVIGATION SYSTEM
Filed Dec. 8, 1953 31 Sheets-Sheet 30

INVENTOR
PETER J. DeGEORGE
BY P. E. Henninger
ATTORNEY

April 3, 1962 P. J. DE GEORGE 3,028,079
NAVIGATION SYSTEM
Filed Dec. 8, 1953 31 Sheets-Sheet 31
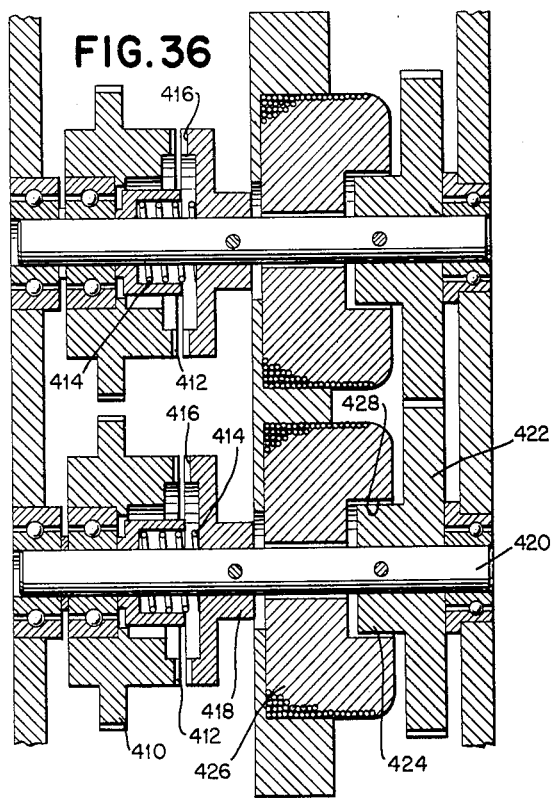
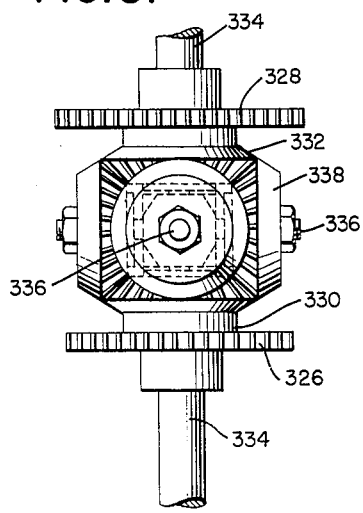
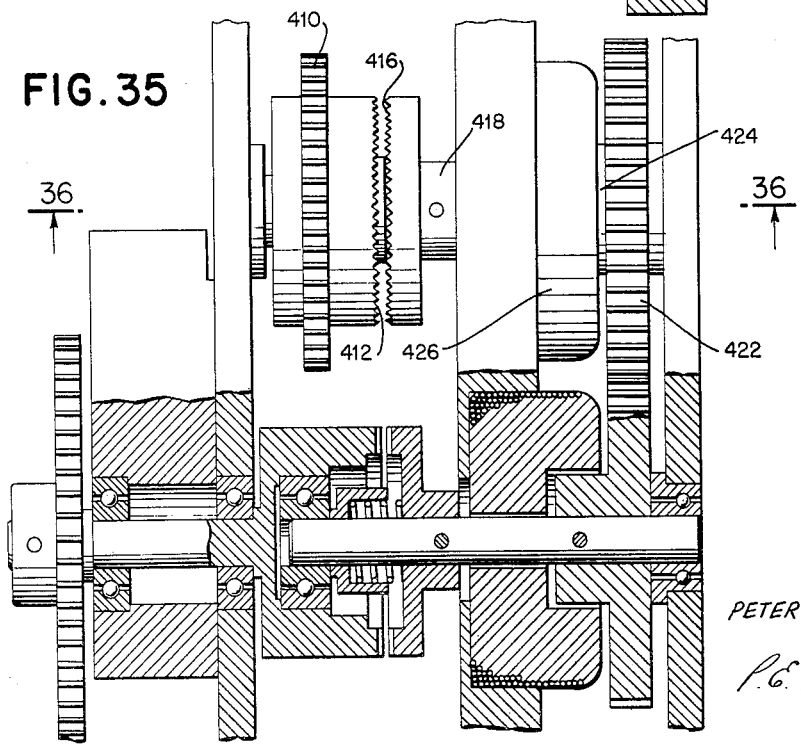
INVENTOR
PETER J. DeGEORGE
ATTORNEY

United States Patent Office 3,028,079
Patented Apr. 3, 1962

3,028,079
NAVIGATION SYSTEM
Peter J. De George, Endicott, N.Y., assignor to International Business Machines Corporation, New York, N.Y., a corporation of New York
Filed Dec. 8, 1953, Ser. No. 396,839
13 Claims. (Cl. 235—61.6)

This invention relates generally to a navigation system and more specifically to a navigation system for use in high speed craft, such as aircraft.

With the high speed now attainable in aircraft travel, it is desirable that a navigation system be able to accomplish the necessary calculations for computing present position with a good degree of accuracy. By using modern equipment which employs some electronic apparatus, a good navigation computer such as that of my invention, makes possible relatively accurate navigation for the high speeds now attainable in aircraft. Whereas, previously these high speeds coupled with high latitude operation rendered accurate navigation relatively very difficult.

The navigation system of my invention makes use of information from an auxiliary computer which is at least partly electronic in nature and from which certain desirable information may be obtained. The details of such a computer are not material to the present invention and this disclosure will not be burdened with a setting forth of such details. Among the information which such a computer supplies is included the north-south and the east-west components of the ground velocity of the craft. Modern electronic equipment makes possible the direct measurement of ground velocity of an aircraft irrespective of the visibility between the craft and the earth. Such equipment is able to produce a voltage which is proportional to the ground velocity of the craft, and this voltage may be resolved into its north-south and east-west components for use in a navigation system such as that of this invention.

The navigation system of my invention, in general, performs the necessary functions to produce an indication of the position of the craft at all times. By making use of the north-south and east-west components of ground velocity mentioned above, and by integrating these velocity components, my navigation system makes a continuous indication which is corrected every half mile of travel in a north-south or east-west direction. This continuously corrected indication is made in the form of two indicators; one for latitude indication, and the other for longitude indication. The latitude indicator may be a counter type of instrument and is designed to register the latitude in degrees and minutes from zero degrees to eighty-nine degrees north and south latitude. The longitude indicator is similar but must be able to indicate longitude in degrees and minutes from zero degrees to one hundred and eighty degrees east and west for obvious reasons.

The system of my invention provides further for setting up a plurality of destinations, which in this instance has been limited to two, since for most purposes this will be sufficient. My system makes provision for latitude and longitude indication for each destination, as well as the present position latitude and longitude of the craft as described above. My system is also able to solve for a great circle course heading which must be followed by the craft in order to fly the great circle course to a selected destination (which is one of the two destinations for which the indicators are available). My system also has provision for solving the necessary problem to determine the correct short range course heading to the selected destination. This short range solution takes effect when the craft is a predetermined distance from a given destination.

My system also provides for a positioning of the cross hairs of a periscope on a ground object by the ability to measure a quantity representing "range" i.e., the distance from a point directly beneath the craft to a point looked at by a sighting system.

My system also provides a means for correcting present position of the craft by obtaining a quantity representing correct "range" from the craft to the point looked at, by use of the sighting system. It will be understood, therefore, that the system enables navigational fixes to be taken on known ground objects.

It is an object of my invention to provide a navigation system of exceptional relative accuracy that will maintain a continuous indication of present position in terms of latitude and longitude.

Another object is to enable a great circle course to be flown to a predetermined destination automatically.

Another object is to provide means for storing on a tape in code the numerical values of the quantity ½ sec $\lambda_p$ (where $\lambda_p$ stands for present latitude) for all latitudes from zero to eighty-nine degrees in one minute steps and for reading the stored value that corresponds with the craft's then present latitude.

Another object is to provide means for transforming a digital representation of travel in an east-west direction into the proper analogue representation in terms of longitude, depending upon the then present latitude of the craft.

Another object is to provide means for taking an analogue representation of velocity and transforming it into a digital representation of distance.

Another object is to teach a new method of computing the magnitude in terms of longitude, of a predetermined distance of travel in an east-west direction. Or similarly computing the magnitude of a variable quantity which depends upon another independent variable for its magnitude under given circumstances.

These and other objects and benefits of my invention will appear as the details of my invention are set forth below.

FIG. 1 is a block diagram indicating the principal components of the navigation system and how they solve the navigation problem;

FIGS. 1a, 1b and 1c are drawings, partly in block and partly in schematic form, which, when taken together, constitute a more detailed representation of the system which is broadly represented in FIG. 1;

FIGS. 2 through 14 are a complete wiring diagram showing all of the major electrical circuits involved in the system, these figures are divided into quadrants for convenience in locating elements;

FIG. 19 is front elevation partly broken away showing the secant storage tape unit;

FIG. 20 is a side elevation partly in section, of the storage tape unit taken from the left side as viewed in FIG. 19 or along the line 20—20 of FIG. 19 looking in the direction of the arrows;

FIG. 21 is a side elevation of the right side of the storage tape unit, or as viewed along the line 21—21 of FIG. 19 looking in the direction of the arrows;

FIG. 22 is an enlarged view partly in section showing the electrical contacts with their actuating pins in conjunction with the tape which determines their actuation;

FIG. 23 is a mechanical schematic in perspective, showing the interrelation of the various elements of the add unit which is part of the longitude section of the navigation system;

FIG. 25a is a mechanical schematic in perspective of one of the mechanically independent servo systems included in the latitude section;

FIG. 25b is a mechanical schematic in perspective of another mechanically independent servo system included in the latitude section;

FIG. 35 is a vertical view partly in cross section of the east-west clutch unit including the additional clutch for setting the longitude indicator;

FIG. 36 is a cross section view taken along the line 36—36 of FIG. 35 looking in the direction of the arrows; and FIG. 37 is a plan view of a type of mechanical differential applicable to the system of my invention.

Figure 1B:
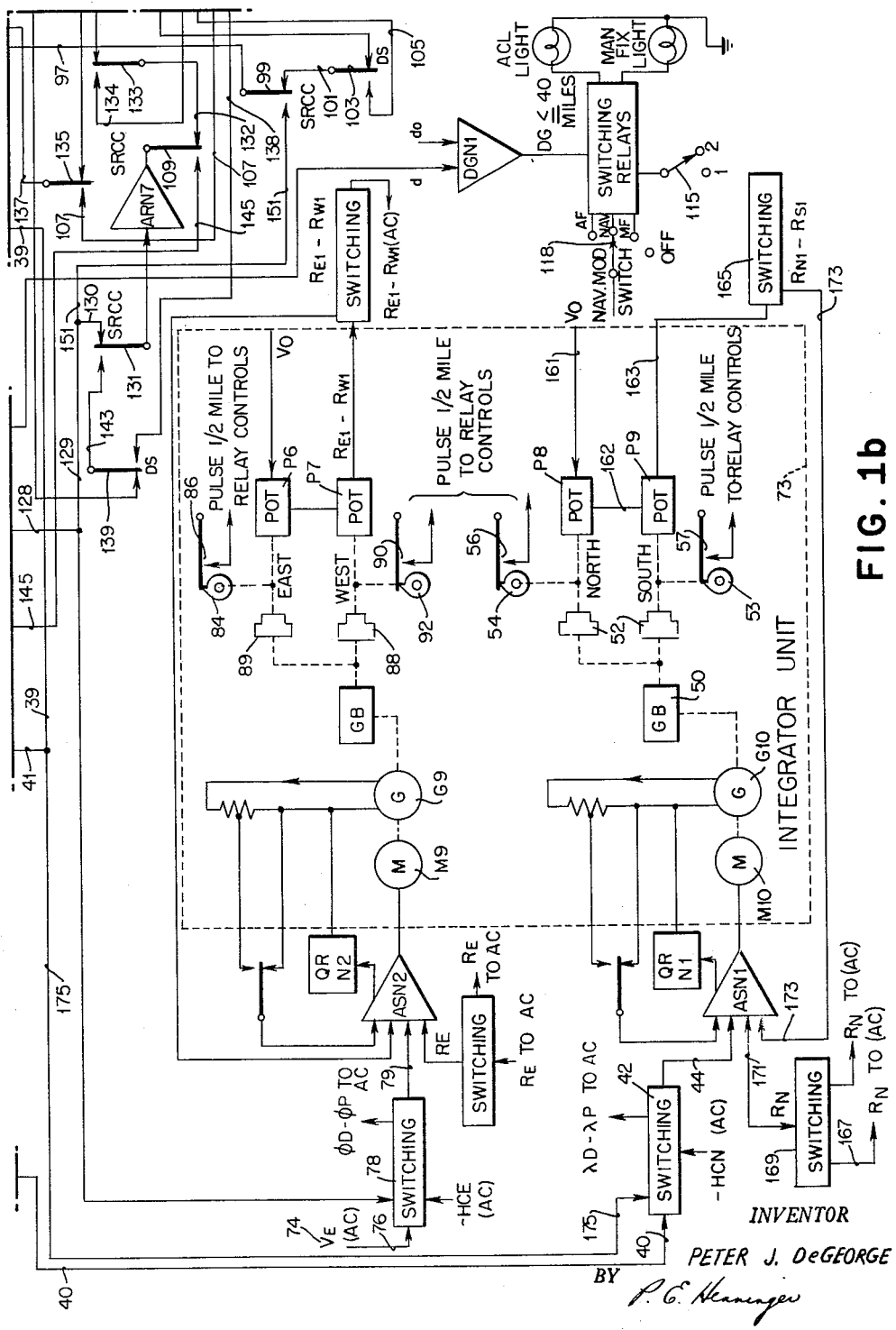
Figure 1C:
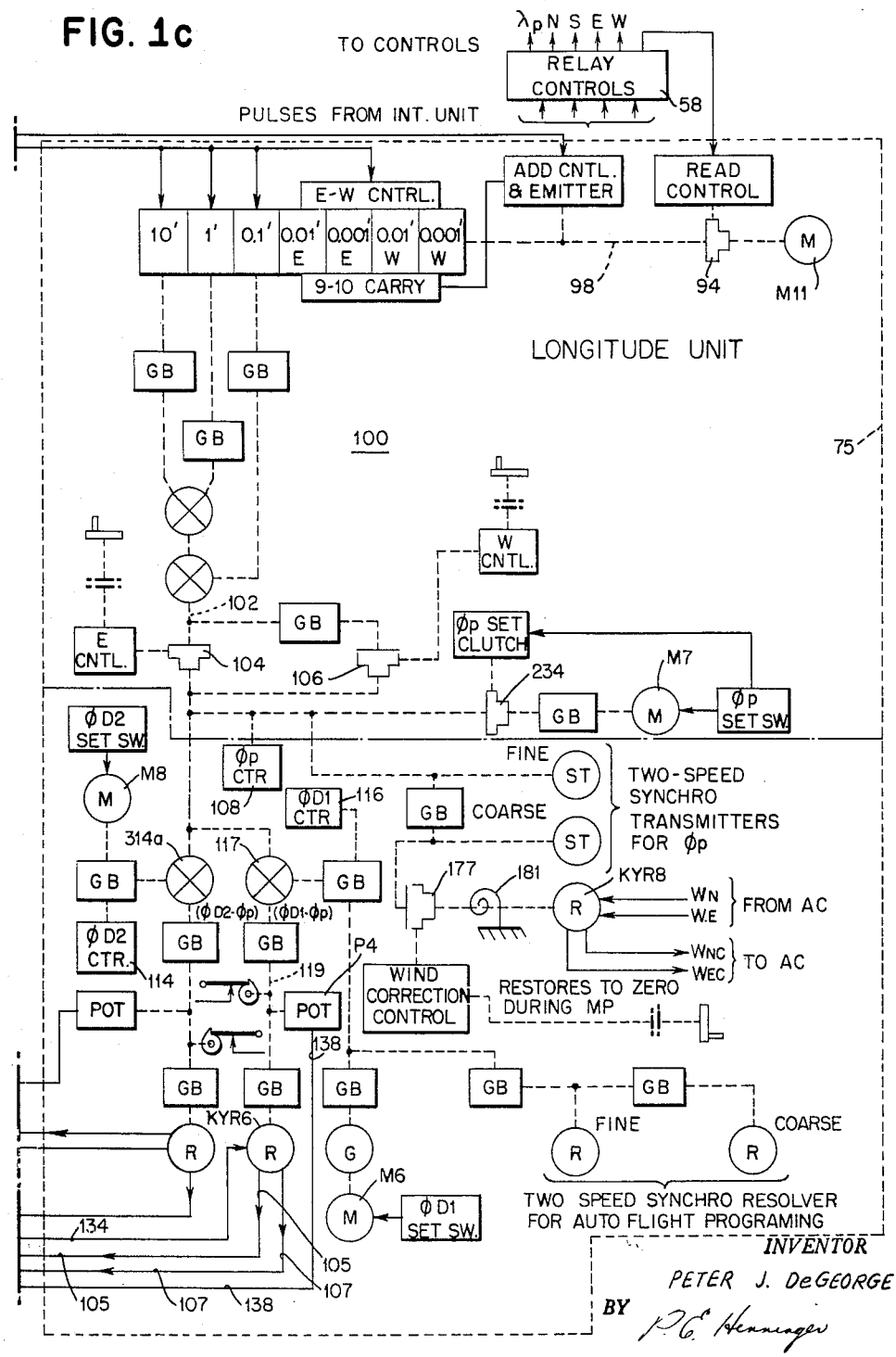

The overall operation of my navigation system can be explained in reference to FIGS. 1a, 1b and 1c. In order to understand my system, it will be necessary to be generally familiar with some of the problems of navigation, and as stated above, it will be appreciated that there is some information which the navigation system of this invention uses which is obtained from auxiliary equipment. The nature of this auxiliary equipment is not material to an understanding of the navigation system of my invention and any means for obtaining the desired information could be employed.

To aid in following the disclosure of the invention an explanation of some of the symbols used is as follows: λ stands for latitude, so that $\lambda_p$ means present latitude, λD means destination latitude, etc. φ stands for longitude, so that $\phi_p$ means present longitude, φD means destination longitude, etc. Other symbols which might not be entirely obvious and which are largely found on FIGS. 1a, 1b and 1c are: GB stands for gear box, CNTL stands for control, POT stands for potentiometer, R on the drawings stands for resolver, DG stands for differential generator, CT stands for control transformer, R as used in the equations stands for range (which generally refers to the distance from the ground point sighted at by the periscope cross hairs, to the ground point directly under the craft).

LATITUDE AND LONGITUDE DETERMINATION

A relatively accurate system of navigation has been accomplished by the system of my invention especially for high speed air craft, and in general terms the means of accomplishing such accurate navigation is as follows.

The following relationships accurately determine present latitude and present longitude:

(1) $\quad \lambda_p = \lambda \text{ start} + \int V_N dt$ (2) $\quad \phi_p = \phi \text{ start} + \int V_E \sec \lambda_p dt$ The Equation 1 may be rewritten in the form:

(3) $\quad \lambda_p = \lambda \text{ start} + \Sigma \Delta R_N$ where $\Delta R_N$ is the increment of travel in a north-south direction.

The Equation 2 may be rewritten in the form:

(4) $\quad \phi_p = \phi \text{ start} + \lim_{\Delta R_E \to 0} \sum \sec \lambda_p \Delta R_E$ where $\Delta R_E$ is the increment of travel in an east-west direction.

(5) $\quad \phi_p \cong \phi \text{ starting} + \sum_{(\Delta R_E = \frac{1}{2} mile)} \frac{\sec \lambda_p}{2}$ Equations 3 and 5 are those which are instrumented by the navigation system of my invention.

A combined analogue digital technique is employed such that a high degree of accuracy results. This is because it is possible to obtain a desired function to a higher degree of accuracy by means of a digital representation and subsequent digital operations, rather than using the conventional analogue means of obtaining a function with its subsequent operations. This will be evident upon a review of the operation of the system. It may be assumed that the craft is flying in a northeasterly direction and for the purposes of the illustration that the travel is more northerly than easterly. Referring to FIG. 1a, there is indicated an input 37 which is represented by $V_N$ and is indicated as coming from the auxiliary computer described above. This input is the north-south component of the ground velocity of the craft which may be obtained from any convenient device which will produce an electric A.C. voltage proportional to this component of the ground velocity of the craft. This voltage will be one phase or the opposite phase depending upon whether the component of ground velocity is in a northerly or southerly direction. This voltage component is introduced at input 37 which leads to a potentiometer P3 where a correction is introduced to this component, for the aspherical condition of the earth's shape. The corrected component voltage then travels via line 40 (FIGS. 1a and 1b) to a switching network 42, which is shown as a box marked "switching," and then over line 44 to a servo amplifier ASN1 which feeds a motor generator set including motor M10 and generator G10. This motor generator set M10-G10 then acts to integrate this component voltage because the motor is running at a speed which is proportional to the amplitude of the voltage component $V_N$, and is running in a direction dependent upon the phase thereof. The integrated signal is then represented by mechanical shaft revolutions. The now mechanical signal is suitably modified by appropriate gearing as illustrated by a schematic gear box 50. The output of gear box 50 drives through a pair of clutches 52 to rotate either a south cam 53 or a north cam 54 exclusively, depending upon which direction the input shaft to the clutches 52 is rotating. Therefore, the various elements will be adjusted so that when the craft is traveling in a northerly direction, the phase of the north component voltage $V_N$ will be such as to cause servo motor M10 to rotate in a direction that will turn cam 54. While if the craft is traveling in a southerly direction the voltage $V_N$ will have the opposite phase so that servo motor M10 will turn the opposite direction and the cam 53 will be turned. In the situation being used by way of illustration, we have assumed that the craft is traveling in a northeasterly direction, and therefore north cam 54 will be rotated until switch contacts 56 are closed which will represent a distance of travel in a northerly direction of one-half mile. The closing of contacts 56 produces an electric pulse which is transmitted to a network of relay controls 58 (FIG. 1c).

The one-half mile pulse from contacts 56 (FIG. 1b) will now be used to trigger a number of related operations which take place in a so-called latitude unit 59 (FIG. 1a) shown enclosed in a dashed line. From the relay control network 58 (FIG. 1c), the one-half mile north pulse is directed to cause a given set of operations including a one revolution clutch 60 (FIG. 1a) to be engaged. This one revolution clutch 60 may be any convenient type of clutch that will perform in the desired manner. We prefer to use one that is latched out of engagement until energized, and then makes one complete revolution and latches itself disengaged again. There is a motor M5 which is constant speed and continuously operating and supplies the necessary power to carry out the various indications and operations accomplished by the latitude unit 59. When the clutch 60 receives a pulse from the relay controls network 58 (FIG. 1c) the motor M5 drives through mechanical connections illustrated by dashed lines and will cause a present latitude indicator 64 which is designated "$\lambda_p$ CTR" to change its indication by one-half minute in either direction depending upon whether the component of travel is in a northerly or southerly direction. Since the output of motor M5 and clutch 60 is not reversible, this reversal of directions is obtained by means of mechanical gearing combined with a pair of clutches 66 and 68 which are controlled electrically from the control network 58 (FIG. 1c). The appropriate clutch will be engaged, depending upon the direction of travel, and by means of the gearing, a reversal of direction of the drive to latitude counter or indicator 64, may be had.

The latitude indication corresponds with the north-south ground travel since each minute of latitude is equal to one nautical mile. However, with respect to the longitude indications there is an extreme variation from the equator to either of the poles such that one minute of longitude at the equator is equal to one nautical mile; but, an infinite amount of longitude angle is covered at the poles. Therefore, some means must be had to translate a one-half mile ground travel in an east-west direction into an indication of the necessary number of degrees of longitude. This may be accomplished by means of making use of the values of the secant of the present latitude. The values of secant present latitude for desired increments may be stored in a tape unit 70 (FIG. 1a). I have found that a desirable degree of accuracy, without impractical equipment, may be obtained by using a tape unit having the desired secant values of latitudes from eighty-nine degrees north to eighty-nine degrees south at one minute intervals. The details of this unit will be described below. The information carried on this tape is in the form of a modified binary coding such that the proper value of the secant divided by two for each minute of latitude is stored. By having the tape unit mechanically connected through a Geneva drive 72, this unit will be correspondingly positioned for every minute of latitude as currently indicated by latitude indicator 64.

Additional equipment is to be found in the latitude unit 59, and its functions and relationships to the system will be described below.

It may be noted at this time that there is a so-called integrator unit 73 (FIG. 1b) which contains the servo motor-generator sets and the mechanical elements driven thereby as indicated by the dashed line enclosing part of FIG. 1b.

A so-called longitude unit 75 is shown enclosed by a dashed line on FIG. 1c. This corresponds to the latitude unit 59 (FIG. 1a) and receives the east-west pulses from the integrator unit 73 via the relay controls unit 58 (FIG. 1c) to control the setting of an indicator 108 corresponding to the present latitude indicator 64 (FIG. 1a). The travel in an east-west direction is indicated in a similar manner as the north-south (as just stated), with the addition of means to supply the necessary change from a unit of travel in the east-west direction to the corresponding longitude change expressed in minutes of longitude. In the case of east-west travel, a voltage component 74 (FIG. 1b) designated $V_E$, is introduced from the auxiliary computer (not shown) in a like manner as the north component voltage. This east velocity component 74 is carried over a line 76 to a switching network 78 and then to a servo amplifier ASN2 over a line 79. The output of amplifier ASN2 actuates a motor generator set M9, G9, and determines the velocity and direction of rotation of this motor. The motor M9 therefore acts to integrate component voltage 74; and after a given number of revolutions, depending upon the mechanical connections, will rotate an east cam 84 to produce a pulse by means of contacts 86, assuming the direction of travel is easterly. If the direction of travel were such that it had a westerly component the east cam 84 would not be rotated since the direction of rotation of the servo motor M9 would be reversed so that a clutch 88 would be engaged instead of clutch 89, to produce a different pulse in a separate circuit by means of another set of contacts 90 which are actuated by a west cam 92.

Whichever pulse is produced it will actuate the relay controls circuit 58 (FIG. 1c) which in turn will determine which of the east or west controls in the longitude unit 75 will be actuated. In the relay controls circuit 58, interlocking action will provide for completing the reading of a unit of travel in either the latitude mechanism or the longitude mechanism exclusively, while the other may be then actuated following the completion of the first reading. Having assumed that the northerly component is greater than the easterly component, the latitude unit 59 will have completed a half mile change as indicated by a one-half minute change at latitude indicator $\lambda_p$ (64), before the longitude unit 75 can indicate its change, which will be due to a one-half mile distance of travel in the east-west direction. The reverse would, of course, be true so that if the one-half mile pulse were received first from the east or the west contacts 86 or 90 then the longitude unit 75 would complete its read cycle before the latitude unit 59 could begin its cycle to indicate a change in present latitude.

The longitude indication change will be effected by an actuation of a read clutch 94 (FIG. 1c). This clutch is similar to one revolution clutch 60 in the latitude unit, and will set in motion when energized, a single revolution shaft driven by a motor M11 which is continuously rotating in one direction only at a constant velocity. The single revolution shaft which is represented by a dashed line 98 in FIG. 1c, produces a sequence of operations in an add unit 100. The elements included in this add unit 100 are those located above the dash-dot separating line about half way up on the dashed line enclosing the longitude unit 75. The function of the add unit 100 is to receive the information from secant tape unit 70 (FIG. 1a) and to translate a unit of one-half mile east-west travel into the proper number of minutes of longitude change. This is accomplished by a combination of mechanical and electrical means, the details of which will be set forth below. The output of this unit is effected at a mechanical shaft 102 which is illustrated by a dashed line in FIG. 1c, and which is connected to one side of each of a pair of clutches 104 and 106, which are arranged to produce a reversal of drive at the output side thereof to which is connected the longitude indicator 108. All of the latitude and longitude indicators are standard type revolution counters which are calibrated and arranged to indicate in terms of degrees and minutes.

In this way, the changes of position of the craft in an east-west direction are continuously followed and indicated at half mile intervals by means of the system as generally described. It will now be evident that a half mile change in an east-west direction will cause a change in the longitude indication in minutes by an amount equal to one-half sec $\lambda_p$. In order to accomplish this, the values of one-half of the secant of the present latitude of the craft, are obtained from the tape unit 70 and used to modify the indicated present longitude in accordance with the integrated increment of east-west travel in order to correctly indicate present longitude.

GREAT CIRCLE COURSE DETERMINATION

In addition to indicating present position latitude and longitude, the navigation system has incorporated therein means for obtaining the necessary heading to take a great circle course toward a predetermined destination. In order to accomplish this with a desired degree of flexibility, there is set up means for indicating the latitude and longitude positions of two separate destinations. The indicators for these destinations may be found illustrated in FIGS. 1a and 1c where an indicator 110, which is designated "$\lambda D_2$ CTR," indicates the latitude for one destination while an indicator 112 designated "$\lambda D_1$ CTR" indicates the latitude of another destination. In like manner, in FIG. 1c, there is illustrated a destination longitude indicator 114 designated "$\phi D_2$ CTR" and another indicator 116 for the other destination, it being designated "$\phi D_1$ CTR." So long as the position from the craft to a desired destination as set up on indicators 112 and 116 for example, is greater than the predetermined angle (which may be in the order of three degrees of latitude and of longitude), the required heading for a great circle course may be determined by means of the system in a manner now to be generally described. The distance of the craft from both these predetermined destinations in latitude and in longitude is mechanically indicated by the output of differentials, e.g. a differential 117 connected to the present longitude indicator 108 and to the $\phi D_1$ indicator 116 to give a difference output rotation on a mechanical connection 119 which positions a potentiometer P4 and a resolver KYR6.

To set the system up for navigating a great circle course to the predetermined destination set up on the indicators $\lambda D_1$ (112) (FIG. 1a) and $\phi D_1$ (116) (FIG. 1c), a navigation mode switch 118 (FIG. 1b) will be set to position 1 which will determine the proper switching necessary by means of relays and control circuits. These will be described in greater detail below. It will be clear from a knowledge of navigation that the problem to be solved in order to obtain the error signal which is necessary to correct the heading for maintaining the great circle course, is the following:

(6) $\qquad he = hgtar - hgta$ where (7) $\qquad hgta = h + \sigma$ in which $he$ = heading error
$hgtar$ = heading (ground track angle required)
$hgta$ = heading (ground track angle)
$h$ = heading
$\sigma$ = stands for drift angle The heading for the ground track angle required is represented by the expression:

(8)
$$hgtar = \tan^{-1} \frac{\cos \lambda D \sin (\phi D - \phi_p)}{\cos \lambda_p \sin \lambda D - \sin \lambda_p \cos (\phi D - \phi_p) \cos \lambda D}$$

SOLUTION OF EQUATION 8

The solution of Equation 8 is obtained from the system as follows: A given amplitude and frequency A.C. voltage is applied to one stator winding of a resolver KYR1 (FIG. 1a), while the rotor is positioned at an angle corresponding to the selected destination's latitude ($\lambda D_1$). The resolvers used in the system are well known electrical rotary devices having two stator windings the fields of which are at right angles to one another, but which may be used singly as well as together. The resolvers also have two rotor windings which are effectively at right angles to one another. Therefore, the signals generated in the rotor windings of the resolver KYR-1 correspond to the quantities $\sin \lambda D_1$ and $\cos \lambda D_1$. The $\sin \lambda D_1$ signal is fed to a resolver amplifier ARN1, via a line 125 and a destination select switch 126 (now closed for this circuit), and then to one stator winding of a resolver KYR3. The rotor of resolver KYR3 is mechanically connected as illustrated so that it is angularly positioned corresponding to $\lambda_p$ (present latitude).

The $\cos \lambda D_1$ signal is fed to a resolver amplifier ARN7 (FIG. 1b), via a line 111 to another destination select switch 127 (now closed), and lines 128, 129 and 130 to a switch 131, and then directly to the amplifier ARN7. From the amplifier ARN7 the signal goes to a switch 109, then over a line 132 to a switch 133 (now closed to the left), then over a line 134 (FIGS. 1b and 1c) to one stator winding of the resolver KYR6 (FIG. 1c). The rotor of this resolver KYR6 is angularly positioned by the output of differential 117 and corresponds to $\phi D_1 - \phi_p$ (the difference between the longitude of the destination and of present position).

By taking the correct one of the rotor windings of the resolver KYR6 the signal output will represent $\cos \lambda D_1 \cos (\phi D_1 - \phi_p)$, and then this signal will be fed over a line 107 to a switch 135 (now closed), and then over a line 137 (FIGS. 1b and 1a) to a resolver amplifier ARN4, and then directly to another stator winding of the resolver KYR3.

The other rotor winding of the resolver KYR6 will produce a signal output representing $\cos \lambda D_1 \sin (\phi D_1 - \phi_p)$. This signal will be fed over a line 105 to a switch 103 (now closed) and then over a line 101 to another switch 99. Then from switch 99 over a line 97 (FIGS. 1b and 1a) to a resolver amplifier ARN5 (FIG. 1a), and from there directly to one stator winding of a tangent resolver KYR5.

By exciting the two stator windings of the resolver KYR3, the signal output on one rotor winding will represent the difference of the signals in that winding multiplied by the correct functions. The combined signal output will represent the quantity $\cos \lambda_p \sin \lambda D_1 - \sin \lambda_p \cos \lambda D_1 \cos (\phi D_1 - \phi_p)$. This combined output signal will be fed over a line 93 to a switch 91, and then over a line 87 to a resolver amplifier ARN6, and from there directly to the other stator winding of the tangent resolver KYR5.

Now that the quantities representing the numerator and denominator of the arctan quantity as set forth in Equation 8 above, applied to the two stator windings of the tangent resolver KYR5, the angle itself is determined by the standard technique for such a determination which involves the following procedure: The signal from one of the rotor windings of tangent resolver KYR5 is fed over a line 85 to one of the inputs of a servo amplifier ASN3, and from there directly to a servo motor M3. The servo motor M3 is mechanically connected to the rotor of the tangent resolver KYR5 and drives this rotor to a null or minimum signal position which represents the required arctangent.

Some of the usual auxiliary equipment for servo systems is to be found in connection with the servo motor M3. This equipment includes a tachometer generator G3 which feeds back a signal to one of the inputs of servo amplifier ASN3. The field of generator G3 is fed by a signal from the other rotor winding of the tangent resolver KYR5 after such signal is amplified in a tachometer amplifier ATN2. There is an additional feed back signal which is introduced at another of the three inputs to the servo amplifier ASN3; this additional signal is taken from a quadrature rejection network QRN3 which is merely a motor driven potentiometer that acts to reject undesired quadrature components of the desired A.C. servo signals involved. Each of the servo motors involved in the navigation system includes in its servo system these same auxiliary members so that this detailed explanation of these members will not be repeated.

SOLUTION OF EQUATION 7

In order to solve Equation 7, the drift angle $\sigma$ must be determined, and by using information from the auxiliary computer, two component voltages entitled "Vc" and "Vp" are obtained in the auxiliary computer and represent two components of the ground track velocity of the craft. Vp is the component in the direction the plane is heading, while Vc is the component at right angles thereto. Referring to FIG. 1a, it will be noted that the component voltage Vp is introduced to a resolver amplifier ARN2 by way of a line 80. From here this signal voltage is carried directly to one stator winding of a resolver KYR4. The other component voltage Vc is introduced to a resolver amplifier ARN3 by way of a line 71 and then to the other stator winding of resolver KYR4. The drift angle $\sigma$ is then determined in the same manner as descrebd above, but using tangent resolver KYR4, and involves the use of a servo motor for positioning the rotor of the resolver. The elements involved in this determination are a servo motor M2, which has attached thereto the usual tachometer generator G2 and employs a quadrature network QRN4. The output of one of the rotor windings of resolver KYR4 is fed over a line 65 to an input of servo amplifier ASN4 and from there directly to the servo motor M2. As before, the other rotor winding of resolver KYR4 is connected by a line 63 to the input of a tachometer amplifier ATN1 and from the output of this amplifier directly to the field winding of the tachometer generator G2. The other winding of tachometer generator G2 feeds directly to another input of servo amplifier ASN4 over a line 61. The servo motor M2 then drives the rotor of resolver KYR4 to a position of null or minimum signal which then represents the angle whose tangent is represented by the two components which were fed to the stator windings of the resovler KYR4. In this case, this angle represents the drift angle $\sigma$, and the same shaft, or some other direct mechanical connection from the servo motor M2, is carried to the rotor of a differential generator KDG1. Electrical signals from the auxiliary computer representing the heading of the craft are introduced over a line 55 to the stator windings of the differential generator KDG1. The differential generator KDG1 is a standard element in servo systems for introducing angular position change, or differential, between a servo transmitter and the servo receiver which is connected thereto. For this reason, the output of differential generator KDG1 may be fed over an electrical circuit represented by a line 51 to a control transformer B$x$CT1, which is in effect a servo receiver, and which has the usual three phase type of windings in its stator and has a single rotor winding. It will now be evident that the output of differential generator KDG1 represents the expression $h+\sigma$ and therefore the Equation 7 has been solved and is represented by the electrical input to the control transformer B$x$CT1.

SOLUTION OF EQUATION 6

Now it will be understood that the solution of Equation 6 is readily available as the electrical output signal of the control transformer B$x$CT1. This is because the input to the stator windings of control transformer B$x$CT1 represents the expression *hgta*, while the angular position of the rotor of control transformer B$x$CT1 represents the expression *hgtar*, and therefore the electrical output of the control transformer B$x$CT1 represents the difference between *hgtar* and *hgta* which difference is the desired heading error (*he*) and this signal is fed over a line 47 to the automatic pilot of the craft. It will be evident that when there is no signal, or when the output control transformer B$x$CT1 is at a minimum, the desired heading for maintaining a great circle course is being maintained.

SHORT RANGE COURSE HEADING

Whenever the destination as set up on one of the two sets of destination indicators, is closer than a predetermined angle of latitude and longitude, a short range course heading may be determined. Because the great circle course computation cannot be instrumented satisfactorily for short ranges, a short range course computer is utilized to solve the following equations:

(9) $\qquad he = h(gtar)_{SR} - hgta$ where the same symbols are used as were used above in the great circle course problem, and where $(gtar)_{SR}$ = ground track angle required —short range.

From spherical trigonometry Equation 8 reduces to

(10) $\qquad h(gtar)_{SR} = \tan^{-1} \dfrac{(\phi D - \phi_p) \cos \lambda D}{\lambda D - \lambda_p}$ when $\phi D - \phi_p \leqq 3°$ and when $\lambda D - \lambda_p \leqq 3°$.

SOLUTION OF EQUATION 10

Whenever the difference between the craft's present position in both latitude and longitude and the corresponding latitude and longitude of a selected destination is less than a predetermined amount, as determined by cam actuated switches from the output shafts of the differentials e.g. differentials 117 and 120 (FIGS. 1c and 1a), then relay controls are actuated to set up certain circuits for determining the necessary information to solve the short range course problem. Therefore, when the navigation mode switch 118 is connected to its "navigation" position and the destination is within the predetermined range, potentiometers, e.g. potentiometers P4 and P1, will be connected into the circuits to introduce signals representing the differences in latitude and longitude. Assuming the destination select switch 115 (FIG. 1b) is set to position 1 for selecting destination $D_1$, the solution of Equation 10 will be as follows: The signal output from the latitude potentiometer P1 which represents $\lambda D_1 - \lambda_p$ will be carried over a line 45 to a switch 43 (now closed) and from there over a line 41 (FIGS. 1a and 1b) and a line 39 (FIGS. 1b and 1a) to the switch 91 (now closed). Then from switch 91 over the line 87 to the resolver amplifier ARN6 and from there directly to one stator winding of the tangent resolver KYR5.

The signal from the longitude potentiometer P4 (FIG. 1c) which represents $\phi D_1 - \phi_p$, is fed over a line 138 (FIGS. 1c and 1b) to a switch 139 (now closed) and then over a line 143 to the switch 131 (now closed) and then directly to the resolver amplifier ARN7. From there the signal is fed via the switch 109 (now closed to the left as viewed in FIG. 1b) and a line 145 (FIGS. 1b and 1a) to a switch 147 (now closed to the right as viewed in FIG. 1a). Then the signal continues over a short line 149 to a switch 150 (now closed) and then directly to a stator winding of the resolver KYR1. The rotor of this resolver KYR1 is positioned in rotation corresponding to $\lambda D_1$, so that the output of the correct one of the rotor windings of resolver KYR1 represents $(\phi D_1 - \phi_p) \cos \lambda D_1$.

The signal representing $(\phi D_1 - \phi_p) \cos \lambda D_1$ is fed from resolver KYR1 over the line 11 to the switch 127 (now closed) and then over the line 128 (FIGS. 1a and 1b) and the line 129 and a line 151 to the switch 99 (now closed). Then it continues over the line 97 (FIGS. 1b and 1a) to the resolver amplifier ARN5, and then directly to the other stator winding of the resolver KYR5.

In the same manner as above, the servo motor M3 connected to the resolver KYR5 will drive the rotor of the resolver to an angular position representing the arc-tangent which is the solution of Equation 10.

SOLUTION OF EQUATION 9

To determine the heading error the same procedure is followed using the same equipment, as was used above in connection with the great circle course heading determination. The only difference is that the angular position of the rotor of the resolver KYR5 now represents the different expression involved in the short range course heading determination. The final output signal from the rotor winding of the control transformer BxCT1 is fed to the automatic pilot as before.

AUTOMATIC CROSSHAIR POSITIONING

Use may be made of the navigation system to perform numerous related operations such as to solve the computations involved in automatically positioning the crosshairs of the periscope on a predetermined destination. This function is of major importance in target recognition.

It should be noted that in the integrator unit 73 (FIG. 1b) there are four potentiometers P6, P7, P8 and P9 one on each of the East, West, North and South outputs, which are also driving the corresponding cams 84, 92, 54 and 53. These potentiometers produce a signal that is proportional to the distance traveled in the north, south, east and west directions between each unit of travel of one-half mile in each of these directions. That is, if something less than one-half mile has been traveled in any one of the four directions an electrical signal from one of the potentiometers will be produced that is proportional to such distance, from zero (coinciding with a one-half mile pulse) to maximum just as another one-half mile pulse is reached.

Two equations that must be solved to determine the position of the crosshairs of the periscope in the north-south direction and in the east-west direction are the following:

(11) $(\lambda D_1 - \lambda_p) + (R_{s1} - R_{n1}) + (-R_n) = 0$
(12) $(\phi D_1 - \phi_p) \cos \lambda D_1 + (R_{w1} - R_{e1}) + (-R_e) = 0$ where $\lambda D_1$, $\lambda_p$, $\phi D_1$ and $\phi_p$ are the same destination and present position latitudes and longitudes as used above in the prior description; and where:

$R_{s1}$ = the south component of distance travelled by the craft since the last pulse from the contacts controlled by south cam 53, as indicated by potentiometer P9.

$R_{n1}$ = the north component of distance travelled by the craft since the last pulse from the contacts 56 controlled by north cam 54, as indicated by potentiometer P8.

$R_{w1}$ = the west component of distance travelled by the craft since the last pulse from the contacts 90 controlled by west cam 92, as indicated by potentiometer P7.

$R_{e1}$ = the east component of distance travelled by the craft since the last pulse from the contacts 86 controlled by the east cam 84, as indicated by potentiometer P6.

$R_n$ = the range north, i.e. the north-south component of the range. The range being the distance from the ground point sighted at by the periscope crosshairs and the ground point directly under the craft.

$R_e$ = the range east, i.e. (similarly) the east-west component of the range.

Since the view is limited toward the horizon and also the accuracy of sighing any ground object becomes relatively poor, the relay controls system 58 (FIG. 1c) does not set the whole navigation system up for performing the operation of automatically laying the crosshairs, unless the distance to go to a preselected destination is less than a predetermined distance, e.g. forty miles.

The solution of Equation 11 involves the use of a servo loop and other equipment located in the auxiliary computer where the servos for positioning the periscope also are located. Therefore, the solution of Equations 11 and 12 will be only generally indicated without reference to any specific equipment other than that located in the navigation system. It will suffice to point out that the quantities $(\lambda D_1 - \lambda_p)$ and $(R_{s1} - R_{n1})$ are obtained from the navigation system as follows: A signal representing $\lambda D_1 - \lambda_p$ is obtained from the potentiometer P1 (FIG. 1a) as previously. A signal representing $R_{s1} - R_{n1}$ is obtained by feeding a given voltage to the north potentiometer P8 (FIG. 1b) over a line 161 and then the output of this potentiometer (which represents $R_{n1}$) is fed in series with the output of the south potentiometer P9 over a line 162 leading to potentiometer P9 and then over a line 163 to switching circuits, shown as a box 165. The difference between $R_{s1}$ and $R_{n1}$ is thus obtained. These two signals are then fed to the auxiliary computer where they are added together and the $R_n$ quantity is subtracted to produce a null condition in a servo loop that drives the periscope crosshairs to a corresponding position, i.e. the auxiliary computer is slaved to the navigation system.

The solution of Equation 12 is similar to that of Equation 11 just described. The quantity $(\phi D_1 - \phi_p) \cos \lambda D_1$ is obtained as an output of the resolver KYR1 (FIG. 1a) which is angularly positioned in $\lambda D_1$ so that one of its rotor windings will produce a signal representing $\cos \lambda D_1$, while the input to a stator winding of this resolver will be the signal from the potentiometer P4 (FIG. 1c) which represents $\phi D_1 - \phi_p$. The remainder of the solution is the same as for Equation 11 only using east and west potentiometers P6 and P7 (FIG. 1b) respectively.

AUTOMATIC FIX TAKING

In order to obtain an automatic fix, the relationships to be solved are exactly the same as those which were solved in connection with automatic crosshair positioning, namely, the Equations 11 and 12 above. In this instance, however, the situation is reversed and the navigation system is slaved to the auxiliary computer. In taking a fix, the crosshairs will be manually positioned to sight upon a known ground object. The $R_n$ signal which results from this manual positioning of the crosshairs will now be fed from the auxiliary computer over a line 167 (FIG. 1b) to a switching network 169. From the switch network, the signal then is carried over a line 171 to one input into the servo amplifier ASN1. The other inputs to the servo amplifier ASN1 will be the remaining two quantities $(\lambda D_1 - \lambda_p)$, and $R_{s1} - R_{n1}$. These two quantities will have been obtained in the same manner as was described above with regard to automatic crosshair positioning, and by means of a change in the switching, the quantity $(R_{s1} - R_{n1})$ will be fed out of the switching network 165 via a line 173 to the input of servo amplifier ASN1. At the same time the quantity $$(\lambda D_1 - \lambda_p)$$

will be fed from the potentiometer P1 (FIG. 1a) over the line 45 and contacts of switch 43 (now closed) to the line 41 (FIGS. 1a and 1b) and a line 175 (FIG. 1b) leading to the switching network 42, and from there over the line 44 to another input to servo amplifier ASN1.

The three quantities which make up inputs to servo amplifier ASN1 will be summed up in the proper manner in this amplifier so that the output will cause the motor generator set M10, G10, to be driven until present latitude is correct at which time the Equation 11 will be satisfied. In this manner the indication of present position latitude will be automatically corrected with reference to the latitude of the known ground object which was looked at with the sighting system.

In a similar manner the solution of Equation 12 for obtaining an automatic fix will involve the integrator servo motor M9, the inputs to its servo amplifier ASN2, and the instrumentation necessary to change present longitude. The details of this operation need not be reviewed since they are in all respects similar to the operation for the latitude fix taking involved in the solution of Equation 11.

OTHER OPERATIONS ACCOMPLISHED BY THE NAVIGATION SYSTEM

It will be clear that there are further operations which may be accomplished by means of the navigation system of my invention, among which is that of taking a manual fix. Such operations as taking a manual fix and setting the latitude and longitude counters manually, will be obvious upon a complete understanding of the elements involved in our whole navigation system.

WIND CORRECTION

An auxiliary operation that warrants some explanation is the wind correction for high latitudes. When a wind vector has been determined for a given position, this same vector is no longer accurate for a different position even if the wind remains the same, because the vector changes its relationship to the north pole due to east-west travel.

The mathematical solution of the problem is as follows:

(13) $W_{NC} = W_N \cos X - W_E \sin X$
(14) $W_{EC} = W_E \cos X + W_N \sin X$ where $X = \Delta\phi \sin \lambda$ and $\Delta\phi$ = the change in longitude from last determination of the wind.

On the basis that $\sin \lambda \cong 1$ above 50° latitude, $\Delta\phi \sin \lambda \cong = \Delta\phi$ and therefore Equations 13 and 14 may be rewritten as

(15) $W_{NC} = W_N \cos \Delta\phi - W_E \sin \Delta\phi$
(16) $W_{EC} = W_E \cos \Delta\phi + W_N \sin \Delta\phi$ This error is not of any consequence except at high latitudes, however, and there is provided a cam operated circuit breaker which is closed at a predetermined latitude, e.g. fifty degrees. The cam is directly connected mechanically to the shaft that represents present latitude ($\lambda_p$). The closing of this switch sets up the circuits so that a wind clutch 177 (FIG. 1c) will be actuated to connect the rotor of a resolver KYR8 into a driving connection with the shaft indicating present longitude. At each memory point, i.e. when a new wind vector is determined, the clutch 177 will be released and a spring 181 will return the resolver to a zero or no correction position. This resolver KYR8 then acts to receive signals representing the north-south and the east-west components of the wind vector as indicated by "$W_N$" and "$W_E$" in FIG. 1c. These component signals are introduced to the resolver KYR8, while the corrected vector components are fed out from the resolver KYR8 back to the auxiliary computer as indicated by the symbols "$W_{NC}$" and "$W_{EC}$" which stand for the corrected component signals representing the two components of the wind vector. These corrected components then are used in determining the proper heading for a desired course with taking into account the wind. All such determination is carried out in other equipment outside the navigation system of my invention.

There are two additional cam operated switches driven by the present latitude shaft. These are designated SW-8 and SW-7 (FIG. 3). Switch SW-8 is closed when present latitude reaches eighty-nine degrees, and this controls circuits to disable the longitude unit so long as any latitude over eighty-nine degrees is maintained. Switch SW-7 is closed when a present latitude of seventy-five degrees is reached. This switch controls a circuit for a light or other indicator to give a warning that only manual fixes should be taken while the latitude is at or above this level.

DETAILED ELECTRIC CIRCUIT OPERATION

The complete circuit diagram for my navigation system is illustrated in FIGS. 2-14 of the drawings. In these drawings certain elements are repeated more than once in order to avoid confusion caused by crossing of circuit lines. A computer relay box 136 is a prime example of this repetition. A number of the elements are labeled to aid in following the various operations. The terminology and symbols follow that used heretofore in setting forth the general operation.

LATITUDE UNIT

The operation of the circuit will be described in reference to the necessary figures of the drawing and will be first confined to the operation of the part which may be called the latitude unit. This latitude unit is that portion which is instrumental in accomplishing the following functions: to compute the present latitude, to determine the latitude of the next two destinations, to furnish the secant of the present latitude, and to perform all trigonometric operations involving either present or destination latitude for use in the computation of the great circle or short range course.

PRESENT LATITUDE

Figure 4:
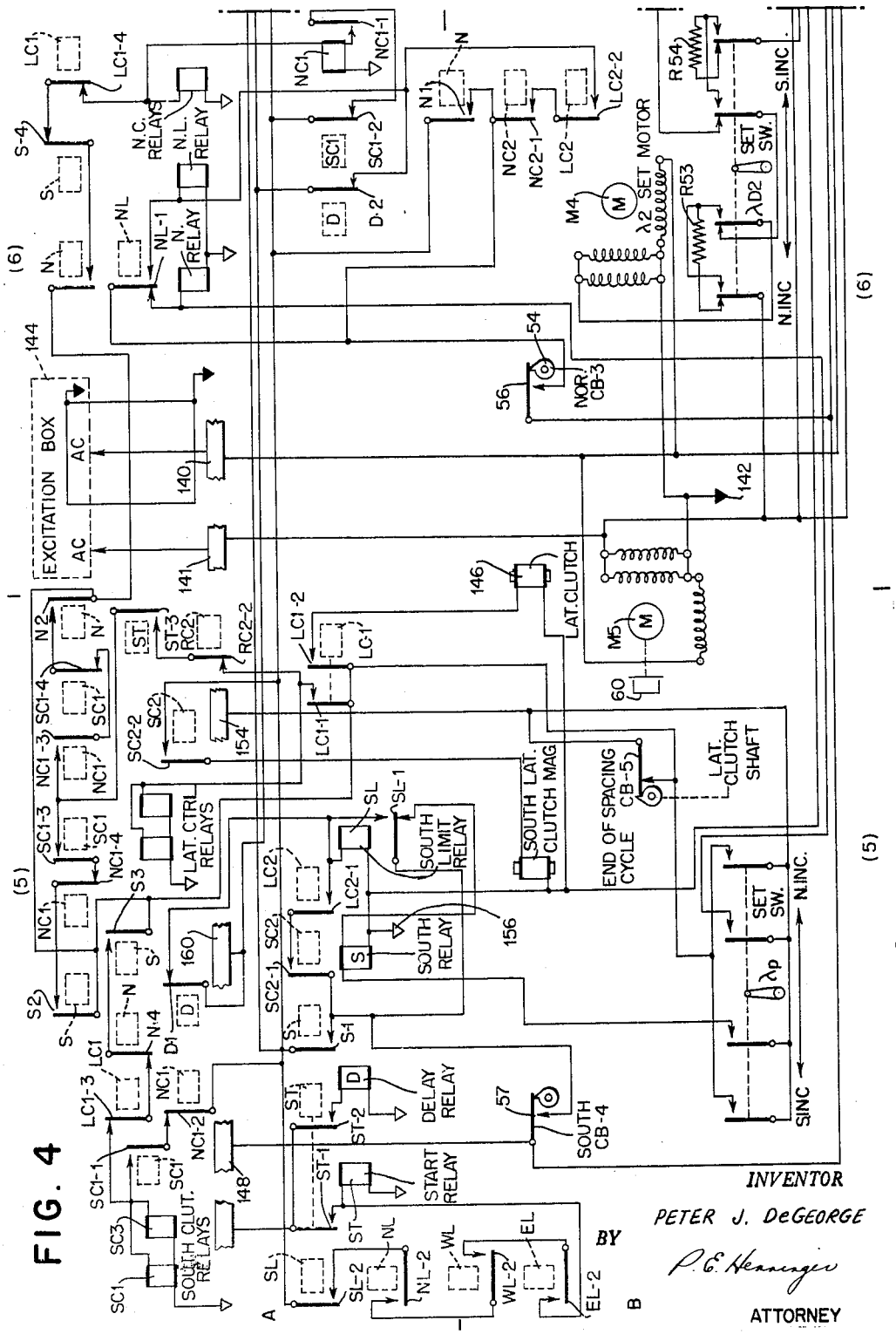

Referring first to FIG. 4, the present latitude which is continuously indicated by the $\lambda_p$ indicator 64 (FIG. 1a) is mechanically connected to the drive motor M5 (FIGS. 1a and 4). Motor M5 is a constant speed continuously running two phase alternating current motor that is connected to each of two alternating current bus bars 140 and 141, one for the windings of each phase, while the opposite ends of both of the two phase windings are connected to an alternating current ground connection 142 as illustrated. Bus bars 140 and 141 are excited from an excitation box 144 which contains any appropriate means for producing the desired excitation voltages. Motor M5 drives through the one revolution clutch 60 to cause the various operations that have been generally described above. A mechanical reduction may be effected between the shaft of motor M5 and the driven side of clutch 60. The actuation of clutch 60 is controlled by a latitude clutch magnet 146. This clutch magnet 146 is energized by a circuit under control of one of the ½ mile pulse contacts 56 or 57 controlled by its corresponding cam 54 or 53. As described above, the north or south cams will be alternatively driven depending upon the direction of rotation of the integrator servo motor M10 (FIG. 8) and the first of these cams to be driven for a complete revolution will close its contact 56 or 57 (FIG. 4) as the case may be. Assuming that north cam contact 56 makes first, a circuit will be completed from a direct current bus bar 148, over a readily traceable circuit via contacts 56 of north circuit breaker CB3 and contacts NL-1, to one side of a north relay coil N, the other side of which relay is connected to a D.C. ground connection 152.

It is to be noted that a convention is employed which illustrates all of the circuits with the relay contacts in their de-energized positions, throughout, the contacts being a two position type that are mechanically biased to the position that is illustrated.

When the north relay N is energized, a set of interlocking circuits is so set into operation that an indication of a change in latitude will be initiated along with a positioning of the secant tape unit 70 (FIG. 1a), while preventing undesirable operations or repetitions. These operations may be traced as follows: Contacts N-3 of north relay N complete a circuit to energize a pair of relays designated north clutch relays and marked NC1 and NC2. This circuit may be readily traced from D.C. bus bar 154 to "end of spacing cycle" circuit breaker contacts CB5 (which will now be closed as shown, because a cycle of indication, etc., will have ended with a complete revolution of the output side of latitude clutch 60). The circuit then continues directly to contacts N-3 of north relay N without crossing any switch contacts, and from there over closed contacts S-4 of a south relay S and closed contacts LC1-4, to one side of each of the north clutch relays NC1 and NC2 in parallel. The other side of each of these relays is connected to ground as shown.

Energization of the north clutch relays NC1 and NC2 accomplishes three main functions (1) allows the latitude control relays LC1 and LC2 to operate by closing a circuit which may be traced from D.C. bus bar 154, over spacing cycle contacts CB–5, to now closed contacts N–2 of north relay N, to closed contacts SC1–4 of south clutch relay SC1, to the contacts NC1–3 of north clutch relay NC1 which is setting up this circuit, to the now closed contacts ST–3 of starting relay ST (which will be energized upon preparing to use the whole system), to the closed contacts RC2–2 of a read control relay RC2 in the longitude section, and then to one side of each of the pair of latitude control relay windings LC1 and LC2 in parallel, the other side of each of these relays being grounded; (2) energizes a south latitude clutch magnet 158 (FIG. 5), the circuit to energize this south latitude clutch magnet 158, being from a D.C. bus bar 160 (FIG. 4) to contacts NC2–2 (FIG. 5), without crossing any other contacts, then to one side of the clutch magnet 158 and from the other side of the clutch magnet to ground (FIG. 4); (3) opens a holding circuit for south clutch relays SC1 and SC2 by opening contacts NC1–2 (FIG. 4) which breaks the circuit to D.C. bus bar 160.

Operation of the latitude control relays LC1 and LC2 energizes the latitude clutch magnet 146 by closing a circuit as follows: from D.C. bus bar 154 to the spacing cycle contacts CB–5, to contacts LC1–2 of latitude control relay LC1, to one side of the clutch magnet 146, then from the other side of magnet 146 to a D.C. ground connection 156.

Figure 5:
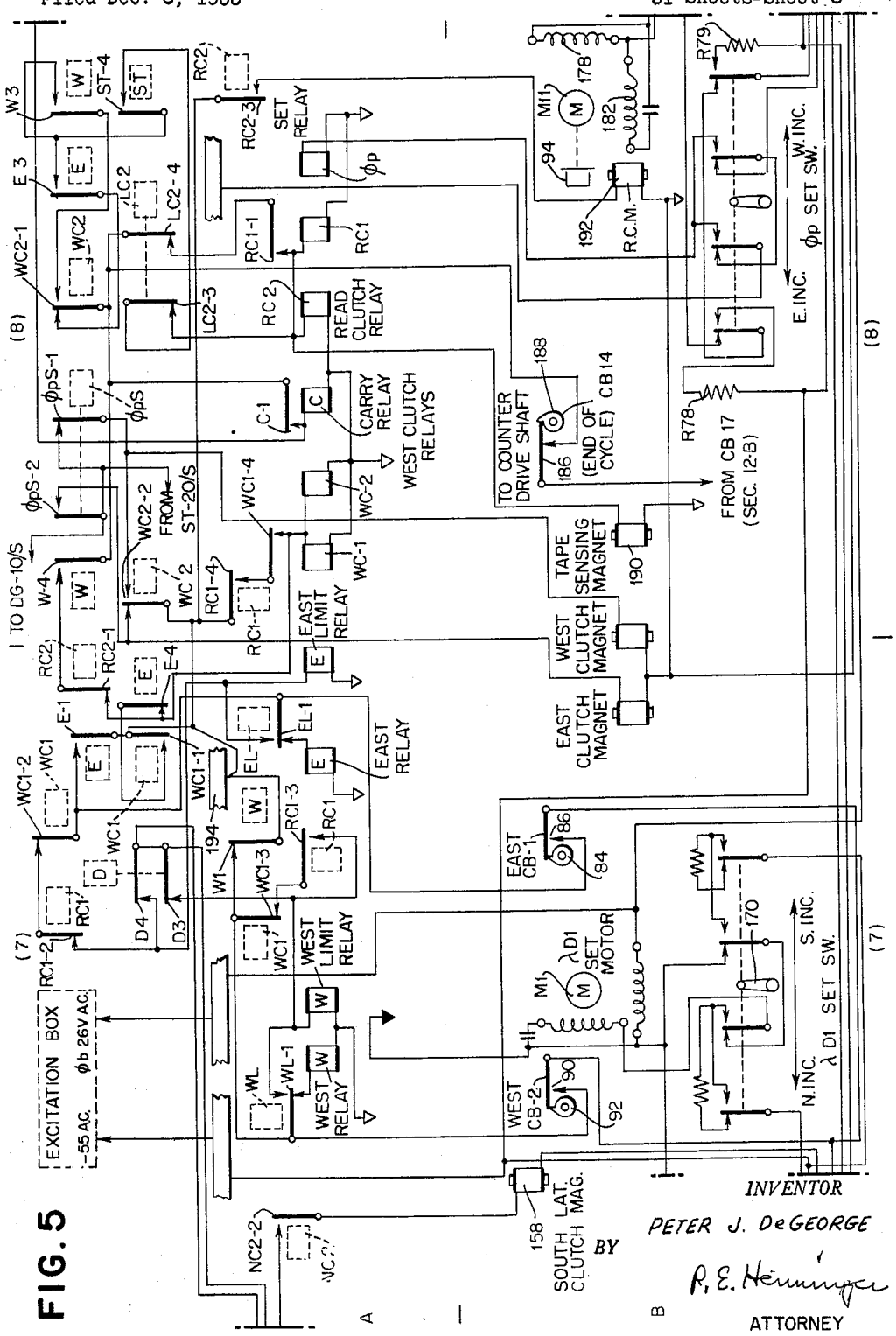

Also, operation of the latitude control relays LC1 and LC2 acts to prevent operation of a read clutch magnet 192 (FIG. 5). The magnet 192 controls the operation of the read clutch 94 (FIG. 1c). This is an interlocking arrangement to keep the longitude add unit 100 (FIG. 1c) from operating at the same time as the latitude unit is going through an increment change of indication. Contacts LC2–3 and LC2–4 (FIG. 5) are included in each of two alternative circuits which are for energizing a pair of read clutch relays RC1 and RC2 which are connected in parallel. One of these two circuits is a holding circuit for these read clutch relays, while the other is a circuit to energize them under control of the east and west cams 84 and 92 respectively (in the integrator unit). One of these read clutch relays RC2 has a set of contacts RC2–3 in the energization circuit for the read clutch magnet 192. This energization circuit may be traced from a D.C. bus bar 192 directly to contacts RC2–3 and from there to one side of magnet 192, the other side of which is grounded as illustrated.

As described previously a cycle of indication in the latitude unit 59 will be initiated by the actuation of the one revoluton clutch 60 (FIG. 1a). This cycle, once initiated, will continue to completion of a revolution of the output side of clutch 60 when it will mechanically declutch itself until the next impulse is received. During such a cycle the latitude control relays LC1 and LC2 (FIG. 4) will be held energized by a holding circuit as follows from D.C. bus bar 154 to contacts CB–5 of the end of spacing cycle cam, then to contacts LC1–1 of the latitude control relays LC1 and LC2, then to one side of the windings of these relays while the other side of these relay windings is grounded as shown.

The north clutch relays NC1 and NC2 establish a holding circuit for themselves which is only broken by energization of south clutch relays SC1 and SC2. This holding circuit may be traced from D.C. bus bar 160 over a circuit without crossing any switch contacts (FIGS. 4 and 5) to contacts SC1–2 (FIG. 4) of relay SC1 which are closed so long as a pulse from the contacts 57 of south cam 53 has not been received, then the circuit continues to the holding contacts NC1–1, and from there to one side of both north clutch relays NC1 and NC2. The other side of each of these relays is grounded as shown.

It is to be noted that for the sake of brevity the term "relay" is used where strictly speaking the terms "relay winding" would be more accurate. No confusion will result to one skilled in the art, however, most especially since the contacts of each relay are specifically so designated.

There is a north limit relay NL which is to prevent undesired duplicate cycles if the north cam contact 56 remains closed. This north limit relay is energized by contacts LC2–2 of the latitude control relay LC2, because the north relay N and the north clutch relay NC2 will be already energized before the latitude control relays LC1 and LC2 can be energized. This circuit for the north limit relay may be traced from D.C. bus bar 160 over a circuit without crossing any switch contacts (FIGS. 4 and 5) to contacts N–1 of the north relay N, then to contacts NC2–1 of north clutch relay NC2, then to contacts LC2–2 of latitude control relay LC2, and then to one side of the north limit relay NL, the other side of which is grounded as shown.

There is a delay relay D which is energized by the contacts of a start relay ST. These relays are merely for the purpose of giving the proper delay time upon first turning the system on, to allow the system to become set up for normal operation, i.e. to avoid extraneous operations.

DESTINATIONS LATITUDES

As indicated above, there are two additional counters 112 ($\lambda D_1$) and 110 ($\lambda D_2$), which are to indicate the latitudes of two pre-selected destinations. These counters are mechanically connected to motors M1 and M4 respectively (FIG. 1a and FIGS. 4 and 5) for setting the counters to correspond with the preselected destinations latitudes. The circuits for energizing these motors may be readily traced on FIGS. 4 and 5 where the corresponding set switches 168 (M4) and 170 (M1) are located on the drawings below the motors M4 and M1 which are controlled by these switches. These counters 110 and 112 are mechanically connected to the rest of the latitude unit by differentials as has been generally explained above.

SECANT-PRESENT LATITUDE

As indicated above, there is a tape unit 70 the mechanical aspects of which will be explained more fully below. The unit employs a tape with a row of read pins positioned across the width thereof. Each pin actuates one of a set of switches or circuit breakers 172 (FIG. 6), one of which has contacts 174. There are a total of eighteen of these switches and they are grouped electrically into one group of two and four groups of four, each group being in parallel circuits. Each time the tape is to be read it will be stationary and the pins will be lowered to contact the tape if no hole is there, or to continue down to close its switch contact, e.g. 174, if a hole is there. The code used is a modified binary as mentioned above and the information stored on the tape is the numerical quantities representing the values of one-half the secant of latitudes from eighty-nine degrees north to eighty-nine degrees south by one minute steps. These numerical quantities will be in terms of minutes carried to .001 minute, and since the maximum that this quantity will be is 28.645 minutes (½ of 57.290), the first digit will be either a one or a two and this needs only two circuits of the eighteen in the tape unit 70. Each of the other digits will be anything from one to nine and so there are four circuits for each of the units, tenths, hundredths, and thousandths digits. In order to represent each digit in a binary code there is a circuit each to represent one, two, four and eight; then by a proper combination of circuits any number from zero to fifteen may be represented, but since only zero to nine is to be used the combinations of circuits energized will be only those necessary for this range, i.e., zero to nine. Each of the eighteen circuits shown in FIGS. 6 and 7 leads to one of the segments of a group of commutators (see FIG. 7), one commutator for each group of parallel circuits. The operation of these commutators will be explained hereafter with reference to the add unit 100 (FIG. 1c).

It is to be noted that the values stored on the tape are computed from corrected secant numbers, not ordinary secant table values. The reason for this is that the lack of true sphericity of the earth renders secant table values inaccurate, e.g. the table value of the secant of 89 degrees is 57.290 while the corrected value is 57.306.

To illustrate the modified binary code employed, assume that the present latitude is 86° and 35.0′ so that the number representing ½ sec $\lambda_p$ is 8.389 (this number is obtained from a secant table value for 86° and 35.0′, merely for the purpose of illustration, the corrected value will be used on the actual tape used in our system). The tape will have no holes under the pins actuating the first group of two switches 172 since the tens digit is zero. There will be a hole under the first switch 172 (left to right in FIG. 6) of the next group, which is a group of four, and this will close a circuit representing the eight in the units digit. There will be holes under the last two switches 172 of the next group of four, which will close circuits representing two and one which total three for the tenths digit. There will be a hole under the first of the next group, for the eight in the hundredths digit; and there will be holes under the first and last of the last group, for the thousandths digit.

LONGITUDE UNIT

The elements of the longitude unit and their electrical relationship to one another will now be explained with reference to the circuit diagram. The longitude unit includes those elements which accomplish the following functions: compute the present longitude, determine the longitude of the next two destination points, and perform all trigonometric operations involving either present or destination longitude for use in the computation of the great circle or short range course.

PRESENT LONGITUDE

Figure 6:
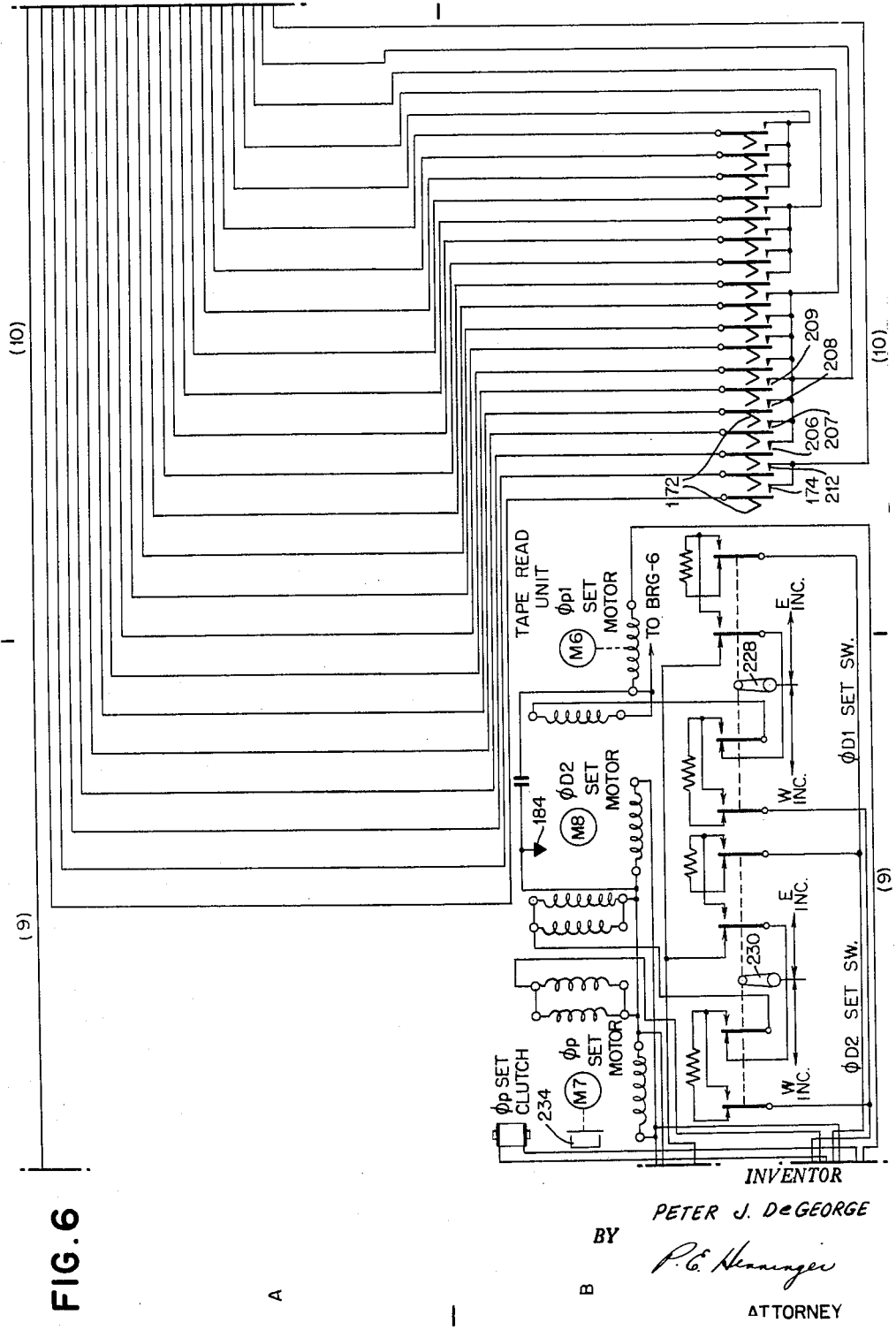

As was the case in the latitude unit, there is a present longitude indicator or counter 108 (FIG. 1c), which in this case is mechanically connected through the mechanism of the add unit 100 to the drive motor M11 (FIG. 1c and FIG. 5). This motor M11 is a split phase A.C. motor and is electrically connected directly to the A.C. bus bar 140 (FIG. 4). The circuit (FIGS. 4, 5 and 6) from the bus bar 140 leads directly to one end of a main winding 178 (FIG. 5) and through a condenser 180 to one end of the split phase winding 182. The other end of both windings are connected together and to an A.C. ground connection 184 (FIG. 6). This motor M11 is continuously running and is connected mechanically for driving the present longitude counter through the read clutch 94 (FIG. 5 and FIG. 1c). This clutch may be any ordinary type of one revolution positive connection clutch which may be engaged electrically, and which will disengage itself after one complete revolution of the output side.

As explained previously, following a change in location of the craft of one-half mile in an east-west direction, the east cam 84 (FIG. 5) or the west cam 92 will make the corresponding switch contacts 86 or 90 close, and so initiate a longitude read cycle in a manner similar to the latitude indication cycle previously described. Assuming that the craft is traveling northeast and that the north component was larger so that the latitude indication change was initiated first, then when the east cam 84 closes its contacts 86 a circuit to energize an east relay E is closed, and may be traced starting at D.C. bus bar 148 (FIG. 4) and going directly without crossing any contacts to contacts 86 (FIG. 5) (now closed) and then to contacts EL-1 resting as illustrated, and to one side of the east relay E, the other side being grounded as shown.

The east relay E will set up a circuit for energizing a pair of read clutch relays RC1 and RC2 (FIG. 5). This circuit will be held open by an interlock connection from the latitude control relays LC1 and LC2, in order to allow the latitude cycle to be completed. The circuit for the read clutch relays RC1 and RC2 is as follows: from a D.C. bus bar 186 (FIG. 7) over a direct connection (not crossing any switch contacts) (FIG. 7 and FIG. 5) to closed contacts 186 (FIG. 5) of an end of cycle circuit breaker CB14 that includes a cam 188 which is mechanically located on the output side of the read clutch 94 and operates to clear the electrical circuits after each cycle of operation is completed. Then the circuit continues to closed contacts WC2–1 of a west clutch relay WC2, and then to now closed contacts E–3 of the east relay E, then to contacts ST–4 of the start relay ST which will be energized upon putting the system into operation, and from there to contacts LC2–3 of the latitude unit. These contacts LC2–3 will be held open until the end of the latitude cycle. Finally the circuit continues from there to one side of each relay RC1 and RC2. The other side of these relays is grounded as shown.

Therefore, after the end of the latitude cycle, the read clutch relays RC1 and RC2 will be energized and at the same time a tape sensing magnet 190 (FIG. 5) is energized because it is connected in parallel with the read clutch relays RC1 and RC2. This tape sensing magnet is mechanically located on the tape unit 70 (FIG. 1a) and causes the pins to sense the code on the tape representing the quantity for ½ sec $\lambda_p$. The mechanical details of this tape unit will be explained fully hereafter.

Energization of the read clutch relays RC1 and RC2 causes an interlock action in the latitude control relays circuit so that if the longitude change is initiated first the latitude unit will be held until the completion of a longitude read cycle, in a similar manner as in the reverse situation described above. The circuit for this interlock will be evident upon noting the location of contacts RC2–2 (FIG. 4) in the initial energization circuit for latitude control relays LC1 and LC2.

Read clutch relays RC1 and RC2 also act to energize the read clutch magnet 192 which trips the one revolution clutch 94 to initiate a longitude read cycle. The circuit for energizing the magnet 192 is as follows: beginning at D.C. bus bar 194 (FIG. 5) and going over a direct circuit to contacts RC2–3 of relay RC2, and then to one side of the read clutch magnet 192. The other side of magnet 192 is grounded as illustrated.

Figure 7:
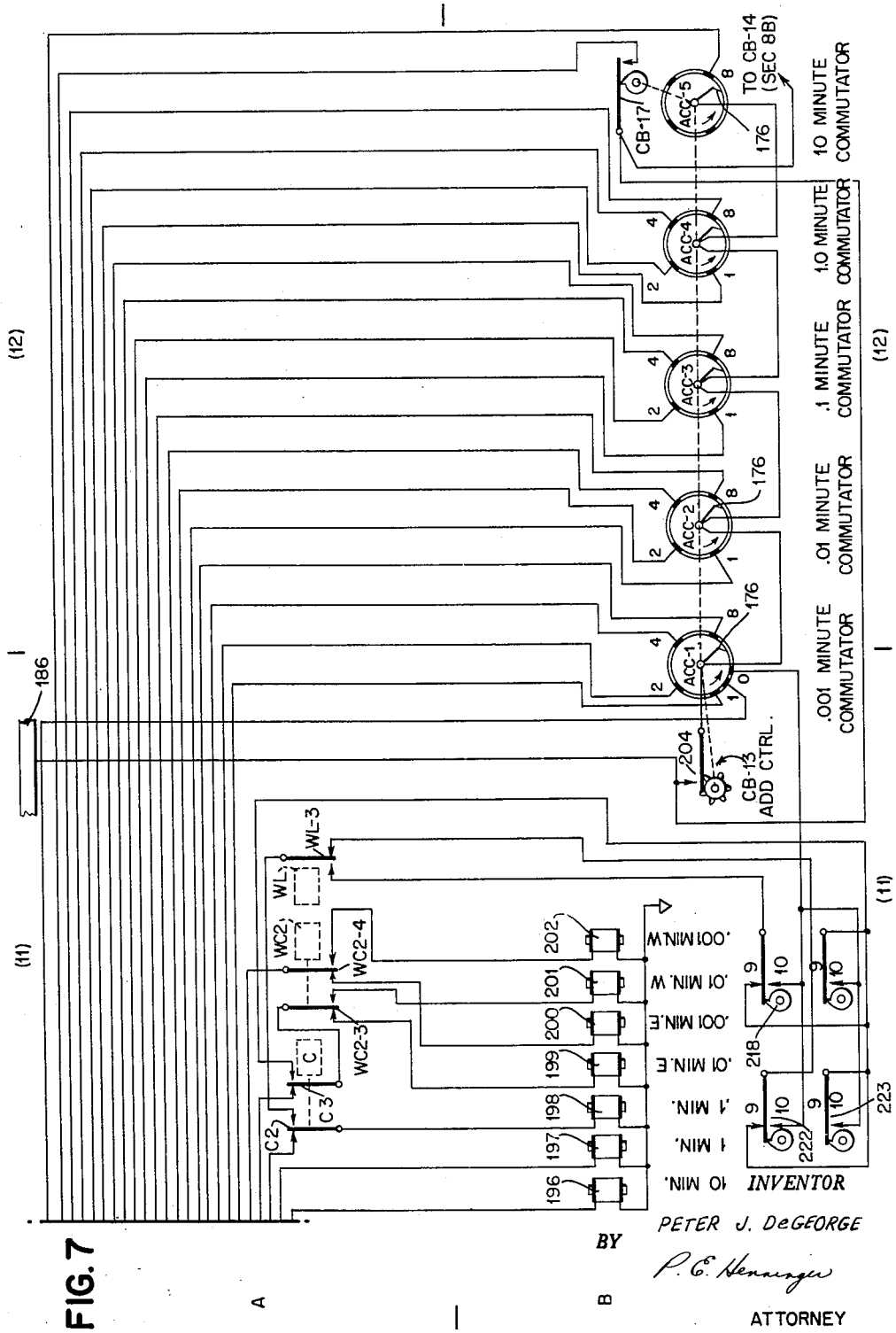

A read cycle of the add unit 100 (FIG. 1c), accomplishes the transformation of a unit of east-west travel ½ mile in length into minutes of longitude, as explained above. The electric circuits involved and employed in this unit will now be explained in detail. The mechanical details of the unit 100 will be explained below. Referring to FIG. 7, it will be noted that there are seven clutch magnets 196–202 inclusive. These are located one on each of seven counter mechanisms which may be generally and very briefly described as follows: a counter mechanism is a gear driven special type clutch that may be electrically engaged at predetermined rotational positions of an output shaft, and mechanically disengaged at predetermined positions with the result that predetermined rotational increments may be produced representing quantities from zero to nine. These seven counter mechanisms are marked to indicate the function of the counter mechanism on which each is located. It will be appreciated from the explanation above that the transformation of an increment of east-west ground travel into the proper change of longitude in minutes depending upon the present latitude then existing, is made to an accuracy of .0005 minute. Since 89° latitude is the limit of operation of the system, the storage employed involves five or less figures. However, because the last two places (.01 and .001) would render a mechanical system unwieldy, these places store their information and accumulate it electrically, and for this reason there are two extra counter mechanisms used. This means that there are two counter mechanisms for each of the last two places, one for each direction of travel, viz. east or west, and these are electrically switched into effective operation, depending upon whether the increment of travel has been east or west.

The electric circuit for each counter mechanism magnet (196–202) is similar and includes a parallel group of the contacts 174, 212, etc. (FIG. 6), of the tape unit 70 (FIG. 1a). Also included in each circuit is a commutator of which there are five: ACC–1, ACC–2, ACC–3, ACC–4, and ACC–5 (FIG. 7). The circuits are identical with regard to three of the five commutators, viz. ACC–2, ACC–3, and ACC–4, while ACC–1 merely adds two extra conductive segments and corresponding circuits and ACC–5 only makes use of one conductive segment. It will be noted that the segments are marked 1, 2, 4 and 8; this merely denotes the circuit corresponding with the like designated binary code representation, in the manner described above in connection with the tape unit 70.

In order to understand the operation of the circuits in connection with the add unit 100, the operation of an individual counter unit should be in mind. Each counter unit, of which there are seven (as shown in the over-all schematic representation of the system in FIG. 1c, as well as in the detailed mechanical schematic of FIG. 23) consists of a slightly altered counter of the type disclosed in a Patent Number 2,328,653 to C. D. Lake et al., issued September 7, 1943. The details of the alterations will be made clear below, but the general operation is such that a single complete revolution of an input shaft may be positively coupled at predetermined intervals of given rotational extent to produce predetermined and controllable output shaft rotation in intervals of 36° from zero to 360° rotation. By taking the one minute counter which has clutch magnet 197 (FIG. 7) mounted thereon and tracing the circuit for energizing this magnet 197, the sweeping action which reads the code set up in the tape unit 70 (FIG. 1a) will be made clear. Starting at a D.C. bus bar 186 (FIG. 7) a circuit may be traced to contacts 204 of circuit breaker CB–13, and then to all of the commutator brushes 176, in parallel. Then from the brush 176 of commutator ACC–4 the circuits are successively completed to each of the four circuits which lead to contacts 206, 207, 208, and 209 (FIG. 6) located in the tape unit 70 and controlled by the code holes in the secant tape. From there the circuits are joined and lead to one side of clutch magnet 197, the other side of which is connected to ground as illustrated. Now it will be clear that whenever one of the tape controlled switch contacts 206–209 are closed, the magnet 197 will be energized as the brush 176 contacts the corresponding conductive segment on the commutator ACC–4.

Figure 27:
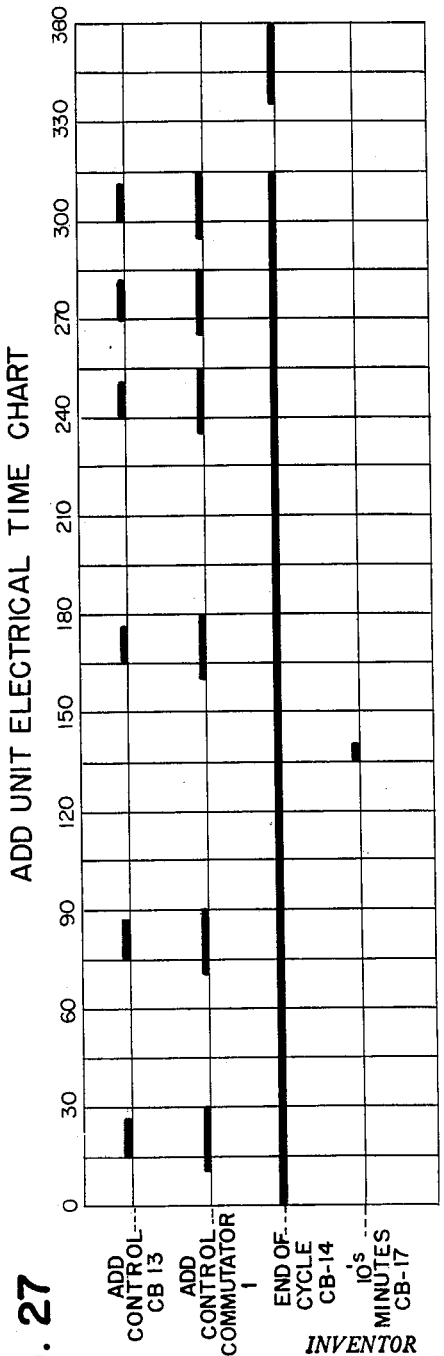
FIG. 27 is an electrical time chart for the same add unit during the same single complete cycle of operation.

Referring to the electrical time chart shown in FIG. 27, it will be seen that the contacts 204 of circuit breaker CB–13 are closed for intervals while the brush 176 is contacting commutator segments, so that the determining factor as to whether magnet 197 will be energized as the commutator ACC–4 sweeps around one revolution will be the holes in the tape controlling the closing of contacts 206–209. Since the code arrangement has been explained, the operation will be evident when it is understood that the clutch magnet 197, when energized, will engage a positive acting ratchet type clutch which will remain engaged until mechanically "knocked-off." The commutators ACC–1—ACC–5 as well as circuit breaker cams CB–13 and CB–17 are located on a shaft driven with the one revolution input drive shaft indicated by dashed line 98 in FIG. 1c.

Figure 26:
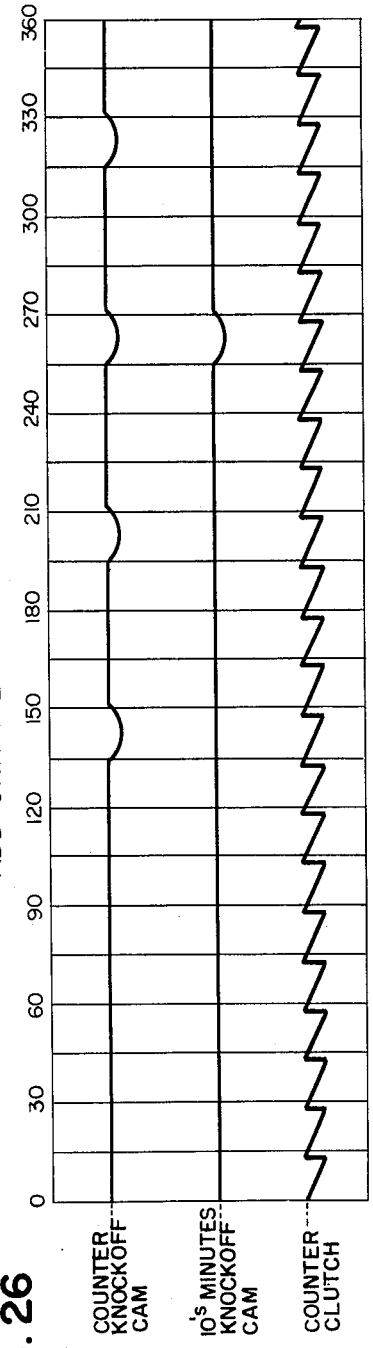
FIG. 26 is a mechanical time chart for the operation of the add unit during a single complete cycle of operation.

Referring now to FIG. 26 which shows the time chart of the mechanical cycle of a counter unit, it may be observed that the first knock-off does not occur until after eight increments of clutch rotations have occurred. Whereas, in the meantime, the four rotational increment circuit (in this case that including contacts 207) has been energized by the commutator ACC–4 and circuit breaker contacts 204 (CB–13). This is so because only numbers up to 9 are employed and therefore if an eight code circuit (contacts 206) is energized the four code circuit (contacts 207) will not be, and vice versa, i.e. they are mutually exclusive. In the case of the two code and the one code circuits (contacts 208 and 209, respectively) they will energize the clutch magnet if there is a code hole present and then after two or one increments of output rotation, respectively, the mechanical knockoff will declutch the drive so that the coded amount of output rotation will be had in the proper incremental amount from one to nine.

With regard to the ten's counter unit, which is in circuit with commutator ACC–5 (FIG. 7), a special arrangement is employed because the ten's group only involves two circuits instead of four and the number to be coded is never anything but a one or a two, as was explained above. In order to greatly reduce the mechanical inertia involved, sixteen increment output revolution is used to represent a code two while an eight increment output revolution represents a code one. The electrical circuits used in accomplishing this are as follows: only the 8 segment of commutator ACC–5 is connected to a circuit. This circuit includes contacts 174 (FIG. 6) of the first group of code controlled contacts, and represents a two in the tens digit of the ½ sec $\lambda_p$ number. By way of example, if contacts 174 of the tape unit are closed when a read cycle of the add unit 100 (including magnets 196–202 and commutators ACC–1—ACC–5 (etc.) is begun, then by referring to the time charts (FIGS. 26 and 27) it will be seen that magnet 196 will be energized at the first closing of contacts 204 of circuit breaker CB–13. Therefore, the clutch will be engaged and not knocked off until the clutch increment ending at 267° (FIG. 26). However, if contacts 212 are closed instead (they are mutually exclusive with contacts 172 because the ten's digit is either a one or a two, never more), then the circuit including contacts 212 will be closed to energize magnet 196 at the revolution time of 135° (see FIG. 27), and so the clutch will be engaged until knocked off after eight increments or when 267° (FIG. 26) is reached as before.

It will be noted that the .001 minute commutator ACC–1 has two extra conductive segments on its periphery. These are marked O and C and are used in connection with the electro-mechanical accumulation of the numerical values for the hundredths and thousandths digits of the ½ sec $\lambda_p$ number. Each and all of the four counters having magnets 199–202 thereon respectively, are not mechanically connected to any shaft output drive, but instead they each drive a cam 214 (FIG. 30) which carries a contact positioning follower 216 for controlling the closing of 9–10 carry circuits. It will be seen that there is a short radius notch 218 on the periphery of cam 214, and also a lobe 220 on the cam 214. The notch 218 is located at the ninth increment of clutch rotation of the counter while the lobe 220 is at the tenth increment. Now returning to FIG. 7, it will be seen that the values of the last two digits of the ½ sec $\lambda_p$ quantity for east or west travel, will be carried electrically to add one unit to the next highest order digit whenever a 10 or complete revolution is reached or passed. For example note the circuits including the cam positioned contactors 222 and 223. Assume travel is in an easterly direction and so relay contacts WC2–3, WC2–4, and WC3–1 will be in the de-energized position illustrated. Now when commutator brush 176 of commutator ACC–1 completes a circuit via contacts 204 of circuit breaker CB–13, a carry relay C (FIG. 5) will be energized, and will energize its own holding circuit via contacts C–1 and end of cycle circuit breaker CB-14 (contacts 186 and cam 188). Therefore, contacts C-2 and C-3 (FIG. 7) will be moved to energized position to set up circuits for receiving a carry pulse for adding one more increment of rotation to the output of the tenths minutes counter or to the hundredths minutes counter, before the final knockoff becomes effective. The 9-10 carry action is standard for this type of counter, and an example describing the circuits involved will make it sufficiently clear. Of course, if contactors 222 and 223 are not moved out of the neutral or open position illustrated, then when the commutator ACC-1 continues on past segment C no circuits will be closed and no change will take place. If, however (to take the most inclusive example) the .01 minute counter ended after 270° of a cycle with a rotational position corresponding to a digit nine, and the .001 minute counter ended at the same rotational point of a cycle (270°) with having passed or reached a complete revolution, i.e., a digit ten (carry); then contactor 222 (0.1 min.) would be closed in the up position (as viewed in FIG. 7) and contactor 223 (.001 min.) would be down (closed), so that at 300° of the cycle when sector C is contacted by its brush 176, circuits to energize both magnets 198 and 199 will be completed and one additional increment of rotation will be produced in the .01 minute counter before the final knock-off in the cycle. These circuits may be readily traced on FIG. 7.

DESTINATIONS LONGITUDES

Similarly to the latitude unit there are two destination longitude counters 116 ($\phi D_1$) and 114 ($\phi D_2$) (see FIG. 1c). These are driven by motors M6 and M8 respectively, for the presetting of each counter to the actual longitude of the preselected destination. The circuits for these motors may be readily traced on the drawings with reference to FIG. 6 where the corresponding set switches 228 and 230 are located below the set motors. In the longitude unit there is also a set motor M7 for present longitude which is disconnected mechanically from the system when not in use by a clutch 234. The controlling circuits for this motor and clutch also may be readily traced on FIGS. 5 and 6.

INTEGRATOR CIRCUITS

Figure 8:
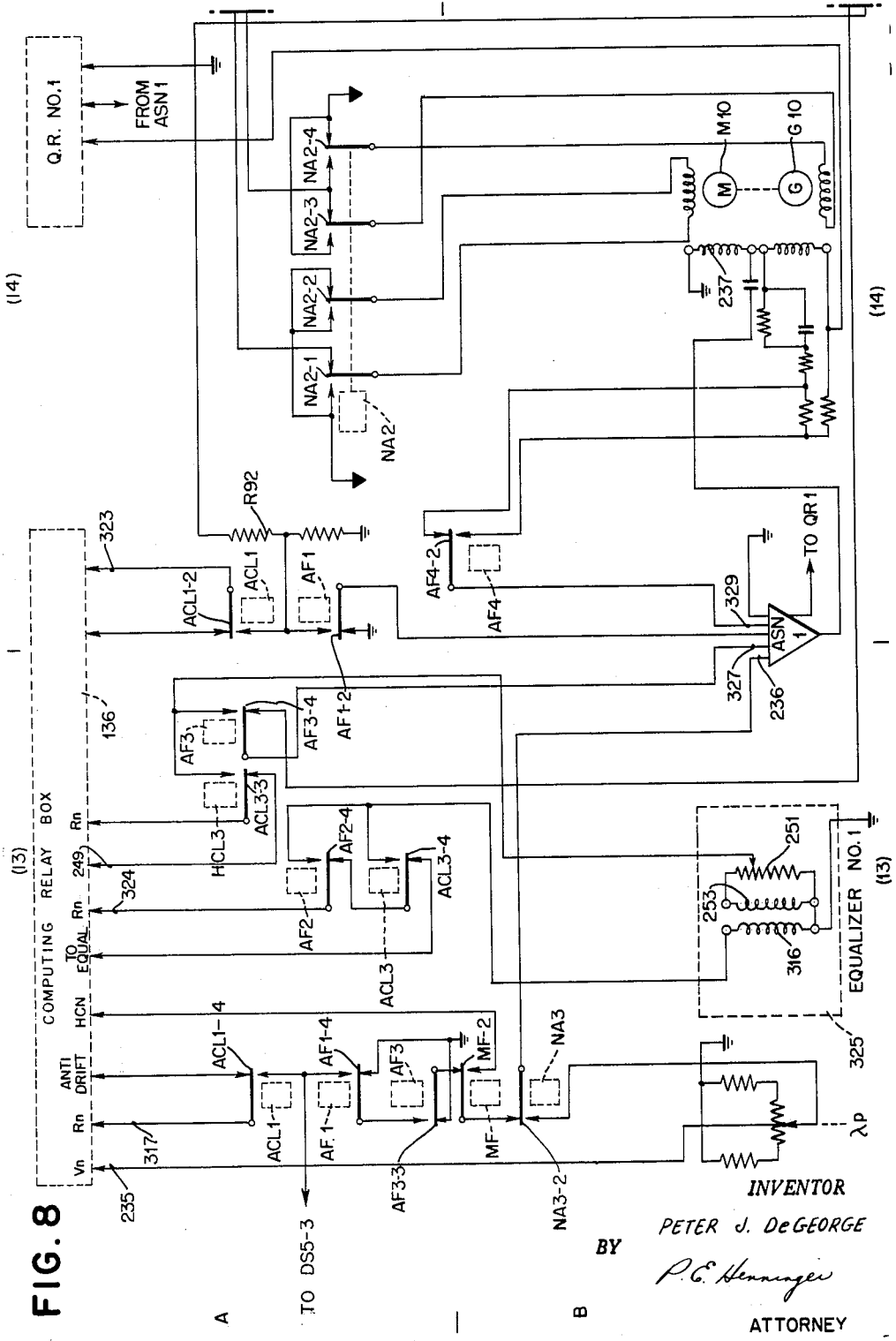
Figure 9:
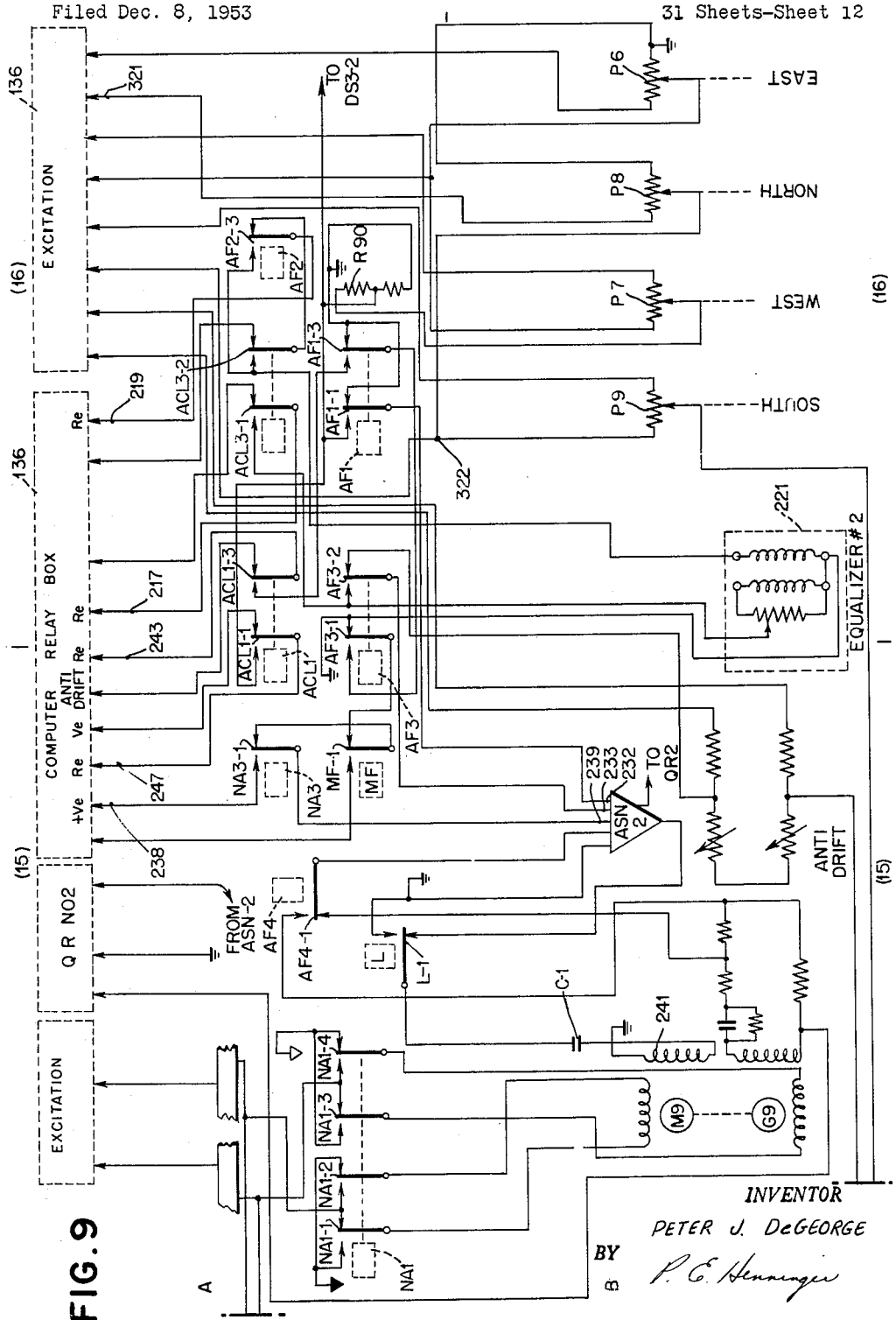

The detailed circuits involved in the integrator unit 73 may be traced on FIGS. 8 and 9 of the detailed circuit diagrams. Beginning with the north-south portion of the indicator unit, the circuit for this operation may be traced from a terminal 235 (FIG. 8) which leads from the source of a voltage corresponding to the north-south component of velocity. The circuit may be traced from this terminal 235 to a center tap connection of the potentiometer P3 where the correction for the spherical condition of the earth is introduced as was explained above. Then from the slider of potentiometer P3, the circuit continues to contacts N3-2 of relay N3, and from there directly to an input connection 236 of the servo amplifier ASN1. The output from servo amplifier ASN1 then is fed to a series connected condenser C2 on the way to one side of a control winding 237 of the servo motor M10. The other side of this winding 237 is connected to signal ground as illustrated.

Similarly, the circuit for the east-west portion of the indicator unit may be traced from a terminal 238 (FIG. 9) of the auxiliary relay box 136 to contacts N3-1 of the N3 relay and then directly to an input connection 239 of the servo amplifier ASN2. The output of servo amplifier ASN2 is then fed to contacts L-1 of the L relay and from there to one side of a condenser C1, then from the other side of condenser C1 to one side of a control winding 241 of the servo motor M9 the other side of which winding 241 is connected to signal ground as illustrated.

In each case, i.e. with regard to servo motors M9 and M10, the usual servo control system is employed in order to have the servo motors run at a speed proportional to the amplitude of the input signal voltage and in a direction depending upon the phase of the input voltage, as has been described above.

HEADING ERROR SIGNAL-GREAT CIRCLE COURSE

As described generally above, the solution of Equation 6 is necessary to determine the heading error which must be corrected in order to maintain the desired course for a given destination. Following the steps for solving the aforementioned equation, reference may be had to various figures on the drawings which are concerned with the complete circuit diagram (FIGS. 2-14). A great circle course heading will be maintained for flights of a predetermined distance, e.g. one greater than the distance where, the difference between the present position of the craft and the destination in latitude is 3 degrees, or where the difference between present position and the destination in longitude is greater than 3 degrees. First of all the navigation mode switch will be set to the position for navigate, i.e., the switch 118 (FIG. 2) will be positioned as illustrated and the destination switch 115 may be set to the desired destination which in this case will be destination 1. In referring to FIG. 10, there will be a constant amplitude A.C. signal applied to a stator winding 240 of resolver KYR-1. The circuit for this signal may be traced from an A.C. bus bar 242 over contacts SRCC2-4 of the deenergized short course computer relay and then directly to one side of the winding 240 the other side of which is connected directly to ground as illustrated. The rotor of KYR-1 has 2 windings 244 and 245 which are electrically at right angles to one another. This rotor is mechanically positioned in rotation corresponding to the destination latitude ($\lambda D_{-1}$) as indicated by the dashed line marked $\lambda D_{-1}$. The electrical signals obtained from windings 244 and 245 are therefore representative of cos $\lambda D_{-1}$ and of sin $\lambda D_{-1}$, respectively.

Figure 11:
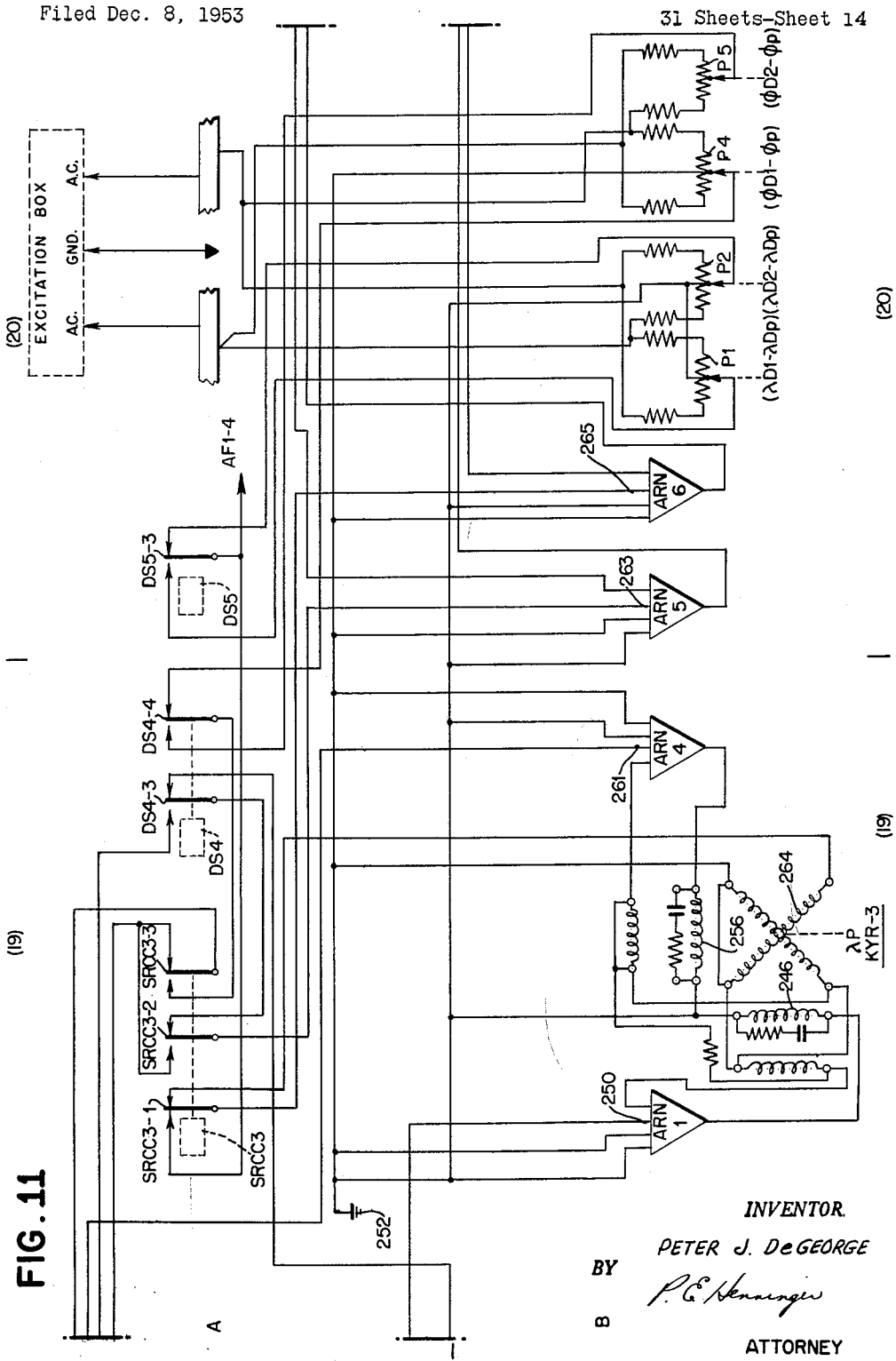

The sin $\lambda D_1$ signal is fed through resolver amplifier ARN1 (FIG. 11) and then to a stator winding 246 of KYR-3. The circuit for this signal may be traced beginning at a ground connection 248 (FIG. 10) and going directly to the commen end of winding 245, then through winding 245 to contacts DS3-3 of the destination select relay DS3 and directly to an input connection 250 of the resolver amplifier ARN1 (FIG. 11). Then the output of the amplifier is connected directly to one side of the stator winding 246 of resolver KYR3 and from the other side of this winding directly to another signal ground connection 252. The rotor of this resolver (KYR3) is positioned in rotation corresponding to the present latitude ($\lambda_p$).

The cos $\lambda P_1$ signal from the other winding 244 of resolver KYR-1 (FIG. 10) is fed through resolver amplifier ARN7 to a stator winding 254 of a resolver KYR6, and the rotor of KYR6 is positioned rotationally corresponding to the difference between the longitude of destination selected and present longitude ($\phi D_1 - \phi_p$). The circuit for this signal may be traced as follows: Beginning at the same signal ground connection 248 (FIG. 10) and going to the same common connection for the rotor windings of KYR1, then through winding 244 where the signal is generated and to contacts DS3-2 of the destination select relay DS3, to contacts SRCC3-3 (FIG. 11) and back to contacts SRCC1-4 (FIG. 10), then to contacts SRCC4-1, then to contacts DS1-4, then to contacts DS5-1, and to an input connection 255 of the amplifier ARN7. From the amplifier ARN7 the signal is fed to contacts SRCC2-1, then to contacts DS2-1, and then to one side of the stator winding 254 the other side of which is directly connected to ground as illustrated.

One output of resolver KYR6 as taken from a rotor winding 260, will be cos $\lambda D_1$ cos ($\phi D_1 - \phi$) because the rotor of KYR6 is positioned corresponding to the difference between destination and present longitudes.

Figure 12:
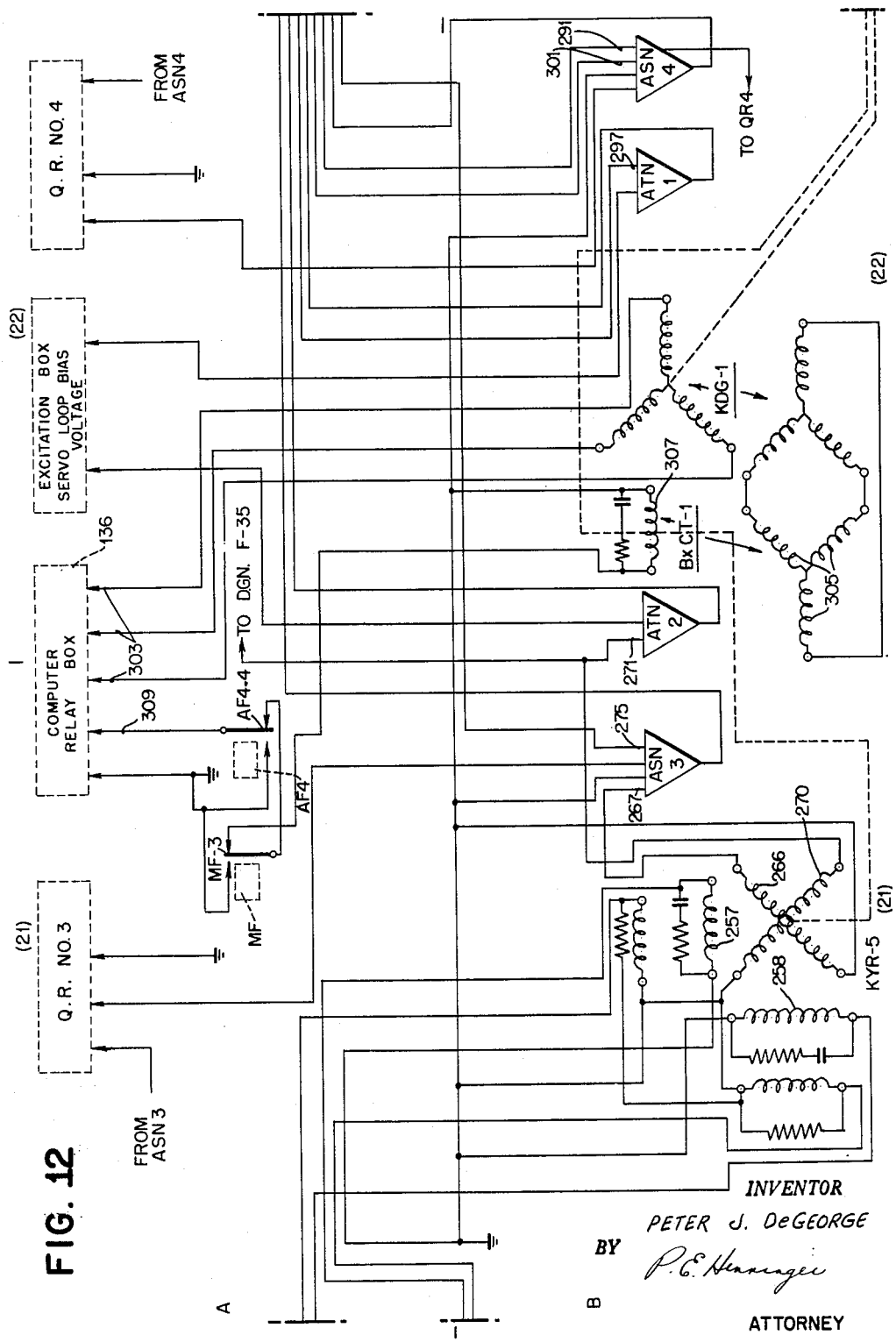
Figure 13:
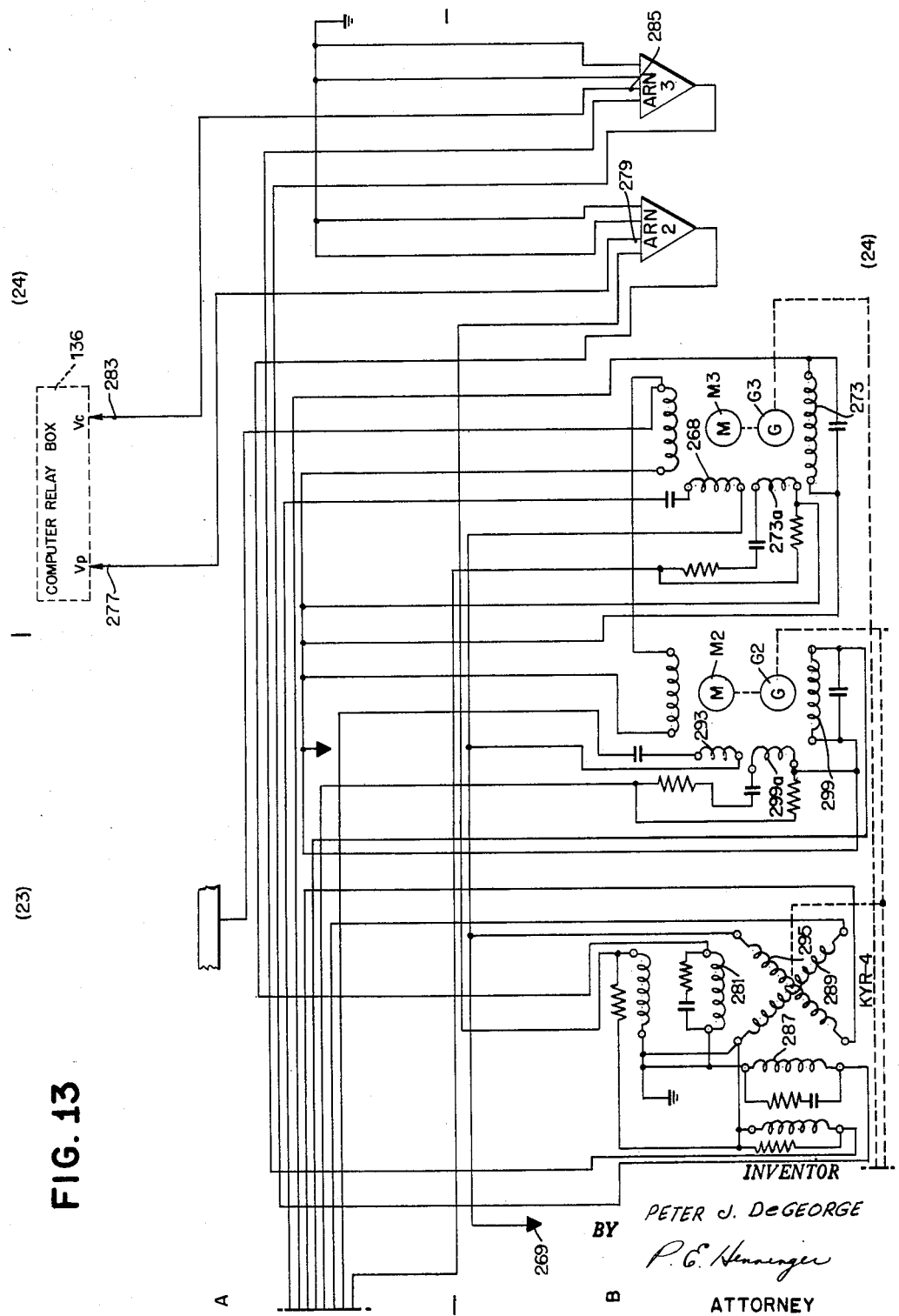
Figure 15:
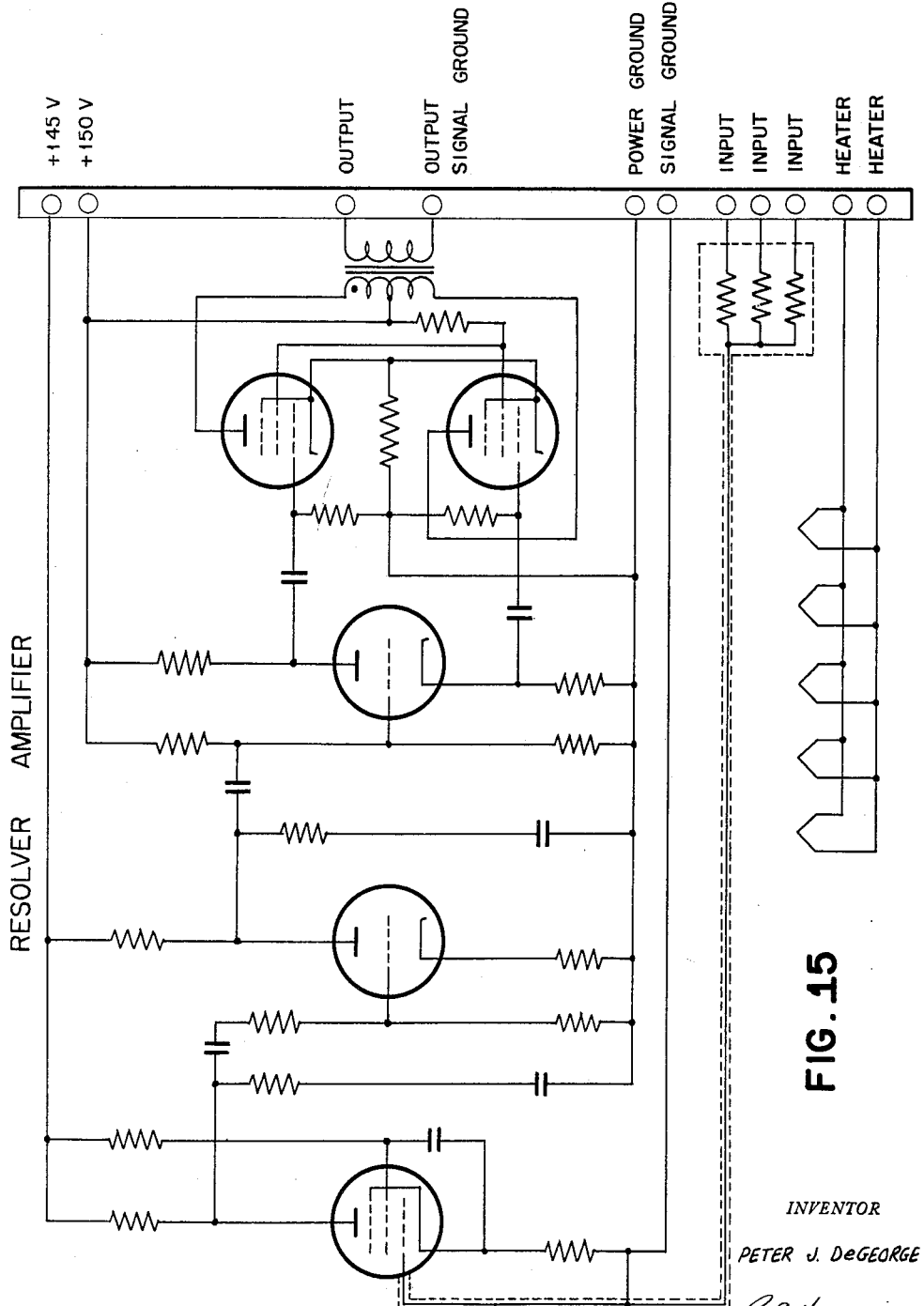
FIG. 15 is a circuit diagram of one of the resolver amplifiers employed, and designated ARN–1—ARN–7.
Figure 16:
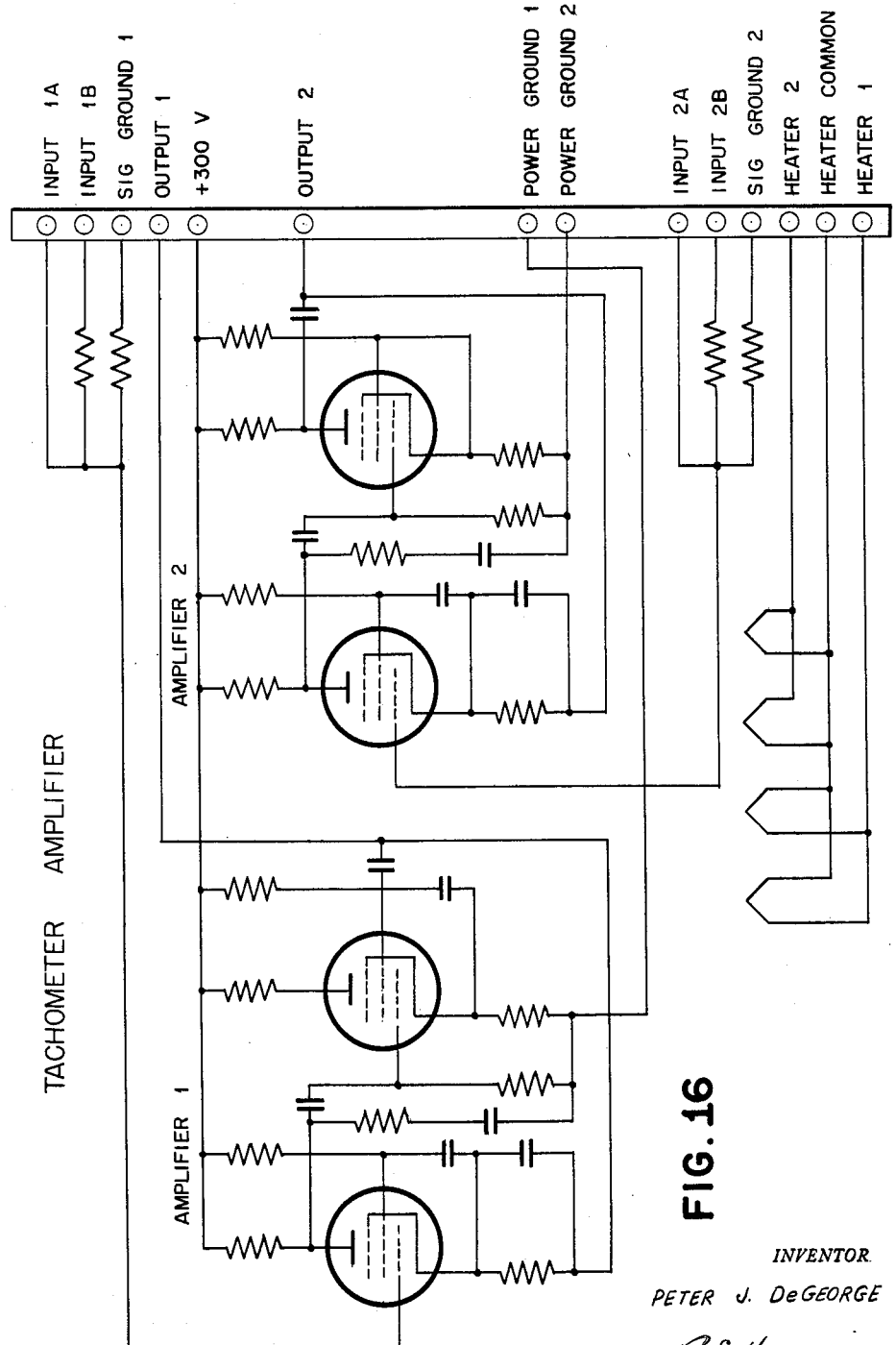
FIG. 16 is a circuit diagram of the tachometer amplifiers employed and designated ATN–1 and ATN–2.
Figure 17:
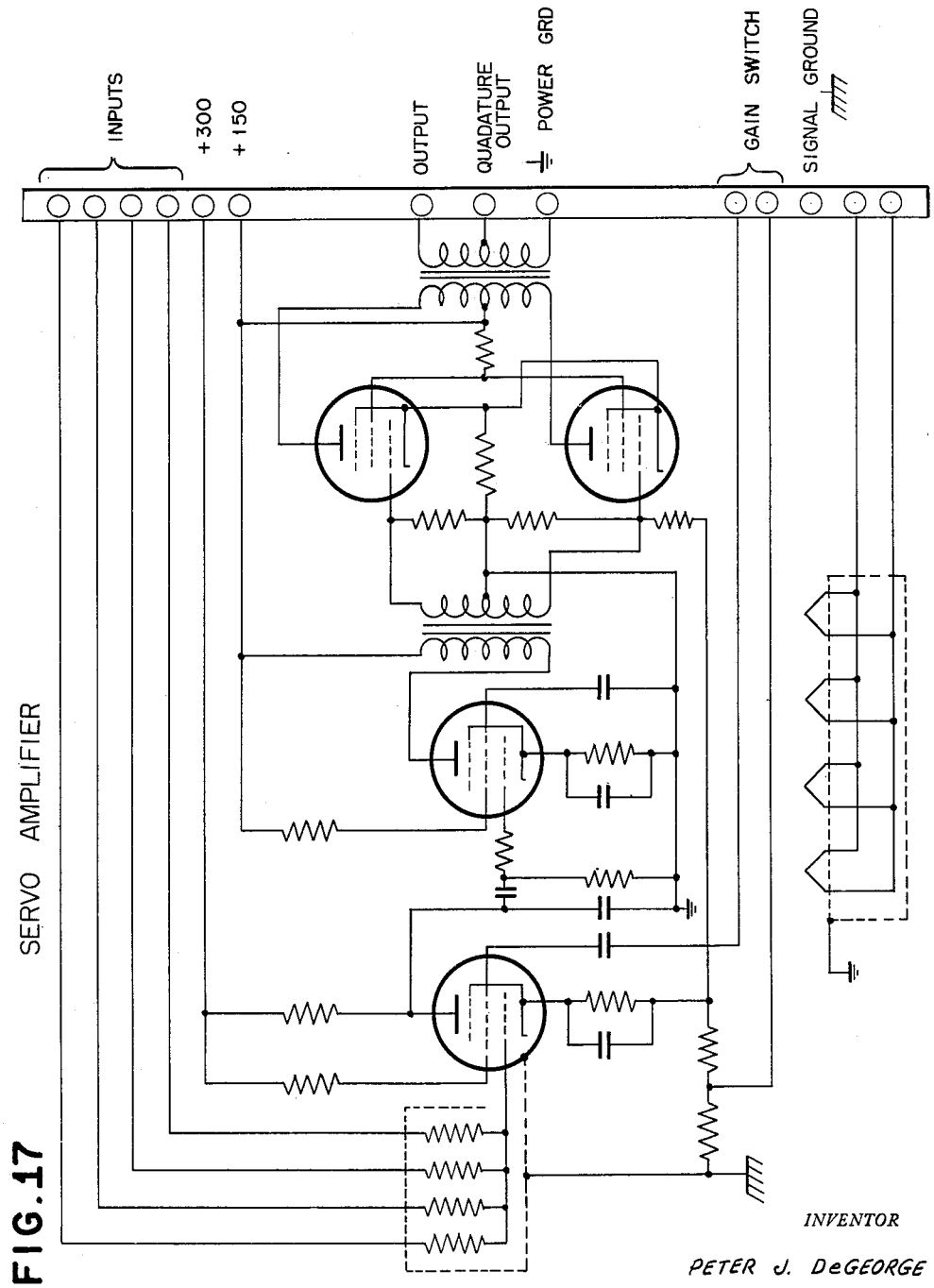
FIG. 17 is a circuit diagram of one of the servo amplifiers employed and designated ASN–1—ASN–4.
Figure 18:
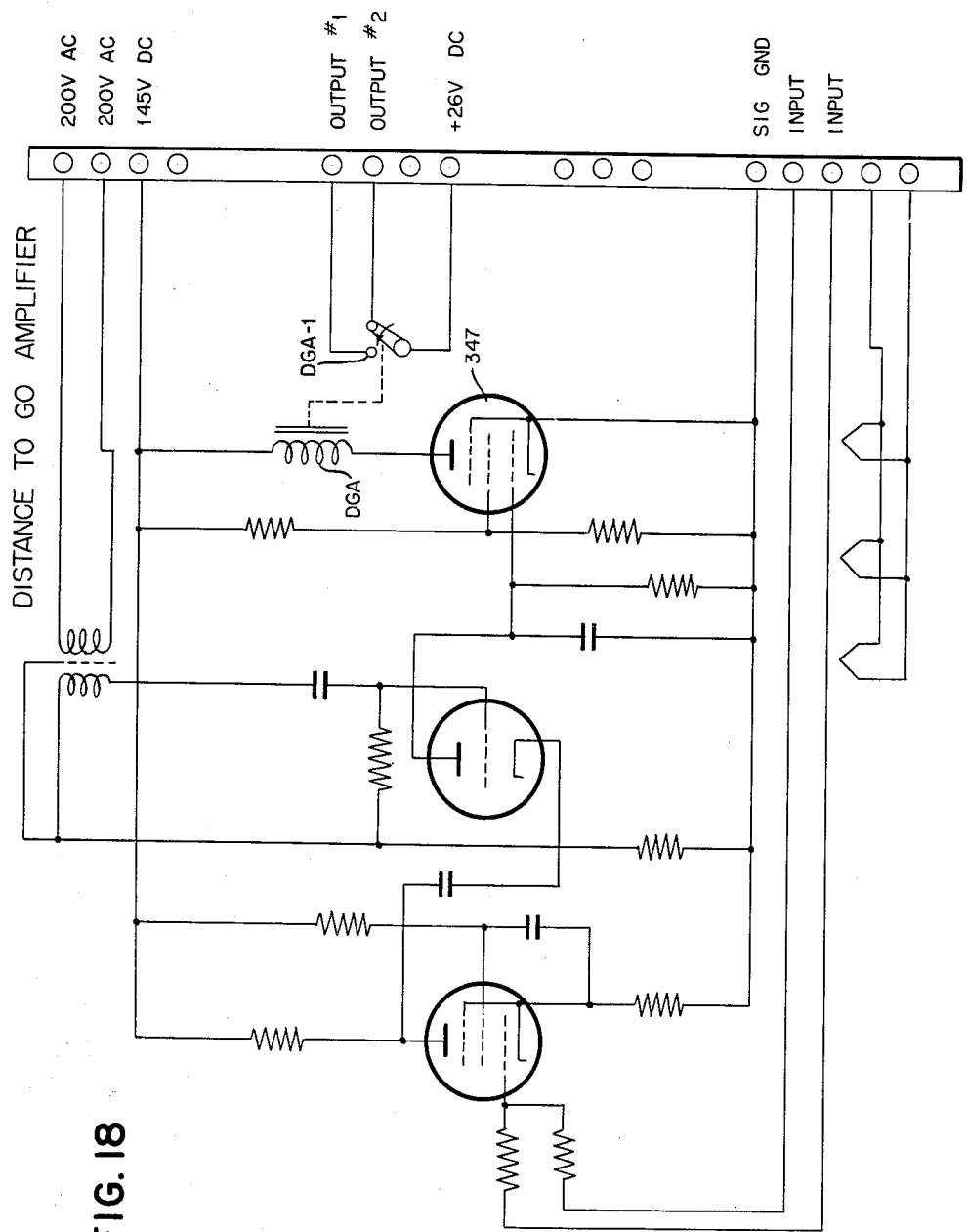
FIG. 18 is a circuit diagram of the distance to go amplifier employed, including the internal relay actuated thereby with its contacts.

$(\phi D_1 - \phi_p)$ and this signal will be fed through a resolver amplifier ARN4 (FIG. 11) to another stator winding 256 of resolver KYR3. The other output signal from resolver KYR6 (FIG. 10) is cos $\lambda D_1$ sin $(\phi D_1 - \phi_p)$ and this signal is fed through a resolver amplifier ARN5 (FIG. 11) and to one stator winding 257 (FIG. 12) of a tangent resolver KYR5. It will be noted that the output of resolver KYR3 is cos $\lambda_p$ sin $\lambda D_1$—sin $\lambda_p$ cos $\lambda D_1$ cos $(\phi D_1 - \phi_p)$ and this signal is fed through a resolver amplifier ARN6 (FIG. 11) to another stator winding 258 of resolver KYR5 (FIG. 12). Therefore, it will be appreciated that the numerator and the denominator for the solution of Equation 3 as set forth above, have been obtained and the value of *hgtar* will be represented by the shaft position of resolver KYR5 which results from a servo positioning of the resolver in a standard manner.

The details of the circuits involved in the above solution of Equation 3 may be traced as follows: The signal cos $\lambda D_1$ cos $(\phi D_1 - \phi_p)$ is generated in winding 260 of the resolver KYR6 (FIG. 10), and the circuit for this signal may be traced beginning at a signal ground connection 259 and going directly to one side of winding 260 of resolver KYR6 and then from the other side of winding 260 to contacts DS4–2 of a destination select relay and then directly to an input connection 261 (FIG. 11) of the resolver amplifier ARN4, and from the output of this amplifier to one side of the stator winding 256 of resolver KYR3. Then from the other side of winding 256 the circuit continues directly to a signal ground connection 252. The circuit for the other output signal from resolver KYR6 (FIG. 10) is generated in a winding 262 of resolver KYR6 and the circuit for this signal may be traced beginning at the same signal ground connection 259 and going directly to one side of the winding 262, and then from the other side of winding 262 the circuit goes to contacts DS4–3 (FIG. 11) of a destination select relay and from there to contacts SRCC3–2 and from there to an input connection 263 of the resolver amplifier ARN5. The output of this amplifier then is fed directly to one side of the stator winding 257 (FIG. 12) of resolver KYR5 and from the other side of winding 257 the signal circuit continues directly to a signal ground connection as illustrated. The output signal from resolver KYR3 (FIG. 11) is taken from a rotor winding 264 and the circuit for this signal may be traced beginning at signal ground connection 252 and going to one side of the rotor winding 264, then from the other side of winding 264 the signal is fed to contacts SRCC3–1 and from there to an input connection 265 of the resolver amplifier ARN6. The signal then continues from the output of the amplifier ARN6 to one side of the stator winding 258 of resolver KYR5 and then from the other side of this stator winding 258 directly to signal ground as illustrated. In order to solve the arc tangent Equation 3 a servo motor is used to position the rotor of the tangent resolver KYR5. Servo motor M3 (FIG. 13) is mechanically connected to the rotor of resolver KYR5 as indicated by the dashed line, and the signals for driving servo motor M3 may be traced as follows: The signal output from a rotor winding 266 (FIG. 12) of resolver KYR5 may be traced from signal ground connection as illustrated to one side of the winding 266 and then from the other side of winding 266 directly to an input connection 267 of servo amplifier ASN3, then from the output of servo amplifier ASN3 this signal may be traced directly to one side of an input winding 268 (FIG. 13) of the servo motor M3. The other side of winding 268 is connected to an A.C. ground connection 269. The signal from the other rotor winding 270 (FIG. 12) of resolver KYR5 may be traced beginning at signal ground as before and going to one side of the winding 270 and then from the other side of rotor winding 270 directly to an input connection 271 of tachometer amplifier ATN2, then the output of this amplifier ATN2 is fed to one side of an excitation winding 273 (FIG. 13) of servo generator G3. The other side of this winding 273 is connected to ground as illustrated. An output winding 273a of the generator G3 feeds a signal the circuit of which may be traced beginning at A.C. ground as illustrated and going to one side of a network including winding 273a. Then the circuit continues from the other side of this network to another input connection 275 (FIG. 12) of servo amplifier ASN3. From the output of servo amplifier ASN3 the circuit continues to one side of control winding 268 of servo motor M3, the other side of which winding is grounded to an A.C. ground connection 269 as before. Now by the usual operation of a servo system, the servo motor M3 in combination with its generator G3 will act to position the rotor of resolver KYR5 to a null or minimum signal position, and this position will then represent the angle the tangent of which is made up of the two quantities as represented by the signals being fed to the two stator windings of resolver KYR5.

The determination of the quantity *hgta* i.e. the solution of Equation 2, may be had in the following manner: The drift angle sigma $(\sigma)$ is obtained by using a tangent resolver KYR4 (FIG. 13) and using the signals which represent the two components of ground travel which make up the trigonometric function of the drift angle signal. These signals are obtained from the auxilary computer mentioned above and are fed to the circuits of the navigation system as follows: The component of ground travel represented by the symbol $V_p$ is fed from the auxiliary relay box 136 (FIG. 13) beginning at the output terminal 277 and travelling directly to an input connection 279 of the resolver amplifier ARN2. The output from this amplifier then is fed directly to one side of a stator winding 281 of the resolver KYR4 and from the other side of this winding 281 directly to a signal ground connection as illustrated. The other component signal representing the other ground travel component, as explained above and designated by the symbol Vc, is fed from an output terminal 283 of the relay box directly to an input connection 285 of the resolver amplifier ARN3. The signal then is fed from the output of this amplifier ARN3 directly to one side of another stator winding 287 of the resolver KYR4 and from the other side of winding 287 the circuit continues directly to a signal ground connection as illustrated. The tangent solution for the angle represented by components as fed to the two stator windings of the resolver KYR4 is now determined in the same manner as described above with regard to the tangent solution involving resolver KYR5. To trace the circuits involved, the signal output from a rotor winding 289 of the resolver KYR4 is fed over the circuit beginning at the signal ground connected to one side of winding 289 and continuing from the other side of winding 289 directly to an input connection 291 (FIG. 12) of the servo amplifier ASN4. The output signal from servo amplifier ASN4 is fed directly to one side of a control winding 293 (FIG. 13) of the servo motor M2 and from the other side of this winding 293 the circuit is completed to the A.C. ground connection 269. As before, another rotor winding 295 of the resolver KYR4 is connected from one side directly to the A.C. ground connection 269 and from the other side of the winding 295 a signal is fed to an input connection 297 (FIG. 12) of the tachometer amplifier ATN1, and the output of this amplifier is fed directly to one side of an excitation winding 299 (FIG. 13) of the servo generator G2, the other side of this winding is connected directly to ground as illustrated. An output winding 299a of the generator G2 feeds a signal the circuit of which may be traced beginning at A.C. ground as illustrated and going to one side of a network including winding 299a. Then the circuit continues from the other side of this network directly to an input connection 301 (FIG. 12) of the servo amplifier ASN4, the output of which was previously traced to the control winding 293 (FIG. 13) of servo motor M2. In this way, the servo motor M2 will position the rotor of KYR4 to the minimum signal or null position, which represents the angle the tangent of which is made up of the two components as contained in the stator windings of this resolver KYR4. At the same time, as was pointed out in the general description above, the rotor of the differential generator KDG1 (FIG. 12) is positioned correspondingly with the rotor of the resolver KYR4, and therefore the differential generator KDG1 performs the addition of the heading angle as received in the rotor windings to the drift angle $\sigma$ as represented by the position of the rotor of the differential generator KDG1.

The drift angle $\sigma$ is represented by the shaft position of the tangent resolver KYR4 (FIG. 13) and is used to position the rotor of a differential generator KDG1 (FIG. 12). This differential genertor therefore is used to add the drift angle $\sigma$ to the heading angle of the craft in order to obtain the required ground "hgta"—Equation 7. This is because the rotor windings of the differential generator KDG1 receive signals representing the actual heading "h" from three output terminals 303 (FIG. 12) of the computer relay box 136, while the rotor is positioned in rotation corresponding to the drift angle $\sigma$ as just pointed out. The heading error signal, i.e. the solution of Equation 6, will be obtained by feeding the output of the differential generator KDG1 to the stator of a control transformer BxCT1. The rotor of this control transformer will be positioned in the angle representing hgtar as pointed out above with regard to the solution of Equation 8. Therefore, the difference between hgtar and hgta is obtained at the input to the control transformer windings 305 and the signal output of its rotor winding 307 is fed out on a circuit which will be available for controlling the craft autopilot. This output circuit may be traced from the signal ground connection to one side of the rotor winding 307 and from the other side of winding 307 to contacts MF-3 of a manual fix relay, and then to contacts AF4-4 and on to a terminal 309 of the computer 136.

ERROR SIGNAL-SHORT RANGE COURSE

As described generally above, the solution of Equation 9 is necessary to determine the heading error which must be corrected in order to maintain the desired course for a given destination, when the range from the destination is less than a predetermined amount. The solution of Equation 9, which involves the solution of Equation 10 also, has been fully explained above and the detailed circuit elements involved will now be described. When the range from the craft to one of the two predetermined destinations ($D_1$ or $D_2$) is less than a predetermined amount, e.g. about 3 degrees of difference in latitude and longitude, a short range course computer relay will be energized. The circuits involved in energizing this relay are the following: Referring to FIG. 3 it will be observed that there is a set of cam operated switches SW9, SW10, SW11, SW12, SW15 and SW16. As indicated in the drawing, SW9 and SW10 are actuated by cams that are mechanically connected to the difference in latitude shafts of destination two ($D_2$) and of destination one ($D_1$) respectively. Similarly, switches SW11 and SW12, as well as switches SW15 and SW16 are actuated by cams that are mechanically connected to shafts that represent the difference in longitude between destination two ($\phi D_2$) and present longitude ($\phi_p$) of the craft as well as the difference between the longitude of destination one ($\phi D_1$) and present longitude ($\phi_p$) of the craft. In this case, there are two cam actuated switches associated with each destination, one of these cams being a fine switch, while the other is a coarse switch. Assuming that destination one has been selected and therefore that the navigation and destination select switches 118 and 115, respectively, (FIG. 2) are in the positions illustrated. Then a destination select relay DS1 will be energized over the circuit beginning at a D.C. bus bar 311 and going directly to destination select switch 115, and from there to one side of the relay DS1, the other side of which is grounded as illustrated. Energization of relay DS1 will open contacts DS1-1 and therefore prevent relays DS3 and DS2 from being energized. At the same time, contacts DS4-1 will remain closed since relay DS4 will not be energized on account of relay DS3 remaining not energized. The circuit for relay DS5's energization may be traced beginning at a D.C. bus bar 313 and going to contacts DS4-1, and then to one side of the relay DS5 the other side of which is connected to ground as illustrated. Now when the range from the craft to destination one becomes less than the predetermined amount, a circuit will be completed via the cam actuated switches just described and may be traced as follows: From a D.C. bus bar 315 (FIG. 3) to the contacts of switch SW10 now closed, and from there to contacts DS5-2. Then from there to the contacts of coarse switch SW15 and from there to the contacts of fine switch SW16, to contacts DS3-4 and from there to one side of a short range computer relay SRCC1 the other side of which relay is grounded as illustrated. Since relay SRCC1 is energized, all the remaining short course computer relays SRCC4, SRCC3 and SRCC2 will also be energized. The circuit for energization of these relays may be traced from D.C. bus bar 313 (FIG. 2) to contacts SRCC1-3 and then to one side of each of relays SRCC2 and SRCC3, both of which have the other side grounded as illustrated. Then upon energization of relay SRCC3 contacts SRCC3-4 will be closed and circuit for energizing relay SRCC4 will be completed. The solution of Equation 10 has been fully explained above, but the detailed circuits involved will now be traced. The signal from a potentiometer P1 (FIG. 11) that represents the difference in latitude ($\lambda D_1 - \lambda_p$) may be traced from the slider of potentiometer P1 to the contacts DS5-3 (now closed) and from there to contacts SRCC3-1, and then to the input connection 265 of resolver amplifier ARN6. The output of this amplifier ARN6 is then fed to one side of the winding 258 (FIG. 12) of resolver KYR5, while the other side of this winding 258 is connected to a signal ground as illustrated. At the same time, the signal from potentiometer P4 that represents the longitude difference ($\phi D_1 - \phi_p$) is fed from the slider potentiometer P4 (FIG. 11) to contacts DS4-4 and then to contacts SRCC3-3, and from there to contacts SRCC1-4 (FIG. 10) (now closed left as viewed in FIG. 10), then to contacts SRCC4-1, then to contacts DS1-1 (now closed to the left as viewed in FIG. 10), and then to contacts DS5-1, then to the input connection 255 of resolver amplifier ARN7. The output of this amplifier ARN7 then is fed to contacts SRCC2-1 (now closed to the left as viewed in FIG. 10), and from there to contacts DS2-4 (closed as illustrated) then to contacts SRCC2-4 and from there to one side of the stator winding 240 of resolver KYR1 the other side of which winding is connected to signal ground as illustrated. As explained above, the rotor of resolver KYR1 is positioned corresponding to the latitude of destination one and the output from a rotor winding of this resolver represents ($\phi D_1 - \phi_p$) cos $\lambda D_1$. The circuit for this signal may be traced from signal ground 248 to one side of the rotor winding 244 and then from the other side of rotor winding 244 the circuit continues to contacts DS3-2 and then to contacts SRCC3-2 (FIG. 11) and then to the input connection 263 of isolation amplifier ARN5. The output of this amplifier ARN5 then is fed to the stator winding 257 (FIG. 12) of tangent resolver KYR5, the other side of which stator winding 257 is connected to a signal ground as illustrated. The remainder of the circuits involved are concerned with the tangent solution of Equation 10 and will not be repeated since they are identical with tangent solution previously traced with regard to the solution of Equation 8. Likewise, the solution of Equation 9 is again identical as to the circuits involved with the solution of Equation 6 and therefore these circuits need not be again traced in detail.

AUTOMATIC CROSSHAIR POSITIONING

With regard to the detailed circuits involved in automatic crosshair positioning, the elements included in the navigation system are few and the circuits are simple. The equations to be solved in automatic crosshair positioning are Equations 11 and 12 set forth above and signals corresponding to the quantities $(\lambda D_1 - \lambda_p)$ and $(R_{s1} - R_{n1})$ are to be obtained from the navigation system. The signal for $R_n$ is obtained from the auxiliary computer. The circuits involved are as follows: The signal representing $(\lambda D_1 - \lambda_p)$ is obtained from potentiometer P1 (FIG. 11). Since the automatic crosshair positioning will not be employed unless the destination is less than a predetermined distance, as indicated heretofore with regard to the short range course computation, the relays will be in the same condition as indicated in the detailed description of the circuits involved in short range course computations.

It should be noted that in order to accomplish an automatic crosshair positioning of the sighting system a certain condition must be fulfilled; namely, that the distance to go as measured by the navigation computer mechanism, must be less than a predetermined distance, e.g. 40 miles. When this condition exists the distance to go amplifier DGN (FIG. 3) will energize a relay within the amplifier which in turn will energize distance to go relay DG the circuit for which may be traced from the output of amplifier DGN to contacts SRCC4-2 and from there to one side of the coil of the DG relay the other side of which is connected to ground as illustrated. Energization of the distance to go relay DG will close contacts DG2 and DG1 that will set up two separate circuits. One of these circuits may be traced from a D.C. source that may be any convenient voltage, but that is indicated as being 26 volts D.C. From this source an indicator light circuit may be traced beginning at the source and going to contacts DG2 and then to an automatic crosshair laying indicator light 318. The other side of this light is grounded as illustrated. The other circuit sets up the energization of automatic crosshair laying relays ACL1 through ACL4 and may be traced as follows: from the 26 volt D.C. supply indicated, to contacts DG1, from there to a terminal 319 which introduces the circuit to a control panel circuit illustrated, and then from the control panel the circuit continues via terminal 320 to contacts AF4-3 and from there to one side of each of the 4 relays ACL1 through ACL4, the other side of each of these relays being connected to ground as illustrated. Therefore, it may be observed that all of the ACL relays will now be energized during the automatic crosshair laying or positioning operation.

The signal $(\lambda D_1 - \lambda_p)$ may be traced from the slider of potentiometer P1 (FIG. 11) to contacts DS5-3, and from there over a circuit indicated by an arrow marked AF1-4. This circuit continues from the arrow marked To DS5-3 (FIG. 8), and goes to contacts ACL1-4 and from there directly to a terminal 317 of the auxiliary computer relay box 136.

The circuit for the signal representing $(R_{s1} - R_{n1})$ may be obtained as explained above from the north and south potentiometers P8 and P9 (FIGS. 1b and 9). The circuit for this signal may be traced on the detailed circuit diagram by referring to FIG. 9 and beginning at a terminal 321 of the auxiliary computer 136 and going to one side of the potentiometer P8 while the other side of this potentiometer is connected to ground as illustrated. Then the circuit including the output of potentiometer P8 may be traced from the slider of this potentiometer to a junction 322 and then directly to one side of the south potentiometer P9. Adding the signal from potentiometer P8 in series with potentiometer P9, the circuit for both signals may then be continued, from slider of potentiometer P9 to a resistor R92 (FIG. 8) and then from the other side of resistor R92 the signal circuit may be traced to contacts ACL1-2 and from there directly to a terminal 323 of the auxiliary relay box 136.

The only circuit for the signal $R_n$ is that involving a scale factor change in the amplitude of the signal voltage. The signal is fed from a terminal 324 to contacts AF2-4, then to contacts ACL3-4 (now in the upper position as viewed in FIG. 8), and then to one side of a transformer winding 316 of an equalizer 325. A secondary winding 253 of the equalizer 325 has the proper turns ratio with respect to the primary winding 316, and there is a resistor 251 with a variable tap for scale factor change connected across this secondary winding 253 for making a fine adjustment of the scale factor. The circuit for $R_n$ is continued from the tap resistor 250 to contacts ACL3-3, and from there to a terminal 249 on the auxiliary computer.

The remainder of the circuits involved in the automatic crosshair positioning, with regard to the solution of Equation 11 are to be found in the auxiliary computer relay box along with all other of the auxiliary computer circuits not shown, as was indicated above.

With regard to the solution of the longitude crosshair positioning as set forth in Equation 12 the circuits for the expression $(R_{w1} - R_{e1})$ correspond to those for $(R_{s1} - R_{n1})$, except that the east and west potentiometers P6 and P7 are involved in place of the north and south potentiometers P8 and P9. This circuit may be quickly traced beginning at the slider of potentiometer P6 (FIG. 9) and going to one side of potentiometer P7, then from the slider of P7 to a resistor R90. From the other side of resistor R90 the signal is fed to contacts ACL1-1, and from there to a terminal 247 of the auxiliary computer.

The expression $(\phi D_1 - \phi_p) \cos \lambda D_1$ is obtained in the same manner as previously. This signal is an output from the resolver KYR1 and the circuits involved with this signal may be traced as follows: Beginning at the slider of potentiometer P4 (FIG. 11) the circuit goes directly to contacts DS4-4 and then to contacts SRCC3-3 and from there to contacts SRCC1-4 (FIG. 10), then to contacts SRCC4-1, contacts DS1-4 (now to the left as viewed in FIG. 10), then to contacts DS5-1, and from there to the input terminal 255 of resolver amplifier ARN7. From the resolver amplifier ARN7 the circuit continues to contacts SRCC2-1 (now to the left as viewed in FIG. 10) and then to contacts DS2-4 and to contacts SRCC2-4, then to one side of the stator winding 240 of resolver KYR1, the other side of which winding is connected to signal ground as illustrated. The input signal to this winding 240, therefore, is the $(\phi D_1 - \phi_p)$ as obtained from potentiometer P4 and the output signal from winding 244 of resolver KYR1 will be the $(\phi D_1 - \phi_p) \cos \lambda D_1$. This signal will be fed over the circuit beginning at signal ground and going to one side of winding 244. Then from the other side of winding 244 to contacts DS3-2, and then to the circuit indicated by the arrow marked "From AF1-3." This circuit continues in FIG. 9 from the arrow marked "To DS3-2" to contacts ACL1-3, and from there to a terminal 243 of auxiliary computer 136.

The circuit for the $R_e$ signal is like that for the $R_n$ signal but goes through a different equalizer 221 (FIG. 9). The circuit may be readily traced beginning at a terminal 219 and ending at another terminal 217.

AUTOMATIC FIX TAKING

The details of the complete circuits involved in the operations employed during automatic fix taking as described above, will now be explained with reference to the detailed electric circuits as shown in FIGS. 2 through 14. When an automatic fix is to be taken the navigation mode switch 118 (FIG. 2) will be placed to its AF position and therefore the automatic fix relays AF1 through AF4 will be energized by means of the obvious circuit. At the same time, navigate relays NA1, NA2, and NA3 will be de-energized since their circuit will no longer be completed. The distance to the destination must be less than the given distance, e.g. 40 miles, as well as less than the predetermined range in terms of latitude and longitude as set up when the short range course computations are made. Therefore, the short range course computer relays SRCC1 through SRCC4 will still be energized, and assuming that we are still using destination one, the same combination of destination select relays as previously set forth will be energized. Since the operation to be performed is that of taking an automatic fix, the circuit for energizing automatic crosshair laying relays ACL1 through ACL4 will no longer be energized, and as previously stated automatic fix relays AF1 through AF4 will be energized.

The $R_n$ signal that is obtained in the auxiliary computer as explained above will be fed from the auxiliary computer via the terminal 324 (FIG. 8) to contacts AF2–4 which will be in their upper position as viewed in FIG. 8 and then to one side of the input winding of the equalizer 325 that is used for changing the scale of the signal voltage. The circuit then continues from the output of equalizer 325 to contacts AF3–4, and from there to an input terminal 327 of servo amplifier ASN1. The signal then continues from servo amplifier ASN1 to the control winding 237 of servo motor M10 in the same manner as previously traced for the signal (Vn) from the auxiliary computer, representing the north-south component of ground travel.

The other two terms of Equation 11 are also introduced to this servo amplifier ASN1 in such a manner that they are added together and the $R_n$ signal is subtracted from their sum. The circuits for introducing the other two quantities, viz: $(\lambda D_1 - \lambda_p)$ and $(R_{s1} - R_{n1})$ are as follows: The signal $\lambda D_1 - \lambda_p$ is obtained as before from potentiometer P1 (FIG. 11). This signal is now fed from the slider of potentiometer P1 to contacts DS5–3 and then over a circuit as indicated by the arrow marked AF1–4. Then this circuit is continued from the arrow (FIG. 8) marked "To DS5–3," to contacts AF1–4, and from contacts AF1–4 the circuit continues to contacts AF3–3 then to contacts MF–2 and on to contacts NA3–2, from which contacts the circuit continues to the input connection 236 of servo amplifier ASN1.

The third signal which is summed up at this servo amplifier ASN1 is the signal representing $R_{s1} - R_{n1}$. This signal originates in the same manner as with regard to automatic crosshair positioning, and the circuit for this signal may be traced as follows: From the slider of north potentiometer P8 (FIG. 9) to the junction point 322 connected to one side of south potentiometer P9, and then continuing from the slider of south potentiometer P9 to one side of resistor R92 (FIG. 8), and from the other side of resistor R92 to contacts AF1–2, and then directly to an input connection 329 of the same servo amplifier ASN1.

In a similar manner the solution of Equation 12 involves the same signals as were used in connection with automatic crosshair positioning but these signals are now combined as three inputs to the servo amplifier ASN2 in order to actuate the east-west servo motor system for producing a null or minimum signal condition such that the navigation system is slaved to the auxiliary computer in the manner previously described. These circuits need not be traced with much explanation but will be followed at least to the inputs to amplifier ASN2.

The $R_e$ signal is fed from the terminal 219 (FIG. 9) to contacts AF2–3 (now closed to the left as viewed in FIG. 9), and then to the input of the equalizer 221. From the output of the equalizer 221 the signal is fed to contacts AF3–2, and then to an input connection 233 of the servo amplifier ASN2.

The $(R_{w1} - R_{e1})$ signal may be traced from slider of east potentiometer P6 (FIG. 9) to one side of west potentiometer P7, and then from the slider of potentiometer P7 to one side of the resistor R90. From the other side of the resistor R90 the circuit continues to contacts AF1–1, and then to another input connection 232 of amplifier ASN2.

The $(\phi D_1 - \phi_p) \cos \lambda D_1$ signal may be traced from potentiometer P4 (FIG. 11) to contacts DS4–4, then to contacts SRCC3–3, then to contacts SRCC1–4 (FIG. 10) (now left as viewed in FIG. 10), then to contacts SRCC4–1, then to contacts DS1–4 (now left as viewed in FIG. 10) then contacts DS5–1, then to the input connection 255 of resolver amplifier ARN7. From the output of amplifier ARN7 the circuit continues to contacts SRCC2–1 (now left as viewed in FIG. 10), then to contacts DS2–4, then to contacts SRCC2–4, then to one side of the stator winding 240 of resolver KYR1, the other side of which is grounded. The output of rotor winding 244 of this resolver is then the longitude difference multiplied by the cosine of the destination. This circuit may be traced from ground to one side of the winding 244, then from the other side of the winding 244 to contacts DS3–2, then to the circuit indicated by the arrow marked "From AF1–3." This circuit picks up at the arrow (FIG. 9) marked "To DS3–2" and continues to contacts AF1–3, then to contacts AF3–1, then to contacts MF–1, then to contacts NA3–1, then to the input connection 239 of amplifier ASN2.

WIND CORRECTION

The detailed circuit for the wind correction operation may be traced by referring to FIG. 3. The east-west component of the wind is introduced from the auxiliary computer via a terminal 331 marked $W_E$, and goes directly to one side of a rotor winding 333 of the resolver KYR8. The other side of winding 333 is connected to signal ground as illustrated. Likewise the other component of the wind, which is the north-south component and is designated $W_N$, is introduced from the auxiliary computer 136 via a terminal 335 and then directly to one side of another rotor winding 337 of the resolver KYR8, while the other side of this winding 337 is connected to the same ground as illustrated. Then the corrected wind component signals are returned to the auxiliary computer 136 via the circuits which may be followed beginning at signal ground and going to one end of a stator winding 339 of the resolver KYR8, then from the other side of winding 339 the circuit goes directly to a terminal 341 on the auxiliary computer 136. The other corrected component of the wind is generated in another stator winding 343 of the resolver KYR8. This circuit may be traced beginning at signal ground going to one side of the winding 343, then from the other side of this winding, the circuit goes directly to a terminal 345 of the auxiliary computer 136. Now it will be readily apparent that as explained above, the wind corrections are introduced in increments which begin whenever the wind clutch 177 is engaged following an appropriate disengagement, so that the correction is introduced continuously by a connection to the present longitude shaft until the wind clutch 177 is again disengaged which allows the rotor of resolver KYR8 to be returned to its zero or original position.

OTHER OPERATIONS ACCOMPLISHED BY THE NAVIGATION SYSTEM

As was explained previously, there are other operations which may be accomplished by means of our navigation system, and included among these is manual fix taking. The detailed circuits involved in taking a manual fix will not be traced because it is sufficient to point out that when a manual fix is to be taken, navigation mode switch 118 (FIG. 2) will be positioned to its MF position, and therefore a circuit will be completed to energize a manual fix relay MF. This relay will then set up the proper circuits for accomplishing a manual fix, and the operations involved will be clear to one skilled in the art upon noting the status of the various circuit controlling relays, the operations of which have been clearly described.

It will be noted that FIG. 14 illustrates a number of synchro receivers and transmitters without any circuit connections thereto. These are the various coarse and fine synchros which may be employed for setting up an automatic flight program if desired, however, no such program has been included in this description as part of the navigation system of our invention. These elements therefore, are mere auxiliary equipment. Also included on FIG. 14 are two generators G1 and G6 which are the ordinary tachometer generators included with servo motors, but which in this case are not being employed with the motor to which they are physically attached since the motor in each of these two cases is not being used in a servo loop.

FIGS. 15, 16, 17, and 18 are detailed electric circuit diagrams of the various amplifiers as used throughout the system. The details of operation of these amplifiers are standard and not material to our invention per se. Therefore, no detailed description of these figures is deemed necessary. It is pointed out, however, that in FIG. 18, the distance to go amplifier (DGN) illustrates a coil DGA of an internal distance to go relay in the amplifier circuit, and shows a mechanical connection in a schematic manner from this coil to contacts DGA–1 activated thereby.

In order to facilitate the following of the electrical circuit diagrams, it is to be noted that each of the sheets containing FIGS. 2 through 14 of the drawings is divided into four sections. The upper half of each of these sheets of drawings is designated "A" while the lower half of each sheet is "B." Each sheet is divided vertically into two parts, with these halves numbered 1 through 26 consecutively. So that, for example, FIG. 2 is divided into quadrants, "A" representing the upper two quadrants, while "B" represents the lower two quadrants, and "1" represents the left hand two quadrants while "2" represents the right hand two quadrants. Using this means of locating various elements of the circuits disclosed, the following list gives the location of most of the elements as described with respect to the electrical circuit diagrams of FIGS. 2 through 14.

RELAYS

| Name | Reference number | Coil location | Contact locations (four sets of contacts on each relay) | | | |
|---|---|---|---|---|---|---|
| | | | 1 | 2 | 3 | 4 |
| West | W | 7A | 7A | | 8A | 7A |
| West limit | WL | 7A | 7A | 5A | 11A | |
| East | E | 7A | 7A | | 8A | 8A |
| East limit | EL | 7A | 7A | 5A | | |
| West clutch 1 | WC1 | 7A | 7A | 7A | 7A | 8A |
| West clutch 2 | WC2 | 8A | 8A | 8A | 11A | 11A |
| Read clutch 1 | RC1 | 8A | 8A | 7A | 7A | 8A |
| Read clutch 2 | RC2 | 8A | 7A | 6A | 8A | |
| Carry | C | 8A | 8A | 11A | 11A | |
| $\phi_D$ | $\phi_D$ | 8A | 8A | 8A | | |
| $\phi_D$ set | $\phi_D$S | 8A | 8A | 8A | | |
| Latitude clutch 1 | LC1 | 5A | 5A | 5A | 5A | 5A |
| Latitude clutch 2 | LC2 | 6A | 5A | 6A | 8A | 8A |
| South | S | 5A | 5A | 5A | 5A | 6A |
| South limit | SL | 5A | 5A | 5A | | |
| South clutch 1 | SC1 | 5A | 5A | 6A | 5A | 5A |
| South clutch 2 | SC2 | 5A | 5A | 5A | | |
| North | N | 6A | 6A | 6A | 6A | 5A |
| North limit | NL | 6A | 6A | 5A | | |
| North clutch 1 | NC1 | 6A | 6A | 5A | 5A | 5A |
| North clutch 2 | NC2 | 6A | 6A | 7A | | |
| Delay | D | 5A | 5A | 6A | 7A | 7A |
| Start | ST | 5A | 5A | 5A | 6A | 8A |
| Limit | L | 3A | 15A | | | |
| Distance to go | DG | 4A | 4A | 4A | | |
| Manual fix | MF | 2A | 15A | 13A | 22A | 15A |
| Navigate 1 | NA1 | 2A | 15A | 15A | 15A | 15A |
| Navigate 2 | NA2 | 2A | 14A | 14A | 14A | 14A |
| Navigate 3 | NA3 | 2A | 15A | 13A | | |
| Automatic fix 1 | AF1 | 2A | 16A | 14A | 15A | 13A |
| Automatic fix 2 | AF2 | 2A | 17A | 17A | 16A | 13A |
| Automatic fix 3 | AF3 | 2A | 15A | 16A | 13A | 13A |
| Automatic fix 4 | AF4 | 2A | 15A | 14A | 4A | 22A |
| Automatic crosshair laying 1 | ACL1 | 4A | 16A | 14A | 15A | 13A |

RELAYS—Continued

| Name | Reference number | Coil location | Contact locations (four sets of contacts on each relay) | | | |
|---|---|---|---|---|---|---|
| | | | 1 | 2 | 3 | 4 |
| Automatic crosshair laying 2 | ACL2 | 4A | 17A | 17A | 17A | 17A |
| Automatic crosshair laying 3 | ACL3 | 4A | 16A | 16A | 13A | 13A |
| Automatic crosshair laying 4 | ACL4 | 4A | 2A | | | |
| Destination select 1 | DS1 | 2A | 2A | | | |
| Destination select 2 | DS2 | 2A | 17A | 17A | 18A | 18A |
| Destination select 3 | DS3 | 2A | 2A | 18A | 18A | 3A |
| Destination select 4 | DS4 | 2A | 2A | 17A | 20A | 20A |
| Destination select 5 | DS5 | 2A | 17A | 3A | 20A | |
| Short range course computer 1 | SRCC1 | 3A | | | 2A | 17A |
| Short range course computer 2 | SRCC2 | 2A | 17A | 17A | 18A | 18A |
| Short range course computer 3 | SRCC3 | 2A | 20A | 20A | 20A | 2A |
| Short range course computer 4 | SRCC4 | 2A | 17A | 4A | | |

AMPLIFIERS

| Name | Reference number | Location |
|---|---|---|
| Resolver | ARN-1 | 19B |
| Do | ARN-2 | 24B |
| Do | ARN-3 | 24B |
| Do | ARN-4 | 19B |
| Do | ARN-5 | 20B |
| Do | ARN-6 | 20B |
| Do | ARN-7 | 17B |
| Servo | ASN-1 | 14B |
| Do | ASN-2 | 15B |
| Do | ASN-3 | 21B |
| Do | ASN-4 | 22B |
| Tachometer | ATN-1 | 22B |
| Do | ATN-2 | 21B |
| Distance to go | DGN-1 | 4B |

ELECTROMAGNETIC ROTATIONAL DEVICES

| Name | Reference number | Location |
|---|---|---|
| Control transformer | BrCT-1 | 22B |
| Differential generator | KDG-1 | 22B |
| Motor generator | MG-1 | 7 & 26B |
| Do | MG-2 | 23B |
| Do | MG-3 | 24B |
| Motor | M-4 | 6B |
| Do | M-5 | 5B |
| Motor generator | MG-6 | 9 & 27B |
| Motor | M-7 | 9B |
| Do | M-8 | 9B |
| Motor generator | MG-9 | 15B |
| Do | MG-10 | 14B |
| Motor | M-11 | 8B |
| Resolver | KYR-1 | 18B |
| Do | KYR-2 | 18B |
| Do | KYR-3 | 19B |
| Do | KYR-4 | 23B |
| Do | KYR-5 | 21B |
| Do | KYR-6 | 17B |
| Do | KYR-7 | 17B |
| Do | KYR-8 | 4B |
| Synchro receiver | KSR-5 | 27B |
| Do | KSR-6 | 27B |
| Synchro transmitter | KST-7 | 26B |
| Do | KST-8 | 26B |
| Synchro receiver | KSR-1 | 25B |
| Do | KSR-2 | 25B |
| Synchro transmitter | KST-3 | 25B |
| Do | KST-4 | 25B |

MISCELLANEOUS DEVICES

| Name | Reference number | Location |
|---|---|---|
| Equalizer | (Equalizer-1) 32I | 13B |
| Do | (Equalizer-2) 22I | 13B |
| Potentiometer | P-1 | 2JB |
| Do | P-2 | 2JB |
| Do | P-3 | 13B |
| Do | P-4 | 2JB |
| Do | P-5 | 2JB |
| Do | P-6 | 17B |
| Do | P-7 | 16B |
| Do | P-8 | 16B |
| Do | P-9 | 16B |

MISCELLANEOUS DEVICES—Continued

| Name | Reference number | Location |
|---|---|---|
| Circuit breaker | CB-1 | 7B |
| Do | CB-2 | 7B |
| Do | CB-3 | 6B |
| Do | CB-4 | 5B |
| Do | CB-5 | 5B |
| Switch | SW-6 | 3B |
| Do | SW-7 | 3B |
| Do | SW-8 | 3B |
| Do | SW-9 | 3B |
| Do | SW-10 | 3B |
| Do | SW-11 | 3B |
| Do | SW-12 | 3B |
| Circuit breaker | CB-13 | 11B |
| Do | CB-14 | 8B |
| Switch | SW-15 | 3B |
| Do | SW-16 | 3B |
| Do | (Auto. cross. lay.) "ACL" | 4A |
| Do | (Dest. sel.) "115" | 2B |
| Do | (Nav. mode) "118" | 2B |
| Do | $\lambda_p$ Set | 5B |
| Do | $\lambda D_1$ Set | 6B |
| Do | $\lambda D_2$ Set | 7B |
| Do | $\phi_p$ | 8B |
| Do | $\phi D_1$ | 9B |
| Do | $\phi D_2$ | 9B |
| Circuit breaker | CB17 | 12B |

MECHANICAL ELEMENTS OF THE SYSTEM

Latitude Unit

Figure 25:
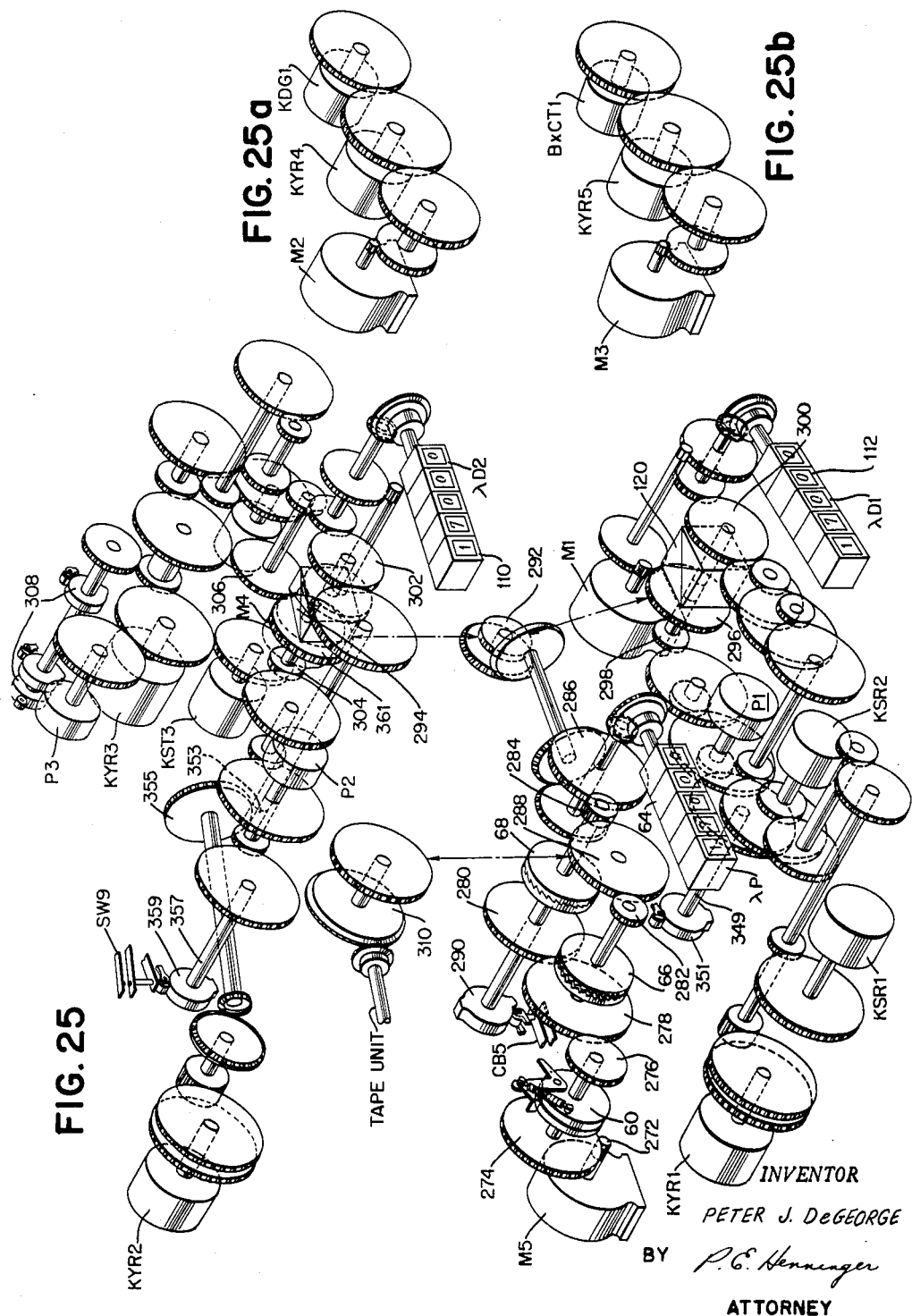
FIG. 25 is a mechanical schematic in perspective, showing the interrelation of the elements of the latitude section of the navigation system.

Referring to FIG. 25, it will be observed that the mechanical elements included in the latitude unit 59 (FIG. 1a) are schematically shown in perspective giving their mechanical interrelatoin. Beginning at the power input motor M5, it will be observed that this motor has a pinion 272 driving a gear 274 that is securely fastened to its shaft, as by using a key or by having the gear sweated onto its shaft.

Throughout these mechanical descriptions, it will be assumed that the various gears and pinions are secured fast to the shaft upon which each is mounted, so that the shaft rotates integrally with the gears fastened thereto, unless it is indicated otherwise.

Gear 274, therefore, drives one side of the one rotation clutch 60. Since motor M5 is continuously rotating in one direction, the input side of clutch 60 is being continuously driven thereby. The output of the one rotation side of clutch 60 is fastened to a shaft which carries a gear 276. Gear 276 is meshed with a gear 278 which in turn meshes with another similar gear 280. Gears 278 and 280 have fastened to their shafts the driven side of the north-south clutches 66 and 68, respectively. These clutches 66 and 68, together with the gearing involved produce a reversal of the direction of drive obtained from the power motor M5. As explained in the electrical circuit description clutches 66 and 68 are exclusively energized so that only one of them may be engaged at a time.

The driving connection continues from the output of either clutch 66 or clutch 68 via a pinion 282, or via another wide faced pinion 284. If clutch 68 is engaged, pinion 284 will be driven in a given direction and will drive a gear 286, which meshes therewith in a given direction. The driving connections are continued from this gear 286. If clutch 66 on the other hand is engaged, pinion 284 will be driven in the opposite direction since the power will be transmitted via pinion 282 and a gear 288 meshes therewith, which gear 288 also meshes with the pinion 284.

Carried by the same shaft with pinion 284 and gear 280 is a two-lobe cam 290 which actuates the end of cycle circuit breaker CB5 as previously described in the electrical description.

The reversably driven gear 286 has connected thereto at one end of its shaft ($\lambda_p$) the present latitude counter, or indicator 64, e.g. by bevel gears as illustrated. Indicator 64 indicates the present latitude in a continuous manner, as clearly described above. As mentioned above, this indicator 64 is—like all of the destination and present position latitude and longitude indicators—an ordinary revolution counter having its gear ratios and indicator calibrations such that latitudes and longitudes may be indicated in degrees and minutes.

Also being driven from the shaft carrying gear 286 is a gear 292, with an intervening chain of direction changing gears clearly illustrated. Gear 292 meshes with one input of each of the two differentials 120 and a differential 294 which are used in connection with the two destination indicators and their systems.

Tracing the driving connection from gear 292, the connection proceeds as follows: input gear 296 of differential 120 is connected in the ordinary manner for a mechanical differential to an output gear 298. Gear 298 meshes with a series of gears as illustrated and drives the potentiometer P1. At the same time this gear train continues and drives a shaft 349 which carries a cam 351 that controls switch SW10 (FIG. 3).

Connected to the other input of differential 120, i.e. gear 300, is the destination indicator 112 which is designated ($\lambda D_1$). Also directly geared to this indicator 112 is a set motor M1 which may be employed to set the desired indication on the indicator 112. It will be observed that gear 300 also has a chain of gears meshing therewith which are directly connected to coarse and fine synchro receivers KSR2 and KSR1, as well as to the resolver KYR1. The resolver KYR1 has its rotor positioned corresponding to the latitude of destination one, as was explained above, because of the direct mechanical connection with the indicator 112.

A similar set of connections may be traced from the driven gear 292 to the system including the indicator 110 for the latitude of destination 2 ($\lambda D_2$). Gear 292 meshes with one input gear of the differential 294 while another input gear 302 is directly connected with the indicator 110 in a similar manner as was the case with the indicator 112 for destination one. Likewise, there is a set motor M4 which is directly geared to the indicator 110. There are no synchro receivers in connection with destination two, however, but there is the resolver KYR2 which is directly connected via the illustrated train of gears with differential input gear 302. This train of gears includes a worm 353 and a worm gear 355 meshing therewith; the rest of the train is obvious.

The output of differential 294 drives from a gear 304 which is directly connected via the illustrated train of gears to a potentiometer P2. Similarly, to the potentiometer P1, P2 is used to produce the signal corresponding to the difference between present position latitude and the latitude of destination two. Also connected with an extension of the same train of gears is a shaft 357 which carries a cam 359 which, in turn, actuates the switch SW9.

Meshing with the other side of input gear 361 of the differential 294 (from driven gear 292) is a chain of gears commencing with a gear 306 and directly connected to position the coarse and fine synchro transmitters KST4 and KST3 which may be used for remote $\lambda_p$ indication, as well as to position the resolver KYR3 and the potentiometer P3 which are used in the system as explained previously. Also driven from another branch of the same train of gears are three cams 308. These cams act to control the switches SW6, SW7 and SW8 (FIG. 3) which act in the circuits as previously described.

There is also shown in FIGS. 25a and 25b the two servo systems one of which is used in connection with determining the heading necessary for the great circle course, or the short range course. The other is used in determining the drift angle σ. In each of these systems the generator is not illustrated but only the motor with which it is associated. It will be observed that motor M2 (FIG. 25a) is directly geared to each of the resolver KYR4 and the differential generator KDG1. In a similar manner the motor M3 (FIG. 25b) is directly connected to drive the resolver KYR5 and the control transformer B$x$CT1.

It will be noted that there is a driving connection from gear 288 to a group of gears 310 which are connected to the input of the tape unit 70 and therefore position the tape unit at the same time and in a corresponding manner, as the present position latitude indicator 64.

Longitude Unit

Figure 24:
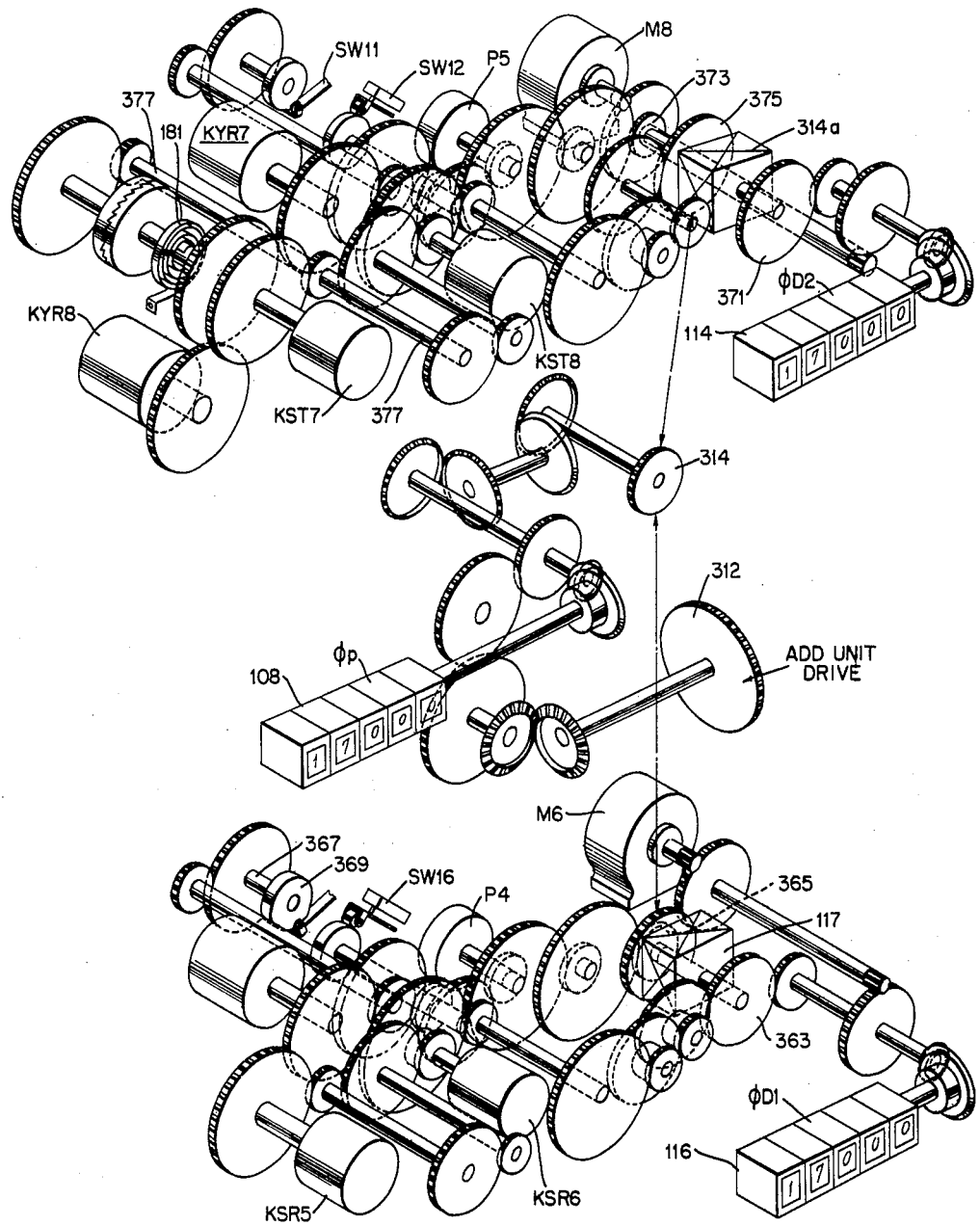
FIG. 24 is a mechanical schematic in perspective, showing the interrelation of the elements of the longitude section of the navigation system.

The mechanical elements of the longitude unit are in general similar to those described above in connection with the latitude unit. However, the longitude unit 75 as shown in FIG. 1c includes the add unit 100. The mechanical layout of the add unit will be separately described so it will suffice to note here that the driving power is supplied from the output of the add unit 100 which drives a gear 312 (FIG. 24) that is directly connected via the chain of gears illustrated to the indicator 109 which indicates present position longitude ($\phi_p$). Also connected via a continuing train of gears from the gear 312 is a gear 314 which meshes directly with the inputs to longitude differentials 117 and 314a. The details of the elements in connection with these differentials 117 and 314a are quite similar to the corresponding elements for latitude differentials 120 and 294 and therefore these details will only be reviewed briefly here. It will be noted that in connection with destination 1 (longitude indicator 116) there are the corresponding synchro receivers KSR5 and KSR6 directly connected by a train of gears to one input gear 363 of differential 117. Also connected to this input gear 363 is the $\phi D_1$ indicator 116 as well as its set motor M6.

Connected to an output gear 365 of the differential 117 is a train of gears leading directly to the potentiometer P4, and then continuing to the resolver KYR6. In between these two, an extension of one shaft drives the fine cam operated switch SW16 while a branch of the gear train drives a shaft 367 that carries a cam 369 which actuates the coarse switch SW15.

In connection with destination 2 (longitude indicator 114), there is the corresponding set motor M8 directly geared to the $\phi D_2$ indicator which is also directly geared to an input gear 371 of the differential 314a. An output gear 373 of the differential 314a drives the illustrated gear train that positions the potentiometer P5 and then continues on to drive the resolver KYR7. In between these, there are connections to the coarse and fine ($\phi D_2 - \phi_p$) switches SW11 and SW12 the same as for destination 1.

Also connected to driving gear 314 via a differential input gear 375 is a train of gears connected to the $\phi_p$ synchro transmitters KST8 and KST7, as well as to the input of the wind clutch 177 by a branch connection taken off at a shaft 377. The wind clutch, when engaged drives the resolver KYR8 which has a return means that is schematically illustrated by a coiled spring 181. The details of this wind clutch unit will be described below.

The differentials employed in the latitude and longitude units of our invention, may be a type which is illustrated in detail in FIG. 37. Such a differential has two input gears 326 and 328 each of which is integrally attached to the bevel gear 330 and 332 respectively. These two pairs of gears are freely rotatable about an output shaft 334 which is illustrated as extending all the way through the differential but which has a reduced diameter section at the center thereof where a pair of cross shafts 336 are attached. As is usual with this style differential, each of the input bevel gears 330 and 332 meshes with a set of four bevel gears 338 which are carried in a freely rotatable manner on the cross shafts 336. It will be clear therefore that the usual differential action will be produced so that output shaft 334 will rotate in a differential manner as determined by the rotations given to the input gears 326 and 328.

Latitude and Longitude Directional Clutch Units

The details of the mechanism involved in the direction reversing longitude clutch unit are illustrated in FIGS. 35 and 36. These figures include a third clutch unit which is the set clutch 234 of the longitude unit. However, either pair of the clutches that have output gears meshing with one another includes the same mechanism as that which is used in the latitude unit for the north and south clutches 66 and 68. Each of the three clutch units is identical in construction and the mechanical interrelation has been previously explained so that the details of one clutch unit only, need be explained in detail. Referring to FIG. 36, the lower clutch unit is composed of an input gear 410 which is carried on a ball bearing as illustrated, and has integral therewith a cup shaped edge 412 that contains appropriate serrations on its edge. A spring 414 tends to push against the input gear 410 so that it disengages the serrated edge 412 from correspondingly serrated edge 416 of a cup shaped member 418. The cup shaped member 418 is pinned or otherwise securely fastened to a shaft 420 which also carries an output gear 422 securely fastened as by being pinned, to the shaft 420. Gear 422 has a hub portion 424 which fits within a hollow portion or recess 428 of an electromagnetic coil 426. The magnetic coil 426 when energized tends to draw the hub portion 424 along with its gear 422 farther into the recess 428, and therefore moves the shaft 420 (to which gear 422 is fastened) to the left as viewed in FIG. 426 and carries at the same time the cup shaped member 418 to the left, engaging the serrated edges 416 and 412 to provide a positive connection from input gear 410 to output gear 422. The action of the reversing aspect has been previously considered in connection with the latitude and longitude units and needs no repetition.

The latitude clutches are similar in operation except that the clutches are engaged when the coils are not energized. The necessary mechanical changes that are involved are obvious.

Add Unit

Figure 28:
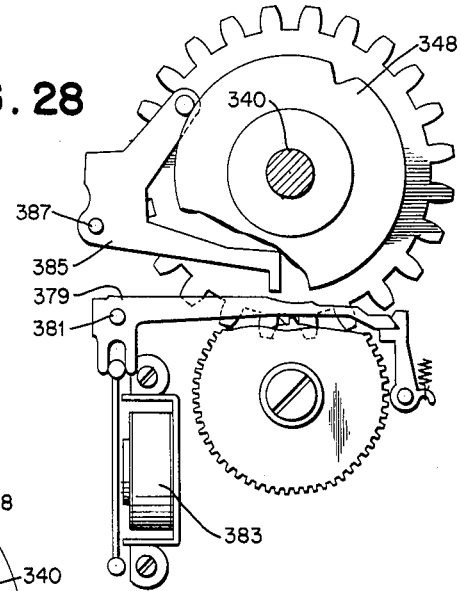
FIG. 28 is a schematic showing of the major elements of the 10's minutes digit counter mechanism.
Figure 29:
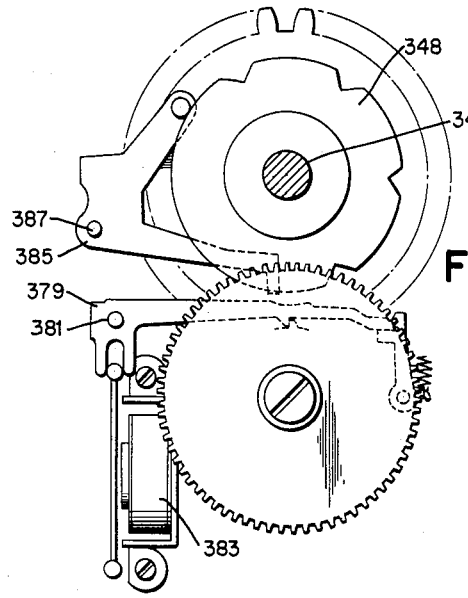
FIG. 29 is a schematic showing of the major elements of each of the counter mechanisms used for the units digits and for the tenths digits indications.
Figure 30:
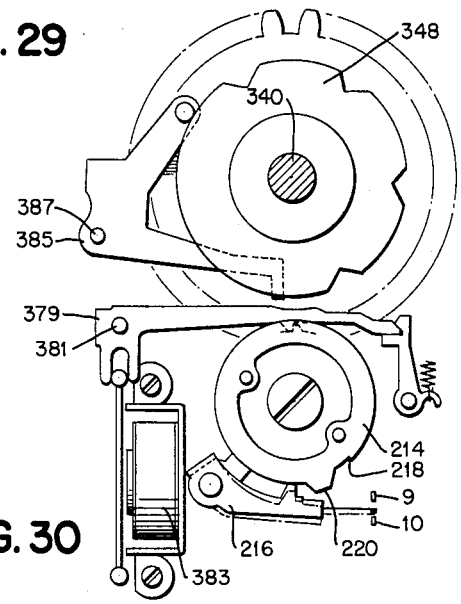
FIG. 30 is a schematic showing of the major elements of each of the counter mechanisms used for the east and west hundredths and thousandths digits indications.

The mechanical relationship of the various elements to be found in the add unit 100 are illustrated in FIG. 23 and the mechanical drive will be traced with reference to the mechanical time chart illustrated in FIG. 26. As previously explained in connection with the electrical circuit, it will be noted that there are seven individual counter elements which are all rotatably driven from a common shaft 340. As was pointed out previously, each counter element is a modified counter of the type disclosed in the Patent Number 2,328,653, issued September 7, 1953, to C. D. Lake et al. The details of such a counter element are not part of this invention per se, and it is merely necessary to understand that each counter element has a clutch controlled by an arm 379 (FIGS. 28, 29 and 30). This arm 379 is pivoted about a point 381, and will cause the clutch to be engaged at the next succeeding notch whenever a coil 383 is energized, so that the arm 379 is rotated counter clockwise. Then the clutch will remain engaged and cause an output shaft to be rotated, until a mechanical knock-off arm 385 is rocked clockwise about its pivot. It will be understood that the knock-off arm will cause clutch arm 379 to be rotated back clockwise to the position illustrated in FIGS. 28, 29 and 30 so that the clutch is again released and the output shaft no longer rotates. Also, it is pointed out that there is a knock-off cam 348 for each counter unit which acts to time the knock-off action of the arm 385 by reason of the fact that arm 385 is biased for clockwise rotation about its pivot 387 and restrained by a roller contacting the cam 348 as illustrated.

The shaft 340 is driven in a "one revolution per energization" manner by its connection from the driving motor M11 (FIG. 23) which is geared to a cross shaft 342 which in turn drives an input gear 344 that supplies rotational energy to the one revolution clutch 94. When the clutch 94 is energized the shaft 340 makes one complete revolution in the direction indicated by the arrow.

The 10-minute counter unit 346, is located nearest to the clutch 94 and it will be noted that this counter unit 346 has only one indentation in its knock-off cam 348. This corresponds with the mechanical time chart of FIG. 26 where it is indicated that the 10's minute knock-off cam has only one indentation at 255 degrees to 271 degrees of a revolution. Each of the other seven counter units has four indentations on its knock-off cam and the action is that which was clearly explained above. The mechanical output of the 10's minute counter is carried from its output shaft 350 to a gear 352 and then via a train of gears as illustrated to an input gear 354 of a differential 356. As has been previously indicated the gear ratios of this mechanical train have been so chosen that a minimum of inertia must be overcome upon the operation of the 10's minute counter.

The other input to differential 356 is driven by the output of the one minute counter 358 which rotates its shaft 360 and therefore the connected train of gears, via its gear 362, a predetermined amount. This train of gears from the one minute counter 358 drives another input gear 364 of the differential 356. The output of differential 356 drives a gear 366 which meshes with an input gear 368 of another differential 370. The other input of differential 370 is driven by the output from the 1/10 minute counter 372, which is mechanically separated from the other two counters (10's minute counter 346 and one minute counter 358) merely for convenience of the mechanical connections.

The 1/10 minute counter 372 drives through a similar chain of gears to another input gear 374 of the differential 370. One input of differential 370, therefore, is the combined output of the 10's minute counter 346 and the one minute counter 358 while the other input is the output of the 1/10 minute counter 372. By employing the proper gear ratios, these rotational mechanical motions are so proportioned that the desired amounts of rotation will be produced in accordance with the information from the tape unit 70, which represents the quantity $\frac{1}{2}$ sec $\lambda_p$.

The four remaining counter units which are located between the 1/10 minute unit 372 and the one minute unit 358 are not mechanically connected to any output, but merely have electrical outputs as previously explained. The mechanical output of the add unit is the rotational output as produced at an output gear 376 of the differential 370 and this output motion is always in one direction only and is carried via a train of gears, as illustrated, to the input side of a pair of rotation reversing clutches, the operation of which has been explained above and which are designated east clutch 104 and west clutch 106. It will be noted that the input side of each of these clutches is rotated in the same direction, so that whichever of the output gears 378 or 380 is connected by having its clutch engaged, will also rotate in this same direction. However, the direction of the drive, as carried to the longitude unit input gear 312, will be reversed depending upon which clutch is engaged because the direction of rotation produced at gear 312 will be in one sense if clutch 104 is engaged whereas it will be in the opposite sense if clutch 106 is engaged.

There is also illustrated a third clutch 234 the purpose of which has been explained previously and which is mechanically situated in a single unit with the east-west clutches 104 and 106 for convenience sake. The set clutch 234 is for engaging or disengaging the set motor M7 which is used for setting the desired longitude indication on the present longitude indicator 108.

It will be noted that a mechanical showing of the five commutators ACC1 through ACC5 has been made and that these commutators are mounted on a shaft which also carries the cams for cam actuated switches CB13, CB14, and CB17. It will be noted that the shaft which carries these commutators and cams, is directly connected via a series of bevel gear connections to the one revolution shaft 340, with a one to one ratio, so that the commutators and cams also complete a single revolution for each cycle of operation.

Integrator Unit 73

Figure 31:
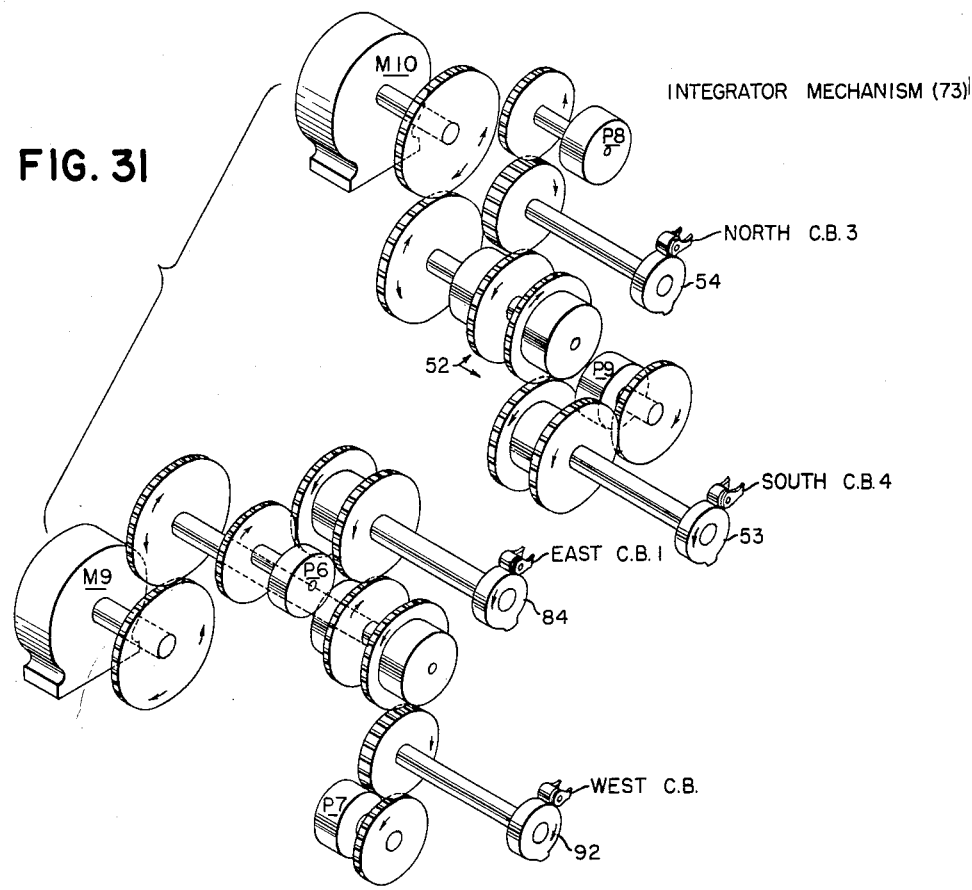
FIG. 31 is a mechanical schematic in perspective showing the interrelation of the elements of the integrator unit.

The mechanical elements involved in the integrator unit 73 are illustrated in FIG. 31, and merely consist of two separate servo motor systems, one for the latitude, or north-south integrated ground travel output; and the other for longitude, or east-west ground travel outputs. The servo motor M10 is illustrated without showing its mechanically connected generator G10 (see electrical circuits). The motor M10 drives a train of gears, as illustrated, which drives the input to the north-south clutches 52 in a reversible manner. These clutches 52 will be described in greater detail below, but, as was previously explained, these clutches determine which of the two pulse producing cams 53 and 54 will be driven, depending upon the direction of rotation of the input to clutches 52 as produced by the output of servo motor M10.

Each of the cams 53 and 54, has mechanically associated therewith by a directly geared connection a corresponding potentiometer P9 and P8, respectively, as previously described in connection with the operation of the system.

The mechanical elements of the longitude or east-west indicator elements are in all respects similar to the elements just described in connection with the latitude portion of the system, and therefore these details need not be repeated. The longitude unit is that driven by motor M9, which drives either the east cam 84 or the west cam 92, as well as the corresponding potentiometers P6 and P7, respectively.

Integrator Clutch Unit

Figure 32:
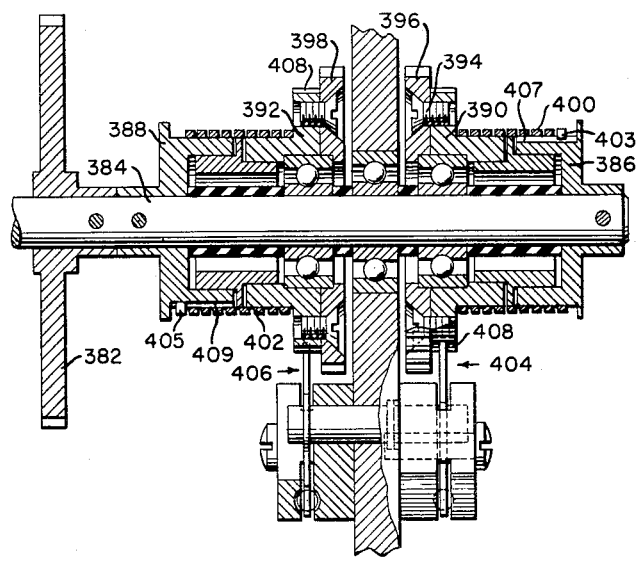
FIG. 32 is a longitudinal cross sectional view of each of clutch units for the north-south section, and for the east-west section of the integrator unit.

In FIG. 32, the details of one of the clutch units, as employed in either the latitude or longitude portion of integrator unit 73, is illustrated. Thus, an input gear 382 is reversibly driven from one of the servo motor connections M9 or M10. This gear 382 is pinned or otherwise securely fastened to a shaft 384, to which also are pinned or otherwise securely fastened, two drum surfaced elements 386 and 388. Situated co-axially with the drummed surfaced elements 386 and 388 are similar elements 390 and 392 which have a drum surface of the same diameter as that of elements 386 and 388. Each of the drummed surfaced elements 390 and 392 is securely fastened, by any convenient means such as the screws 394 illustrated, to a pair of output gears 396 and 398. Each drum surface element, e.g., 390 with its attached gear 396, is carried in a freely rotatable manner as by a ball bearing, as illustrated. Situated around the drum surface of the members is a spiral spring, e.g. springs 400 and 402. Each of the springs 400 and 402 is fastened to its corresponding drum member 386 or 388 by a radially directed tip 403 or 405 on the springs which tip is in each case inserted into a groove 406 or 409, respectively, on the drum surface. Each spring 400 or 402 therefore, has one end thereof rotatably carried with the shaft 384 via its corresponding drum member 386 or 388. Since the opposite ends of springs 400 and 402 are fastened to their drum members which are rotated with shaft 384, one of the springs 400 or 402 will tend to tighten or grip the freely rotatable drum surface member that corresponds with such spring, for each direction of rotation. For example, this action of gripping will take place for spring 400 upon a given direction of rotation of shaft 384, while it will take place with spring 402 upon the opposite direction of rotation of the shaft 384. It is to be noted that when either spring 400 or 402 acts to grip its corresponding drum member 390 or 392, the opposite spring tends to release or unwind, and therefore slides about this corresponding drum member with very little friction. In this manner and by reason of the frictional action of spiral springs 400 and 402 a given output gear 396 or 398 will be rotated for a given direction of input rotation, as produced by the input gear 382. To insure that no reverse motion will take place at the output gear not being driven, there is a pair of ratchet members 404 and 406 which act in the ordinary manner to prevent a reverse rotation by means of serrated edges 408 (ratchet wheels) on each of the drum members 390 and 392. Now it will be clear that when input gear 382 is rotated in one direction, one of the springs 400 or 402 will tighten itself upon both halves of its combined drum members, e.g. 386 and 390; so that the corresponding output gear 396 or 398 will be positively rotated, while the opposite spring will be unwound and loosened so that the opposite output gear will merely stand still, being held by its ratchet.

Tape Unit (70)

The mechanical details of tape unit 70 are illustrated in FIGS. 19, 20, 21 and 22. It will be recalled that the tape unit operates, in general, to position a coded tape corresponding with the present latitude as indicated on the present latitude indicator. The information carried by this tape and the relation of its operation to the whole system has been clearly described above. It will be observed that a tape 470 has a series of feed holes 472 along its center line. This tape may be composed of any desired material having sufficient strength and resilience. However, we prefer to use a metal tape of relatively thin gauge such as steel. The tape 470 must be capable of being rolled in either direction since the latitude may increase or decrease. It will be noted that the tape is rolled on two spindles which may be identified by the shafts 474 and 476. The feed holes 472 of the tape are engaged by a series of pins 478 which are centrally located around the periphery of a feed drum 480. The feed drum 480 may be rotated in either direction but will be positively maintained in its successive code reading positions, by means of a Geneva type gear drive. The input drive from the latitude system is had by means of a bevel gear 482 which is securely fastened to a shaft 484, and then by means of a Geneva driving crank 486 which is also securely fastened to the shaft 484. The Geneva crank 486 has an extension 488 which carries a pin 490 thereon. The pin 490 engages one of four slots 492 that are situated in a usual star shaped type of Geneva gear 494. The Geneva gear member 494 is directly connected by a train of gears to drive the drum 480 in rotation from one successive code reading position of the drum to the next. Thus in the usual mechanical manner the drum 480 is periodically rotated from one code reading to the next while being securely maintained in each code reading position between movement from one position to the next.

In order to maintain the tape 470 tightly wound at all times, a drive has been arranged which tends to wind up the tape in opposite directions from each end whenever any change of position of the tape is initiated. This is accomplished by means of frictional drives which may be any convenient style, but which are in this instance, composed of a set of cork discs 496 that are frictionally held between the faces of a pair of metal flanges 498. The flanges 498 are securely fastened to the shafts 474 and 476 of the tape spindles. Frictional engagement between discs 496 and flanges 498 is maintained by means of a pair of nuts 500 which are threaded on to the end of shafts 474 and 476, as illustrated. Therefore, a rotational drive which tends to rotate shafts 474 and 476 through the frictional clutch arrangement just described is accomplished by means of having a pair of gears 502 and 503, each held frictionally between one pair of cork discs 496, while being freely rotatable about the respective shafts 476 and 474. The rotation of gears 503 and 502 is always in the same direction regardless of the direction of the input rotation at bevel gear 482, which may be reversed.

Referring to FIG. 21, it will be noted that there are a pair of collars 504 and 506 which are so shaped as to form half of a drum surface in each case, about which is wound a spiral spring 508 and 509. Each collar 504 and 506 is securely fastened, as by a pin, to the shaft 484 and rotates therewith. The action of spiral springs 508 and 509 and the drum surfaces about which they are wound is identical with that described above in connection with the east-west and north-south clutches that are used in the indictaor unit 73. Therefore, when the input shaft 484 is rotated in one direction, a given one of the springs 508 or 509 will tend to tighten and grip its drum surfaces so that the corresponding gear 510 or 511 (with its integral hub that forms half of the drum surfaces) will be rotated therewith, while at the same time the opposite spring will loosen and allow its drum surfaces to be entirely free from one another so that no tendency to drive its gear will be felt. It will be noted that each of the two gears 510 and 511 has an integral hub of a diameter equal to the drum surface portion of collars 504 and 506 so that a drum surface having two halves is formed. Each gear 510 and 511 and its integral hub is freely rotatable about the shaft 484.

It will therefore be clear that for a given direction of rotation input, a given one of the gears 510 or 511 will be rotated while the opposite gear will remain idle. By means of a train of gears connected to the gears 510 and 511 in each instance, a direct drive will be had to a gear 512 located near the bottom of the unit as viewed in FIGS. 19 and 21. By means of including an additional gear 513 in the gear train between gear 510 and the gear 512, a reversal of the direction of rotation is had. Therefore, regardless of whether gear 510 or gear 511 is being rotated, the connected gear 512, in either case will be rotated in the same direction (counter clockwise as viewed in FIG. 19); so that the pair of meshing gears 502 and 503 will always be rotated in the same direction, viz, gear 502 counter clockwise and gear 503 clockwise as viewed in FIG. 19. In this way, the tape winding spindle shaft 476 will always tend to be rotated clockwise as viewed in FIG. 19 while tape winding shaft 474 will at the same time be likewise frictionally urged to rotate counter clockwise as viewed in FIG. 19, and in this manner the frictional drive upon shafts 474 and 476 will be in a direction to maintain tension in the tape 470 at all times. The extra gear 513 found in one of the two gear trains mentioned above, merely acts as an idler gear to reverse the direction of rotation effected at a shaft 518. Shaft 518 carries securely fastened thereto a pinion 520 as well as gears 514 and 515. The two trains of gears from driven gears 510 and 511 terminate with power output gears 514 and 515 respectively so that the pinion 520 is driven thereby. The pinion 520 meshes with a gear 522 that is integral with the gear 512 mentioned above.

Referring to FIGS. 19 and 22, it will be noted that the code, as contained on the tape, is read by means of a series of electrical switches. The mechanism for controlling these switches comprises a line of pins 524 which are somewhat pointed at their lower extremity, and which may be lowered into contact with the tape 470 (for reading) by means of a bale 526 that is spring biased into a pin raising position as illustrated in FIG. 19 by means of a usual spring 528. As may be seen in FIG. 19 when the bale is in its upper position, all of a set of contacts 530 of the electrical switches will be raised to their open position. However, when the bale is lowered by means of energization of the electro magnetic coil, or tape sensing magnet 190, all of the pins 524 will be allowed to be pressed downward by the spring bias of their contacts 530 so as to make contact with the tape 470, unless there is a hole in the tape under a given pin. If a hole is located in the tape under any given pin 524, this pin will be allowed to continue down until its contacts 530 have been firmly closed. In this way, it will be clear that the coded holes in the tape will determine the circuits which are to be closed when a reading operation takes place, as was described above in connection with the electrical circuits.

WIND CORRECTION SELF-RETURN CLUTCH

Figure 33:
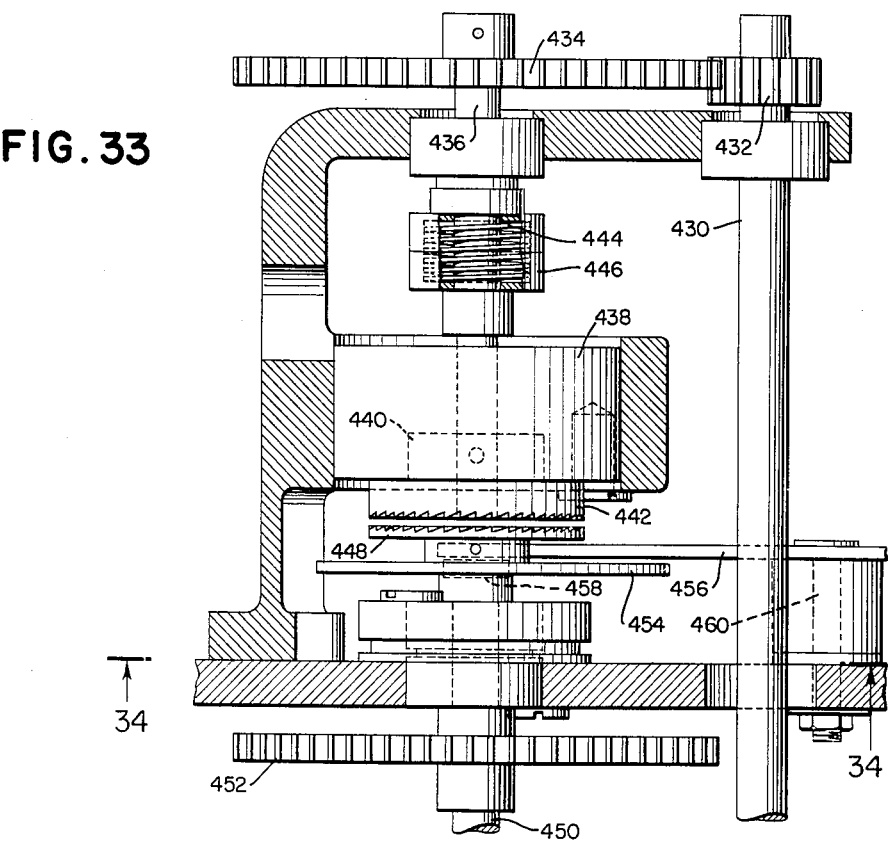
FIG. 33 is a plan view partly in cross section of the restoring clutch unit used in wind corrections at high latitudes, the view is taken along the line 33—33 of FIG. 34 looking in the direction of the arrows.
Figure 34:
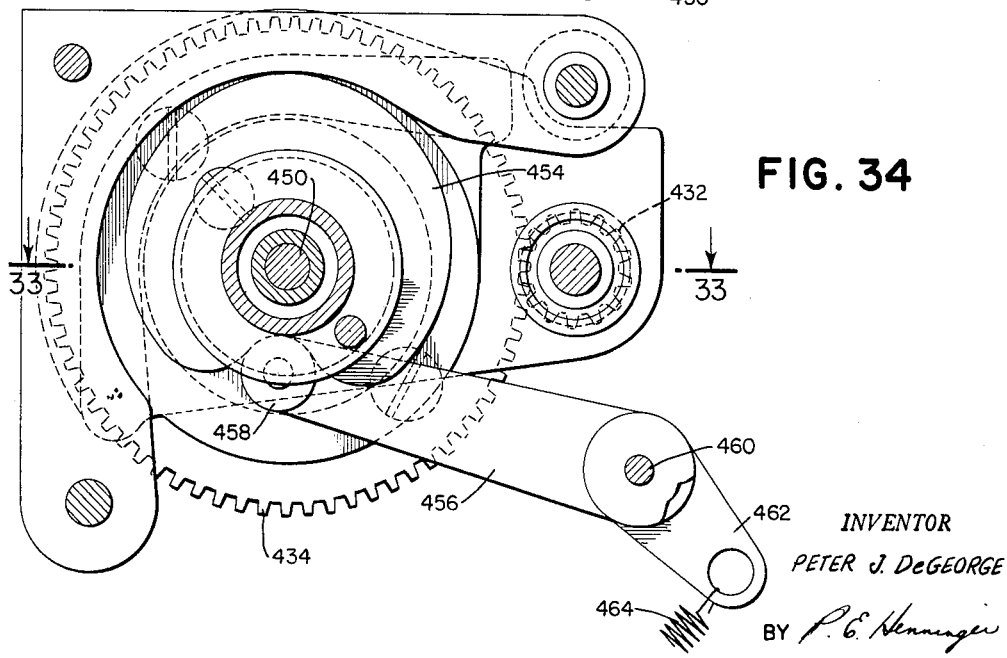
FIG. 34 is an end view of the same restoring clutch unit shown in FIG. 33, and taken along the line 34—34 of FIG. 33 looking in the direction of the arrows.

The clutch 177 (FIG. 1c) is shown in detail in FIGS. 33 and 34. This clutch is an ordinary serrated tooth type of clutch that is arranged to have its clutch members disengaged when the electromagnetic actuating coil is energized. This will be evidenced upon referring to FIG. 33, where a plan view of the clutch shows an input shaft 430 having a pinion 432 securely attached thereto which meshes with a gear 434, in turn securely attached to a shaft 436. The shaft 436 is slidable axially and is maintained in the position illustrated by the force of an electromagnetic coil 438 which acts upon a hub portion 440 of one clutch disc 442. There is a spring 444 which is encased within a housing 446 and which acts to tend to force the shaft 436 and the clutch disc 442 which is attached thereto, axially downward as viewed in FIG. 33, in order to engage the clutch face members. Another clutch face disc 448 is situated coaxially with the magnetically actuated clutch disc 442 but is fastened securely to its own shaft 450 which also carries securely fastened thereto an output gear 452. The output side of the clutch, i.e. clutch face disc 448 and output gear 452, is mechanically biased to a given zero position to which it will return whenever the clutch faces are disengaged. This is accomplished by means of a heart shaped cam disc 454 which is attached securely to the same shaft 450 and rotates therewith. Riding in rolling engagement with the cam 454 is a spring biased arm 456 which carries at its extremity a roller 458 which bears directly in rolling contact with the cam surface of the heart shaped cam 454. The arm 456 is pivoted about a flat headed threaded end pin 460 which fastens the arm to the frame work of the mechanism. There is a short extending arm 462 which is integral with or securely fastened to the arm 456 and which therefore also pivots about the pin 460. Attached through a hole or by any other suitable means near the extremity of arm 462 is a spring 464 which is also attached to the framework of the mechanism in a manner not illustrated but which serves to secure the other end of spring 464 so that it will exert a force on arm 462 tending to rotate the two arms 462 and 456 in a clockwise manner as viewed in FIG. 34 about pivot pin 460. It will now be clear that whenever the electromagnetic coil 438 is energized so that the clutch faces 442 and 448 are disengaged, the force of the spring biased arm 456 with its roller 458 acting upon the cam surface of cam 454 will tend to rotate the clutch face 448 as well as the output gear 452, along with their common shaft 450 in either direction (depending upon the location of roller 458 relative to the cam 454) until the zero or at rest position corresponding to that illustrated in FIG. 34 is obtained.

While I have described my invention in detail in accordance with the applicable statutes, such description is not to be taken as limiting in any way my invention, but merely as being descriptive thereof.

I claim:

1. In a navigation system having available separate electrical signals corresponding to the north-south and to the east-west components of the ground velocity of a craft the combination comprising means for integrating the signals to produce periodic pulses representing a predetermined distance of travel in the north-south and in the east-west directions, self powered means controlled by said north-south pulses for determining the latitude of the craft and including a coded record having thereon the secant quantities of present latitude times a given increment of east-west travel, means for reading said coded record, means under control of said periodic pulses for advancing said coded record under said reading means to present thereto the secant quantities of present latitude times a given increment of east-west travel and self powered means controlled by said east-west pulses including means for translating said coded record for determining the longitude of the craft.

2. In a navigation system having available electrical signals corresponding to the north-south and to the east-west components of the ground velocity of a craft the combination comprising means for integrating said signals to produce periodic pulses representing a predetermined distance of travel in the north-south and in the east-west directions, self powered means controlled by said north-south pulses for determining the latitude of the craft and including a coded record having thereon in numeric representations the secant quantities of present latitude times a given increment of east-west travel, means for reading said record, means under control of said periodic pulses for advancing said record in said reading means to present thereto a quantity corresponding to the present latitude, self-powered means controlled by said east-west pulses including means for translating said coded record for determining the longitude of the craft, additional means for indicating latitude and longitude of a predetermined destination, and rotary electrical means including a system having connections to said craft latitude and longitude determining means as well as connections to said predetermined destination latitude and longitude indicating means for automatically determining the heading in order to maintain a great circle course to the predetermined destination.

3. In a navigation system, means for reading a coded record strip having information representing the quantities secant $\lambda_p$ times a given increment of east-west travel where $\lambda_p$ is the present latitude of a craft, means for producing periodic pulses after a predetermined distance of travel in a north-south direction, and means under control of said last named means for advancing said record in said reading means either direction to present the information corresponding to the present latitude at any given time.

4. A navigation system for high speed air craft having means for accepting separate electrical signals representing the north-south and the east-west components of ground track velocity comprising means for integrating said signals, periodic means associated with said integrating means for producing a pulse after a predetermined distance of travel in each component direction, means controlled by said north-south travel pulses for determining present latitude of the craft and having a unit for receiving and reading a record having thereon numeric quantities representing the product of the predetermined distance times the secant of the present latitude, means controlled by said east-west travel pulses and having an add unit controlled by the quantities read from a record in said record reading unit for determining present longitude of the craft.

5. A navigation system according to claim 4 also including means for indicating the present longitude of the craft as determined by said determining means.

6. A navigation system for high speed air craft having means for accepting separate electrical signals representing the north-south and the east-west components of ground track velocity comprising means for integrating said signals, periodic means associated with said integrating means for producing a pulse after a predetermined distance of travel in each component direction, separate power driven latitude means controlled by said north-south travel pulses for determining present latitude of the craft and including a compensating means for correcting the north-south signal to compensate for the aspherical shape of the earth, said latitude means also including a unit for receiving a numeric record having recorded thereon quantities representing the product of the predetermined distance times the secant of the present latitude, means under control of said north-south travel pulses for reading from said numeric record a quantity representing the product of the predetermined distance times the secant of present latitude and separate power driven longitude means controlled by said east-west travel pulses for determining present longitude including an add unit controlled by the stored quantity for adding the necessary amount of displacement to that representing the predetermined distance of travel so that the determination of longitude in degrees and minutes will be correct.

7. A navigation system according to claim 6 further including means for indicating the present longitude as determined by said determining means.

8. A navigation system for high speed air craft having means for accepting electrical analogue signals representing the north-south and the east-west components of said ground track velocity comprising servo motor means for integrating said analogue signals, cam operated switch means connected to said servo means for producing an electric pulse after a predetermined number of revolutions of each servo motor, separate power driven latitude determining means including an electrically actuated one cycle clutch, means for actuating said clutch under control of the north-south pulse produced by the north-south servo motor, means driven by the output side of said one cycle clutch for determining present latitude, a tape unit driven by the output side of said one cycle clutch for reading from a record tape quantities representing the product of the east-west distance represented by said predetermined number of revolutions of the east-west servo motor times the secant of the present latitude, separate power driven longitude determining means including an electrically actuated one cycle clutch, means for actuating said longitude clutch under control of the east-west pulse produced by the east-west servo motor, an add unit controlled by the quantities read from a record tape in said tape unit for adding the quantity stored in the tape unit to produce a change in present longitude initiated by one of said east-west pulses, and a longitude determination means connected to the output side of said longitude clutch through said add unit for determining present longitude of the craft.

9. A navigation system according to claim 8 further including means for indicating present latitude as determined by said latitude determining means, and means for indicating present longitude as determined by said longitude determining means.

10. In a navigation system for high speed air craft, a tape unit for receiving a record tape having thereon numeric quantities representing the secant of given latitudes times a measured east-west component of travel comprising means for producing periodic pulses after a predetermined distance of travel in a north-south direction, means under control of said last named means for advancing a tape in said tape unit in either direction in synchronism with present latitude of the craft, and means for reading a tape so advanced.

11. In a navigation system having available electrical analogue signals corresponding to the north-south and to the east-west components of the ground velocity of a craft the combination comprising servo motor means controlled by said analogue signals for integrating the said signals, mechanically operated switches actuated by said servo motor means for producing periodic pulses representing a predetermined distance of travel in the north-south and in the east-west directions, present latitude and longitude indicators for indicating present position of the craft, separate motor driven one rotation clutch means for supplying power to drive said indicators, means controlled by said periodic pulses for actuating said clutch means each time said predetermined distance has been traversed, means driven by the power output from the latitude clutch means for positioning a coded record having quantities in code thereon representing the product of the secant of the present latitude times the predetermined distance travelled in an east-west direction, means driven by the power output from the longitude clutch means for adding the quantity as read from said coded record to said present longitude indication, destination indicators for indicating the latitude and longitude of a predetermined destination, a present latitude resolver connected to the present latitude indicator for providing signals functionally related to the present latitude, a destination latitude resolver connected to the destination latitude indicator, for providing signals functionally related to the destination latitude, differential means having two inputs connecting said present longitude and said destination longitude indicators and having an output connected to a difference longitude resolver for providing signals functionally related to the difference between present and destination longitudes, said resolvers being electrically connected in circuit with a servo system including a tangent resolver that is driven by a servo motor to drive a shaft to a position corresponding to the ground track heading required.

12. In a navigation system having an electric analogue signal representing a given component of ground travel, said signal reversing in sense with a reversal in direction of the component of ground travel, an integrator comprising a servo motor system operating at a speed proportional to the amplitude of said analogue signal and in a direction dependent on the sense of the signal, a pair of alternately driven single revolution clutches driven by said servo motor system for actuating electric pulse producing switches after a predetermined displacement, and means connecting said alternate clutches for mutually exclusive displacement depending upon the direction of operation of said servo motor system.

13. In a navigation system having an electric analogue signal representing a given component of ground travel, said signal reversing in sense with a reversal in direction of the component of ground travel, an integrator comprising a servo motor system operating at a speed proportional to the amplitude of said analogue signal and in a direction dependent on the sense of the signal, two cams alternatively driven by said servo motor depending upon the direction of drive, electric switches actuated by said cams for producing pulses after a predetermined number of revolutions of the servo motor system, and a pair of unidirectional clutches connected to said servo motor system for displacing said cams exclusively one for each direction of operation of the servo motor system.

References Cited in the file of this patent

UNITED STATES PATENTS

| | | |
|---|---|---|
| 2,428,770 | Albert | Oct. 14, 1947 |
| 2,566,972 | Wheeler | Sept. 4, 1951 |
| 2,643,355 | Hallman | June 23, 1953 |
| 2,651,015 | Meredith | Sept. 1, 1953 |
| 2,710,962 | Fritze | June 14, 1955 |
| 2,738,504 | Gray | Mar. 13, 1956 |
| 2,744,683 | Gray | May 8, 1956 |
| 2,752,091 | McKenney et al. | June 26, 1956 |
| 2,762,123 | Schultz et al. | Sept. 11, 1956 |